United States Patent [19]
Izukawa et al.

[11] Patent Number: 5,134,348
[45] Date of Patent: Jul. 28, 1992

[54] VIBRATION WAVE MOTOR

[75] Inventors: Kazuhiro Izukawa; Koichi Ueda, both of Yokohama, Japan

[73] Assignee: Canon Kabushiki Kaisha, Tokyo, Japan

[21] Appl. No.: 724,450

[22] Filed: Jul. 3, 1991

Related U.S. Application Data

[63] Continuation of Ser. No. 466,677, Jan. 16, 1990, abandoned.

[30] Foreign Application Priority Data

| Apr. 7, 1989 | [JP] | Japan | 1-088698 |
| Sep. 5, 1989 | [JP] | Japan | 1-229814 |
| Oct. 24, 1989 | [JP] | Japan | 1-276463 |
| Oct. 31, 1989 | [JP] | Japan | 1-284583 |

[51] Int. Cl.⁵ .......................................... H01L 41/08
[52] U.S. Cl. .................................. 318/116; 310/116; 310/323
[58] Field of Search .............. 310/316, 317, 323, 328; 318/116, 118

[56] References Cited

U.S. PATENT DOCUMENTS

| 3,058,015 | 10/1962 | Nesh | 310/319 X |
| 3,179,823 | 4/1965 | Nesh | 310/326 X |
| 4,122,725 | 10/1978 | Thompson | 310/326 X |
| 4,158,787 | 6/1979 | Forward | 310/319 X |
| 4,513,219 | 4/1985 | Katsuma et al. | 310/316 X |
| 4,565,940 | 1/1986 | Hubbard, Jr. | 310/326 |
| 4,626,730 | 12/1986 | Hubbard, Jr. | 310/326 |
| 4,692,649 | 9/1987 | Izukawa et al. | 310/323 X |
| 4,727,276 | 2/1988 | Izukawa et al. | 310/323 X |
| 4,749,896 | 6/1988 | Suzuki et al. | 310/323 X |
| 4,914,337 | 4/1990 | Takagi | 310/323 X |
| 4,980,597 | 12/1990 | Iwao | 310/319 |

FOREIGN PATENT DOCUMENTS

| 0203874 | 9/1986 | Japan | 310/317 |
| 0075909 | 4/1988 | Japan | 310/317 |

*Primary Examiner*—Mark O. Budd
*Attorney, Agent, or Firm*—Fitzpatrick, Cella, Harper & Scinto

[57] ABSTRACT

A vibration wave motor in which a signal for suppressing unnecessary vibration engendered during the driving of the vibration wave motor, besides the driving signal of the motor, is applied to the motor to suppress the unnecessary vibration.

52 Claims, 51 Drawing Sheets

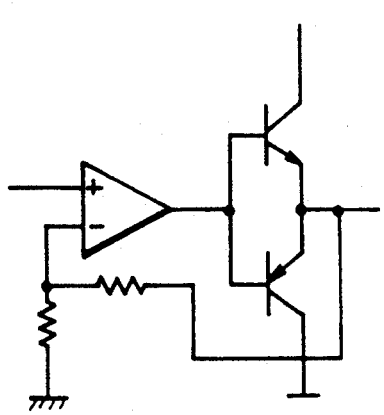
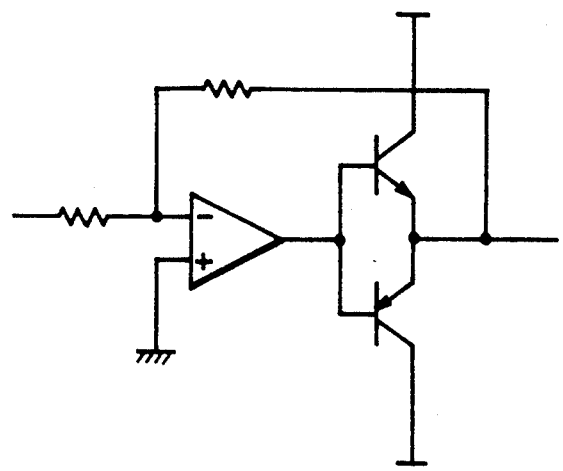
FIG. 8   FIG. 10
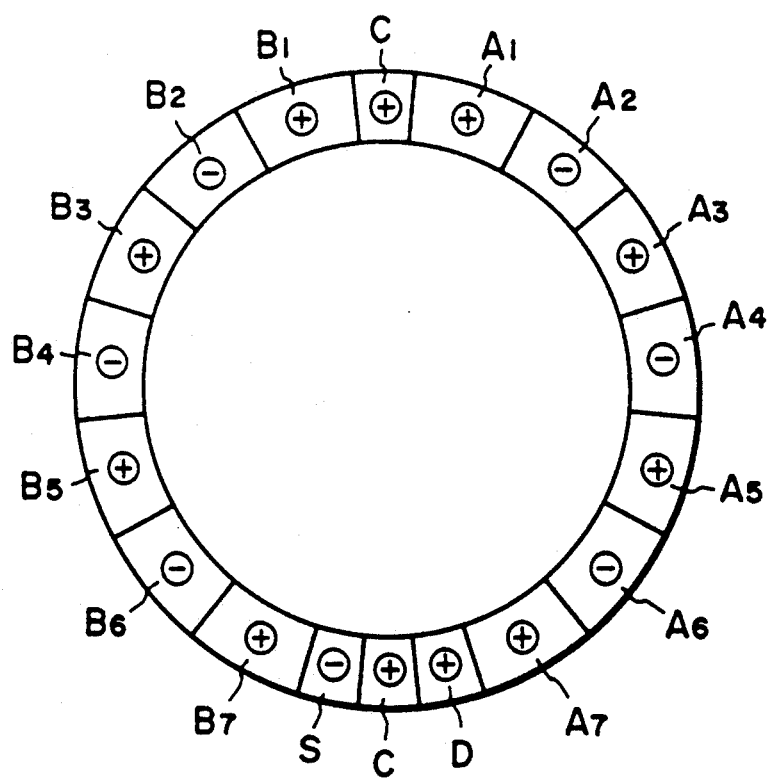
FIG. 9

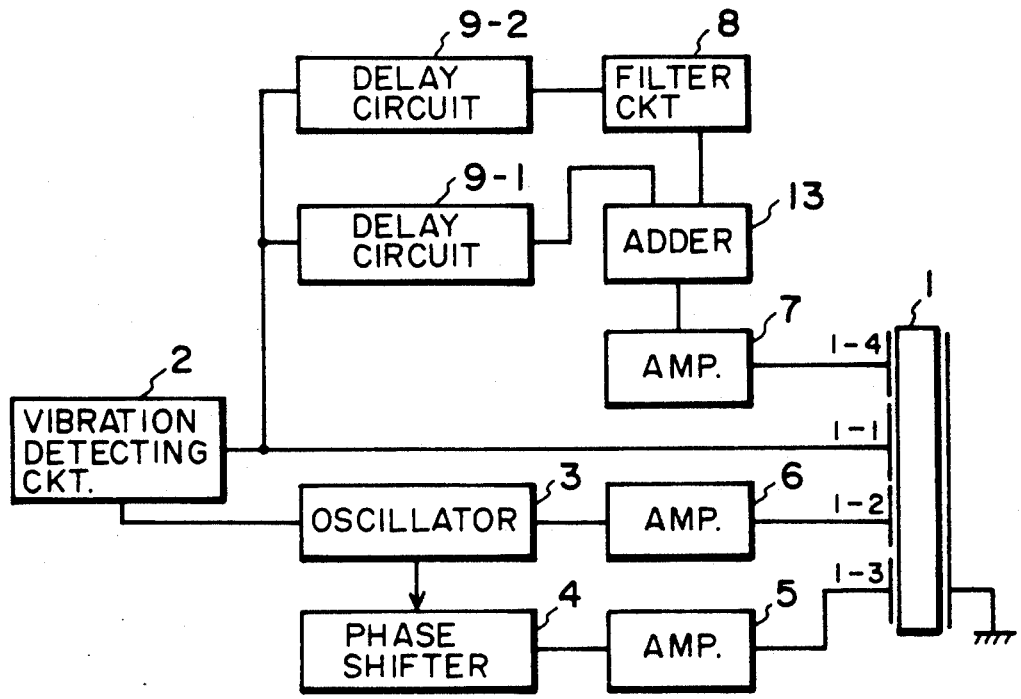
F I G. 25
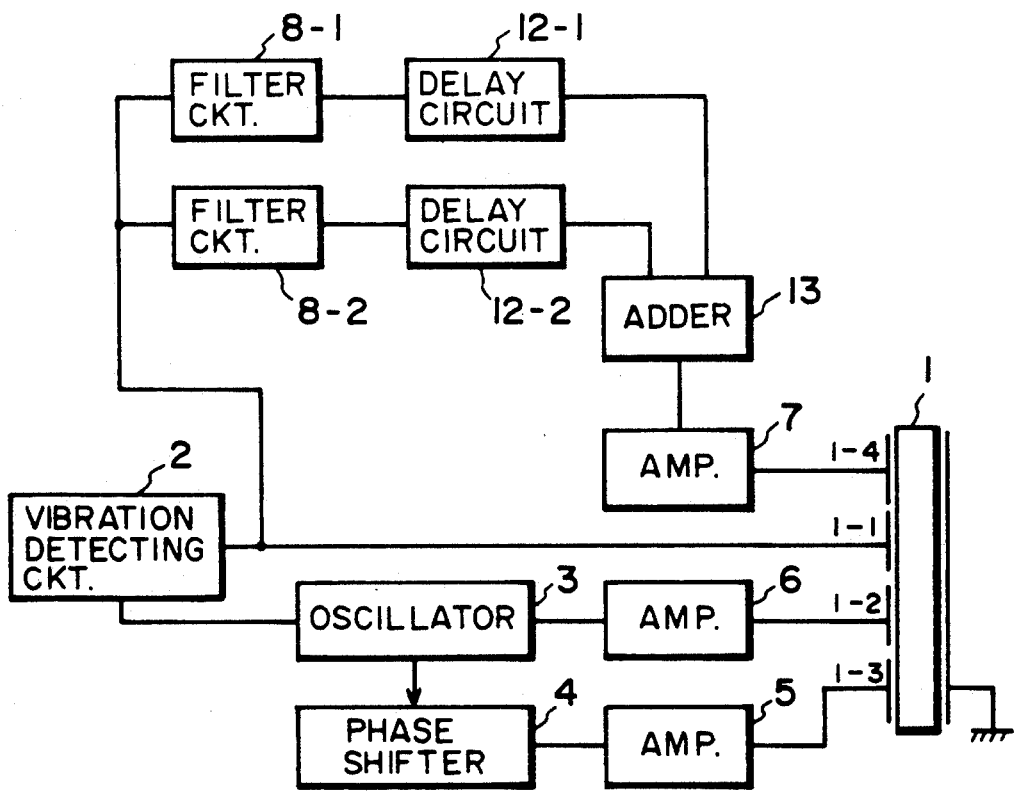
F I G. 26

VIBRATION WAVE MOTOR

This application is a continuation of application Ser. No. 466,677 filed Jan. 16, 1990, now abandoned.

BACKGROUND OF THE INVENTION

1. Field of the Invention

This invention relates to a vibration wave motor utilizing travelling vibration waves.

2. Description of the Related Art

The outline of the principle of a vibration wave motor utilizing travelling vibration waves is as follows.

Two groups of circumferentially arranged piezo-electric elements are secured to one surface of a ring-like vibration member of a resilient material whose full circumferential length is an integer times as great as a certain length $\lambda$ to thereby provide a stator. These piezo-electric elements in each group are arranged at a pitch of $\lambda/2$ so as to have opposite expansion-shrinkage characteristics alternately, and are disposed so that there is a deviation an odd number times as great as $\lambda/4$ between the two groups. The two groups of piezo-electric elements are provided with an electrode film. If an AC voltage is applied to only one of the two groups (hereinafter referred to as the A phase), a standing wave (wavelength $\lambda$) of such flexural vibration that the central point, of each piezo-electric element and a point spaced apart by $\lambda/2$ therefrom are the positions of antinodes and the midpoint between the positions of the antinodes is the position of a node, is produced over the entire circumference of the vibration member. If an AC voltage is applied to only the other group (hereinafter referred to as the B phase), a standing wave is likewise produced, but the positions of the antinodes and node thereof deviate by $\lambda/4$ relative to the standing wave by the A phase. When AC voltages of the same frequency but having a time phase difference of 90° therebetween are applied to the A and B phases at one time, the standing waves of the two are combined together with a result that a travelling wave (wavelength $\lambda$) of flexural vibration vibrating in the circumferential direction is produced in the vibration member, and at this time, each polyhedral point of the vibration member having a thickness effects a kind of elliptical movement. Consequently, if for example, a ring-like moving member such as a rotor is kept in pressure contact with the surface of the vibration member, the moving member is subjected to circumferential friction from the vibration member and is rotatably driven thereby.

Also, a driving method is known wherein a piezo-electric element for vibration detection (hereinafter referred to as the S phase) is provided besides the groups of piezo-electric elements of the A and B phases. The piezo-electric element is driven, for example, at a frequency satisfying conditions for making a phase difference between the output from this S phase and the applied driving voltage to the groups of piezo-electric elements of A and B phases constant, thereby keeping the vibrating state of the vibration member constant and stabilizing the motor output.

FIG. 32 of the accompanying drawings diagrammatically shows the driving circuit of a conventional vibration wave motor, and FIG. 33 of the accompanying drawings shows the arrangement of A and B phase and S phase of a ring-like vibration member and the polarization pattern thereof.

The reference numeral 1 designates the vibration member of a vibration wave motor which is formed into a ring-like shape. An S phase piezo-electric element 1-1, an A phase piezo-electric element group 1-2 and a B phase piezo-electric element group 1-3 are secured to one surface of the vibration member 1 as by an adhesive agent, and a C phase electrode C which is an electrode common to these piezo-electric elements is likewise secured to the other surface of the vibration member 1.

The A phase piezo-electric element group 1-2 and the B phase piezo-electric element group 1-3 are adapted to be drive-controlled by a driving circuit comprising an oscillator 3, a 90° phase shifter 4, amplifiers 5 and 6 and a vibration detection circuit 2 for detecting the vibrating state on the basis of the phase difference or amplitude information from the S phase The output of a piezo-electric element 1-1, and an AC signal from an oscillator 3 are directly input to one amplifier 5 and a time phase difference is input to the other amplifier 6 with a deviation of 90° through a 90° phase shifter 4 so as to drive the A phase piezo-electric element group 1-2 and the B phase piezo-electric element group 1-3, respectively, and at that time, the oscillator 3 is controlled by a vibration detection circuit 2 so that the motor is driven at a regular wave number while the phase or voltage amplitude of a travelling vibration wave formed on the vibration member 1 by the S phase piezo-electric element 1-1 is detected.

The frequency of the AC signal applied to the A phase piezo-electric element group 1-2 and the B phase piezo-electric element group 1-3 by the oscillator 3 is determined by the natural frequency of the vibration member 1. The wave number of the travelling vibration waves formed on the vibration member 1 is determined, for example, by the interval between adjacent piezo-electric elements differing in the direction of polarization in the A phase piezo-electric element group 1-2 provided on the vibration member 1 and the circumferential length of the vibration member 1, and in the case of FIG. 33, there are formed eight travelling waves.

In the above-described driving circuit of a conventional vibration wave motor, however, only a signal of a frequency for driving is applied to the A and B phase piezo-electric element groups of the vibration wave motor, and this has sometimes led to the production of audible sound.

That is, if the resonance frequency of the vibration wave motor is $f_{\gamma(n)}$ which is the resonance frequency in a vibration mode of wave number=n (the number of waves produced on the vibration member, which is a positive integer), when the resonance frequency $f_{\gamma(n)}$ is being applied to the vibration wave motor, other vibration mode, for example, vibration of a frequency $f_{\gamma(n-1)}$, may be excited depending on the, situation of the vibration wave motor (such as the fluctuation of the torque load of the motor, a variation in the applied pressure to the moving member and the vibration member, or the like), and at this time, vibration of a low frequency $f_{\gamma(n)} - f_{\gamma(n-1)}$ may also be excited, and this is heard as audible sound.

Also, when the above-described self-excited vibration is produced, for example, by the frictional force between the vibration member and the moving member of the vibration wave motor and the vibration of a travelling vibration wave which is not as per the design value (differing also in wave number) is added, a signal voltage which is not as per the design value is also added to the signal output from the S phase and therefore, exact phase and voltage amplitude at a regular wave number are not obtained, and this has led to the undesirable possibility that the vibration wave motor cannot be normally drive-controlled.

SUMMARY OF THE INVENTION

One aspect of the present invention is to provide a vibration wave motor in which a driving frequency signal is applied to an electro-mechanical energy converting element to thereby form vibration waves which are used as a driving force and in which in addition to said driving frequency signal, a signal for suppressing unnecessary vibration is applied to electro-mechanical energy converting element to thereby negate the unnecessary vibration.

Another aspect of the present invention is to provide, to achieve the above object, a vibration wave motor which is provided with detecting means for detecting the vibrating state of the vibration wave motor and in which the signal for suppressing unnecessary vibration is obtained on the basis of the output of the detecting means.

Still another aspect of the application is to provide, to achieve the above object, a vibration wave motor in which an electro-mechanical energy converting element for driving, a converting element for vibration detection and a converting element for producing suppressing signal are disposed on a vibration member.

Another aspect of the application is to provide, to achieve the above object, a vibration wave motor in which detected vibration signals detected from a plurality of positions on a vibration member are synthesized and the signal for suppression is obtained on the basis of said synthesized signals to thereby deter unnecessary vibration waves.

Other objects of the present invention will become apparent from the following detailed description of embodiments thereof taken in conjunction with the accompanying drawings.

BRIEF DESCRIPTION OF THE DRAWINGS

FIG. 8 is a circuit diagram of the amplifier shown in FIG. 5A.

FIG. 9 shows a modification of the electrode pattern shown in FIG. 6.

FIG. 10 is another circuit diagram of the amplifier shown in FIG. 5A.

FIGS. 25 and 26 are circuit block diagrams of further embodiments of the present invention.

DESCRIPTION OF THE PREFERRED EMBODIMENTS

Figure 1:
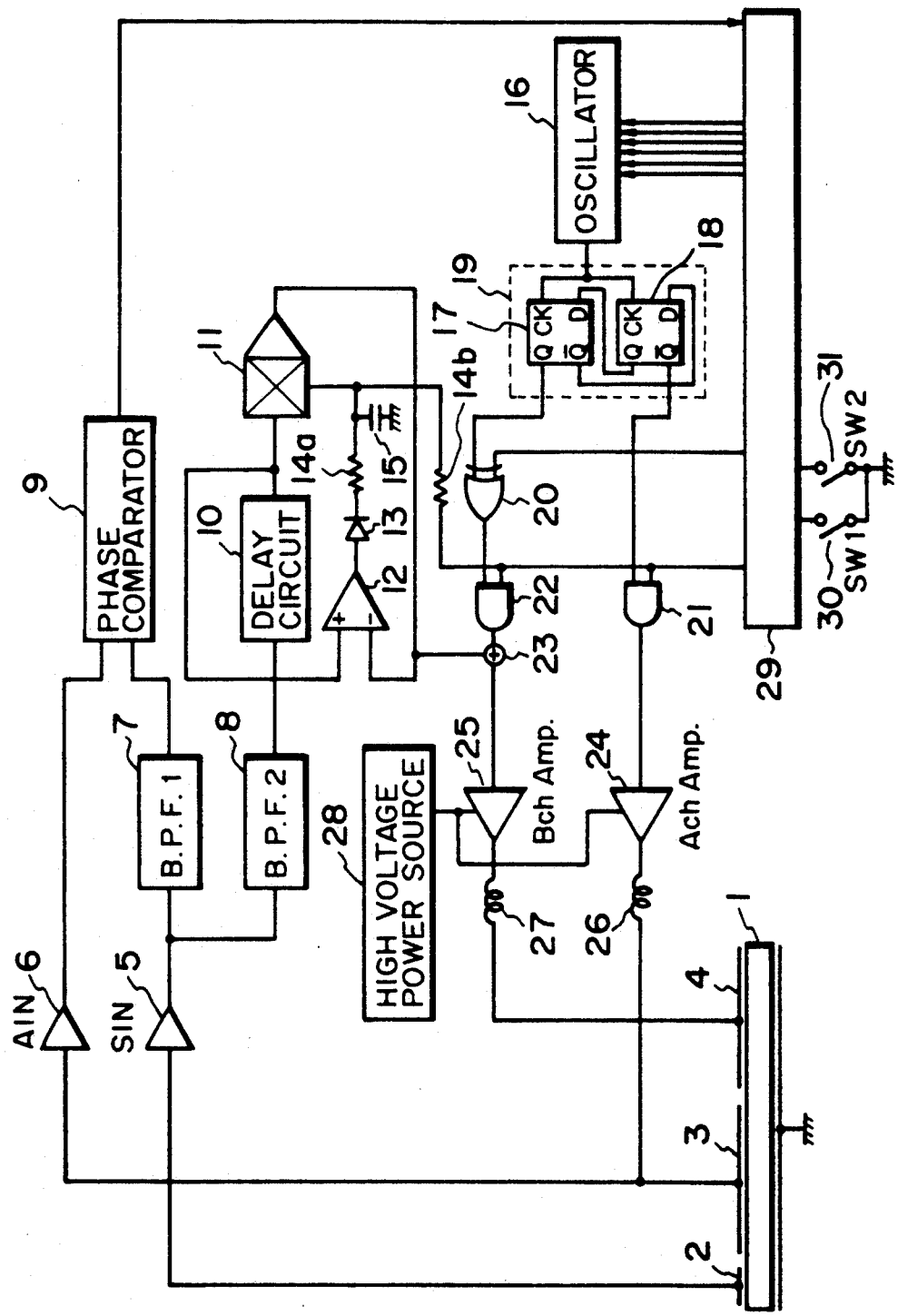
FIG. 1 is a block diagram showing an embodiment of the driving circuit of a vibration wave motor according to the present invention.

The present invention will hereinafter be described in detail with respect to embodiments thereof shown in the drawings.

FIG. 1 is a block diagram showing an embodiment of the driving circuit of a vibration wave motor according to the present invention.

In FIG. 1, an reference numeral 1 designates a vibration wave motor provided with the electrode 2 of a piezo-electric element for vibration detection (hereinafter referred to as the S phase electrode), an electric power inputting electrode 3 of an A piezo-electric element group (hereinafter referred to as the A phase electrode) and the electric power inputting electrode 4 of a B piezo-electric element group (hereinafter referred to as the B phase electrode). The reference numeral 5 denotes a vibration detecting amplifier (SINAmp) receiving a signal from the S phase electrode 2, the reference numeral 6 designates an amplifier (AINAmp) receiving a signal from the A phase electrode 3, the reference numerals 7 and 8 denote first and second band-pass filters (B.P.F.1; B.P.F.2), the reference numeral 9 designates a phase comparator, the reference numeral 10 denotes a delay circuit, the reference numeral 11 designates a multiplication circuit, the reference numeral 12 denotes a comparator, the reference numeral 13 designates a diode, the reference characters 14a and 14b denote resistors, the reference numeral 15 designates a capacitor, the reference numeral 16 denotes an oscillation circuit whose oscillation frequency is made variable by instructions from a microcomputer 29, the reference numeral 19 designates a ¼ frequency dividing circuit comprised of a first D flip-flop 17 and a second D flip-flop 18, the reference numeral 20 denotes an exclusive (EX-OR) OR circuit, the reference numeral 21 designates a first AND circuit, the reference numeral 22 denotes a second AND circuit, the reference numeral 23 designates an adder circuit, the reference numeral 24 denotes a first amplifier circuit for driving the A piezo-electric element group, the reference numeral 25 designates a second amplifier circuit for driving the B piezo-electric element group, the reference numerals 26 and 27 denote matching coils, the reference numeral 28 designates a high voltage power source, the reference numeral 29 denotes a microcomputer for controlling the operation of the entire circuit, the reference numeral 30 designates a start/stop switch (SW1) for giving instructions as to the driving and stoppage of the vibration wave motor, and the reference numeral 31 denotes a driving direction change-over switch (SW2) for changing over the direction of rotation of the vibration wave motor.

When the start stop switch (SW1) 30 is closed, the microcomputer 29 sets the oscillation frequency of the oscillation circuit 16 to the initial set value of a frequency higher than the resonance frequency of the vibration wave motor 1, and also outputs a high level signal "H" to the input terminal of one of the first and second AND circuits 21 and 22.

A signal output from the oscillation circuit 16 is divided into signals of ¼ frequency which are 90° out of phase with each other by the ¼ frequency dividing circuit 19, and one of the frequency-divided signals is input to one input terminal of the EX-OR circuit 20 and output to the second AND circuit 22. The other input terminal of the EX-OR circuit 20 is connected to the microcomputer 29, and by the driving direction change-over switch (SW2) 31 being closed or opened, a low level signal "L" or a high level signal "H" is output from the microcomputer 29 to the EX-OR circuit 20 to thereby change over the direction of rotation of the vibration wave motor.

The output of the first AND circuit 21 is input to the first amplifier 24 and the output of the second AND circuit 22 is input to the second amplifier 25 through the adder circuit 23. When the vibration wave motor 1 is producing no sound (this will be described later), the adder circuit 23 effects no addition and the output signal of the second AND circuit 22 is intactly input to the second amplifier circuit 25. The high voltage power source 28 supplies electric power to the first and second amplifiers 24 and 25. The outputs of the first and second amplifiers 24 and 25 are applied to the A phase electrode 3 and the B phase electrode 4, respectively, of the vibration wave motor 1 through the matching coils 26 and 27, respectively.

When the microcomputer 29 decreases the oscillation frequency f of the oscillation circuit 16 from the initial set value and the oscillation frequency f approaches the resonance frequency $f_{\gamma(n)}$ of the vibration wave motor 1, the phase relation between the output signal of the S phase electrode 2 and the output signal of the A phase electrode 3 approaches a predetermined value and therefore, a signal for indicating that the phase relation between the output signal of the S phase electrode 2 and the output signal of the A phase electrode 3 has approached a set value is output from the phase comparator 9 to the microcomputer 29. Consequently, the microcomputer 29 can make the oscillation frequency f of the oscillation circuit 16 approximate $f_{\gamma(n)}$. As a result, the vibration wave motor 1 can rotate stably.

Figure 2A:
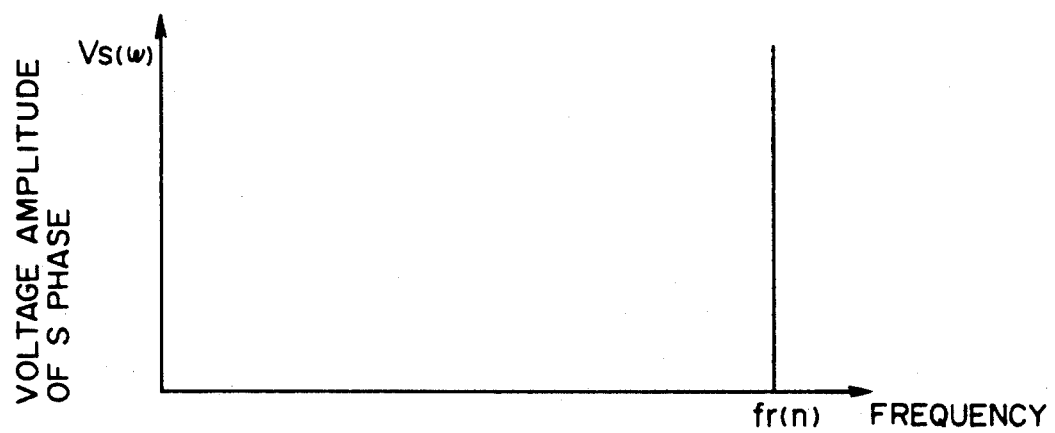
FIGS. 2A, 2B and 2C show the frequency characteristic of the vibration wave motor.
Figure 2B:
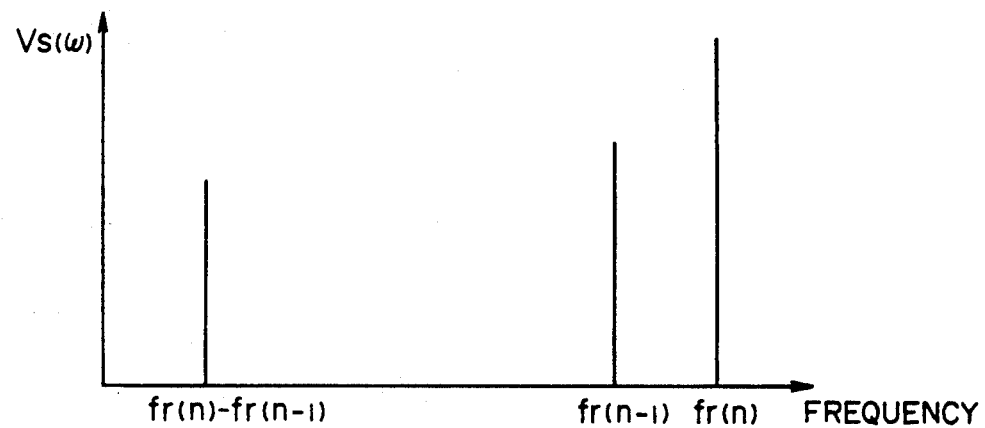
Figure 2C:
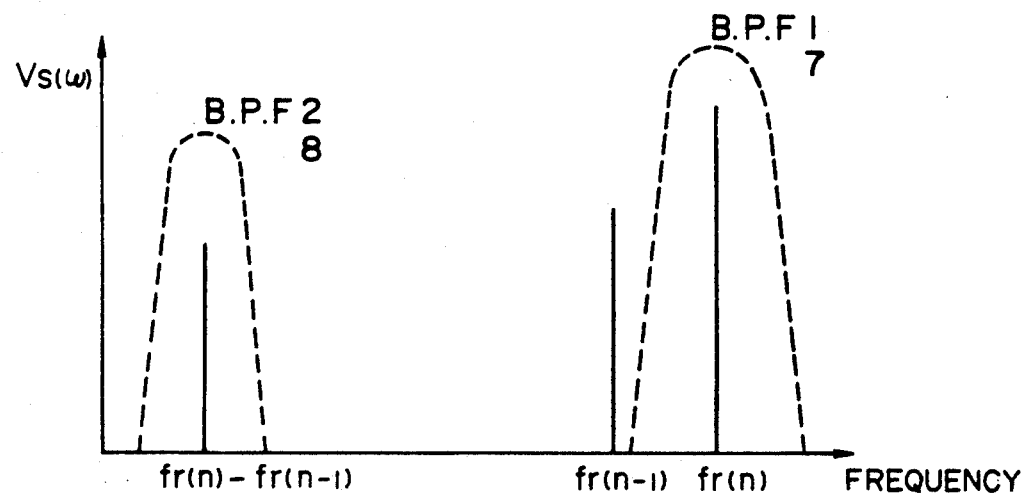

The operation of the motor when the vibration wave motor has produced a sound will now be discussed FIGS. 2A-2C are graphs showing the voltage and frequency output from t.he S phase electrode 2 during the operation of the vibration wave motor 1.

FIG. 2A shows the frequency spectrum when the vibration wave motor 1 is producing no sound, and only the resonance frequency $f_{\gamma(n)}$ of no waves is appearing.

FIG. 2B shows the frequency spectrum when the vibration wave motor 1 is producing a sound, and the resonance frequency $f_{\gamma(n-1)}$ of n−1 waves and a frequency component of $f_{\gamma(n)}-f_{\gamma(n-1)}$ created by the mixed modulation thereof are appearing.

FIG. 2C shows the characteristics of the band-pass filters for taking out the resonance frequency $f_{\gamma(n)}$ of n waves and the mixed modulated component $f_{\gamma(n)}-f_{\gamma(n-1)}$ as they are superposed upon the characteristic of FIG. 2(b).

The first band-pass filter (B.P.F.1) 7 has its center frequency adjusted to $f_{\gamma(n)}$, and the second band-pass filter (B.P.F.2) 8 has its center frequency adjusted to $f_{\gamma(n)}-f_{\gamma(n-1)}$.

Turning back to FIG. 1, when the vibration wave motor 1 has produced a sound, the frequency component of $f_{\gamma(n)}-f_{\gamma(n-1)}$ is input to the delay circuit 10 by the second band-pass filter (B.P.F.2) 8.

The delay circuit 10 has a time delay so as to be able to negate the frequency component $f_{\gamma(n)}-f_{\gamma(n-1)}$ of the sound output from the S phase electrode 2 just when it is applied to the B phase electrode 4. This delay time is determined by the fact that an audible sound is created by the fluctuation of the torque load of the motor and a variation in the pressure force of the moving member and vibration member, the fact that there is the rotation of the phase by the band-pass filters and the fact that there is a phase difference in position between the A phase and the S phase. The comparator 12 compares the output voltage of the delay circuit 10 with the output voltage of the multiplication circuit 11, and the output thereof is half-wave-rectified by the diode 13, is integrated by the resistor 14a and the capacitor 15, and is input to the multiplication circuit 11. Consequently, when the output of the delay circuit 10 is great, the output of the multiplication circuit 11 also is great.

The output of the multiplication circuit 11 is applied to the adder circuit 23.

Figure 3:
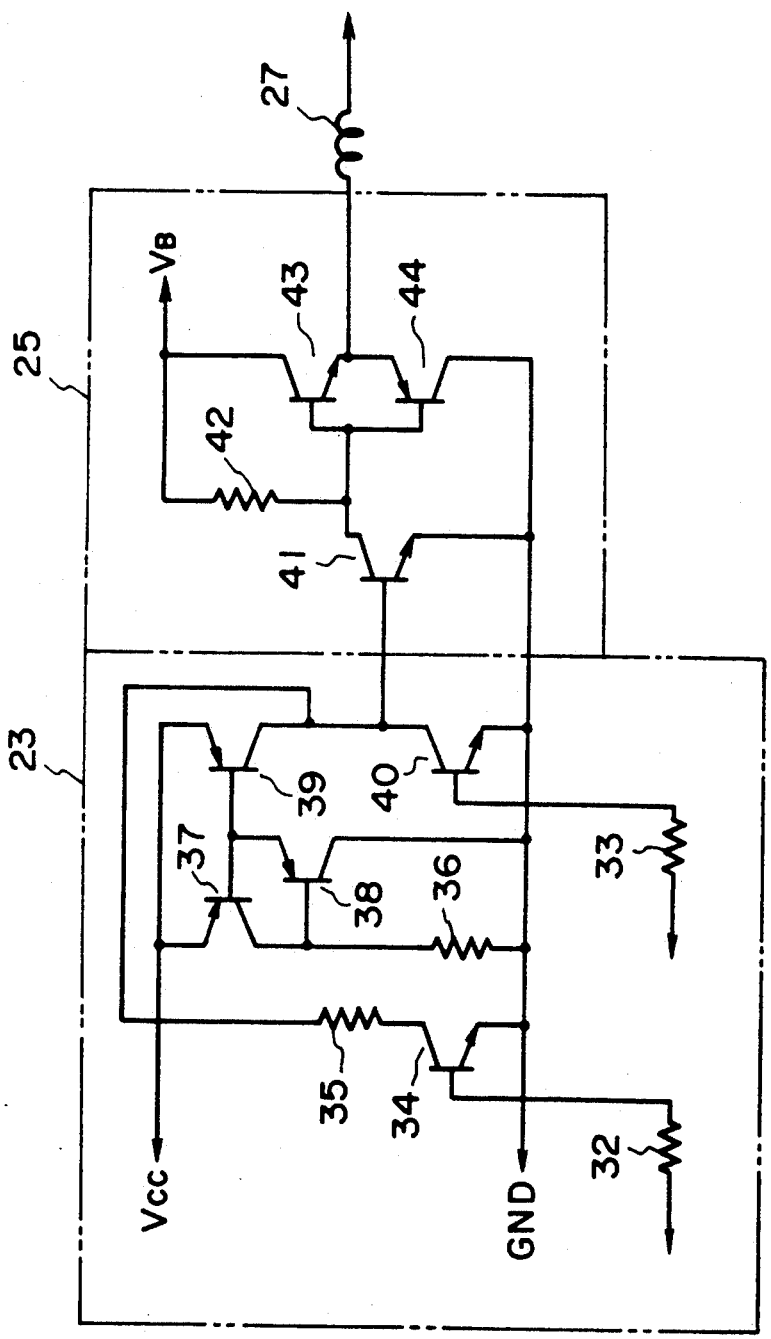
FIG. 3 is a circuit diagram showing an adder circuit and a second amplifying circuit in FIG. 1.

FIG. 3 shows a circuit diagram of the adder circuit 23 and the second amplifier circuit 25.

In FIG. 3, the reference numerals 32, 33, 35, 36 and 42 designate resistors, the reference numerals 34, 40, 41 and 43 denote nPn transistors, and the reference numerals 37, 38, 39 and 44 designate PnP transistors. The emitter current of the transistor 37 is determined by the power source voltage Vcc and the resistor 36. Since the transistor 37 and the transistor 39 together constitute a current mirror circuit, the emitter current of the transistor 39 also is equal to the emitter current of the transistor 37.

When there is no output of the multiplication circuit 11, the transistor 34 is OFF and therefore, the base current applied to the transistor 41 is substantially equal to the emitter current of the transistor 39.

When there is the output of the multiplication circuit 11, the transistor 34 conducts in accordance with that output. Consequently, the collector current of the transistor 39 is divided into a part which flows through the resistor 35 to the transistor 34 and a part which flows to the base of the transistor 41 or to the transistor 40.

Consequently, when there is the output of the multiplication circuit 11, the transistor 41 cannot be saturated and thus, is modulated by the output of the multiplication circuit 11.

In this manner, signals of the frequency components of $f\gamma(n)$ and $f_{\gamma(n)}-f_{\gamma(n-1)}$ can be applied to the B phase electrode 4.

Consequently, the frequency component $f_{\gamma(n)}-f_{\gamma(n-1)}$ of the sound is applied to the B phase electrode 4, whereby the sound produced by the vibration wave motor 1 can be negated.

Figure 4:
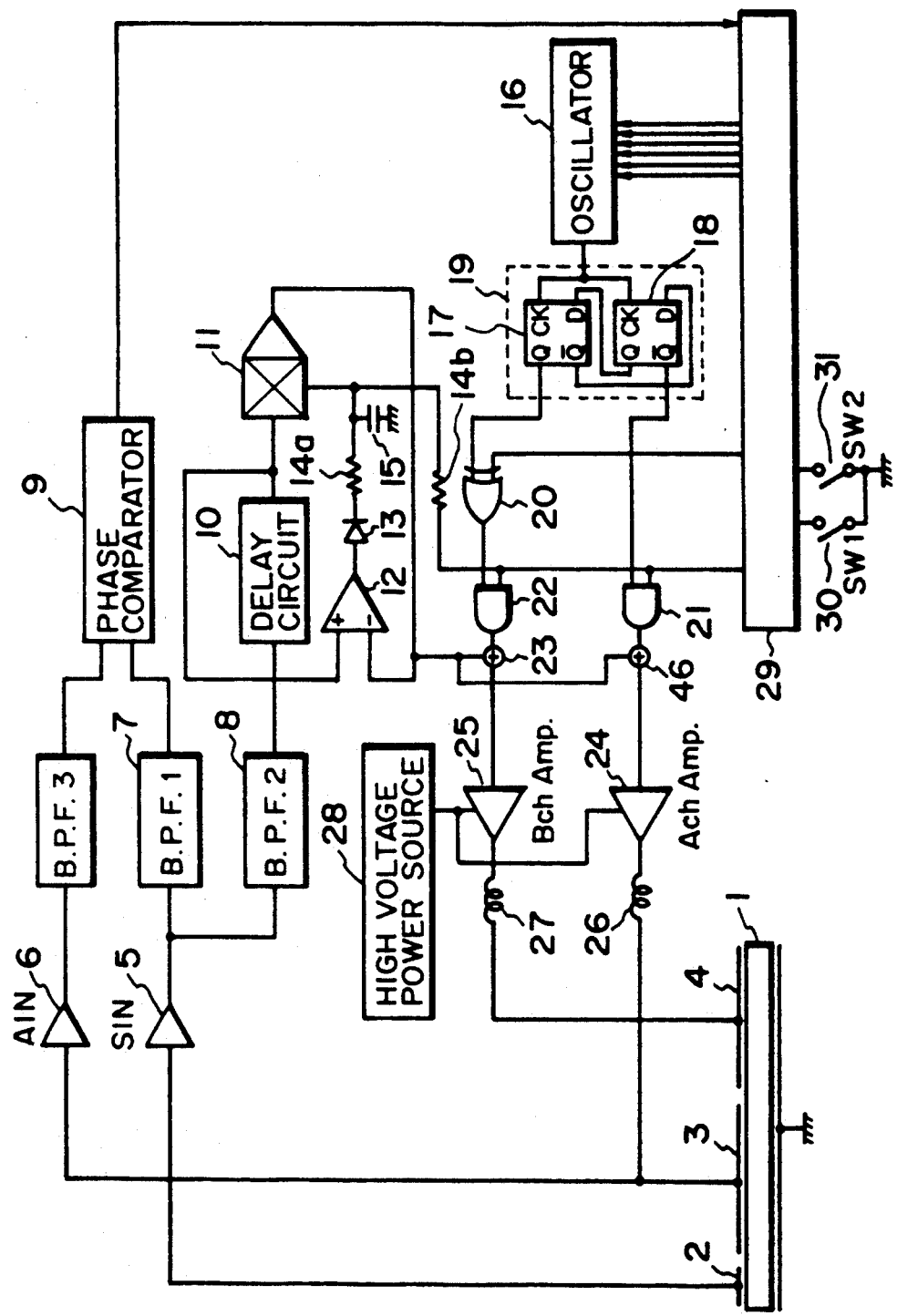
FIG. 4 is a circuit diagram showing another embodiment of the present invention.

FIG. 4 shows another embodiment. The present embodiment has an adder circuit 46 and a band-pass filter (B.P.F.3) 45 added to the circuit shown in FIG. 1, and the basic operation thereof is the same as that of the aforedescribed embodiment, but a circuit for negating the audible frequency voltage is provided not only on the B phase side, but also on the A phase side.

Each of the above-described embodiments uses piezo-electric elements as electro-mechanical energy converting elements, but alternatively may use electrostrictive elements.

Figure 5A:
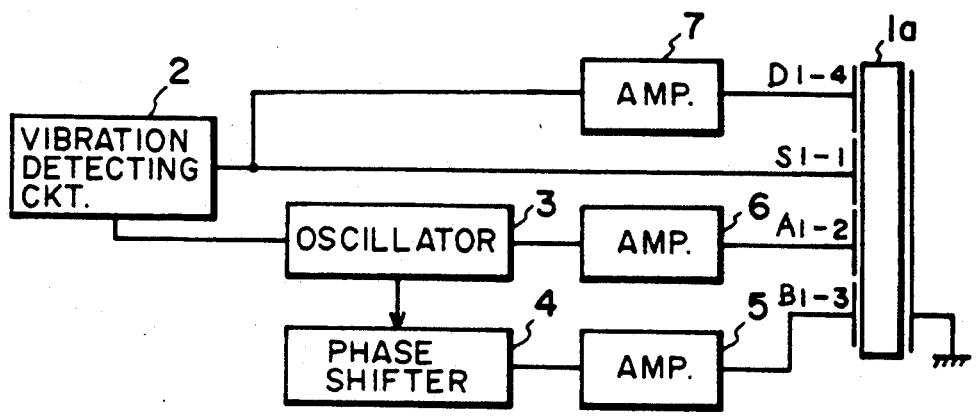
FIG. 5A is a circuit block diagram showing another embodiment of the vibration wave motor according to the present invention.
Figure 6:
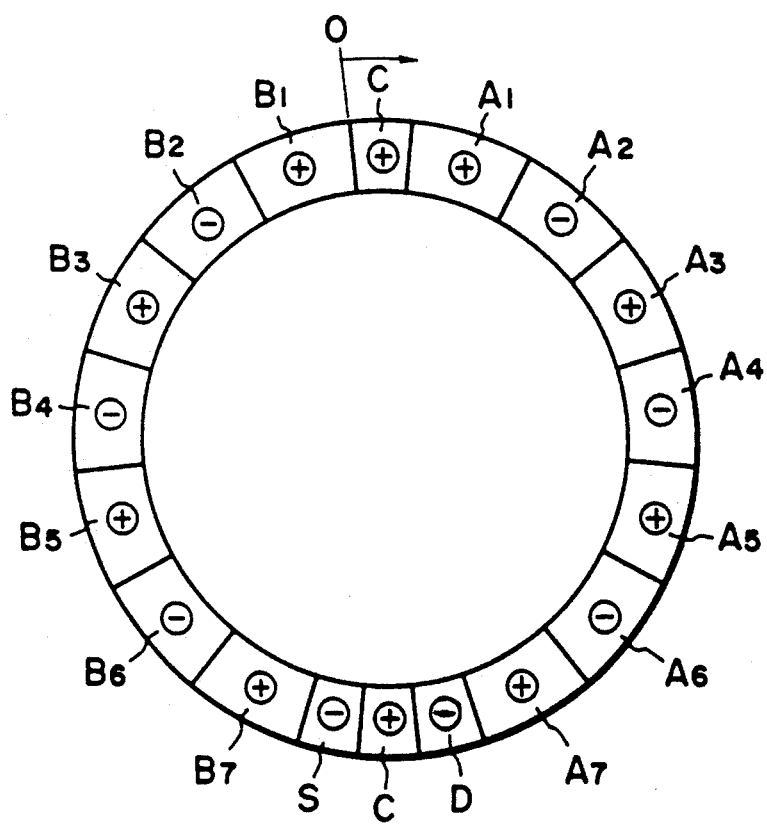
FIG. 6 shows the electrode pattern of the vibration wave motor shown in FIG. 5.

FIG. 5A is a block diagram of another embodiment of the present invention, and FIG. 6 is a plan view showing the electrode pattern of the vibration wave motor thereof.

Figure 32:
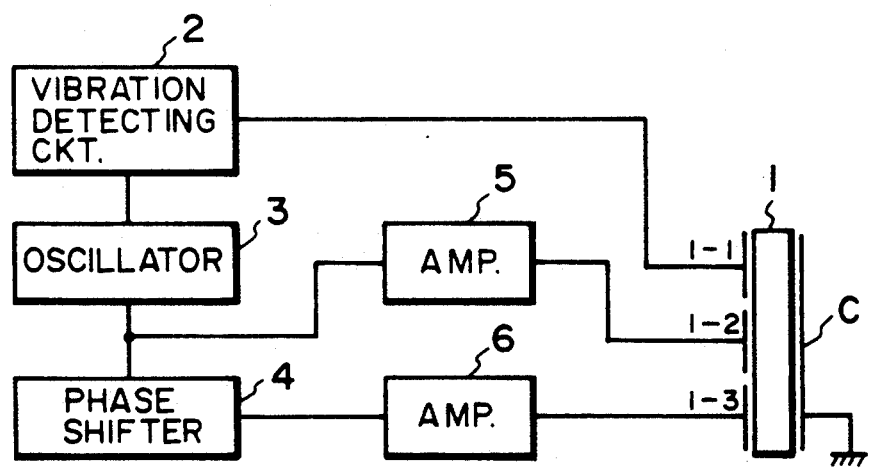
FIG. 32 is a circuit block diagram of a conventional vibration wave motor.
Figure 33:
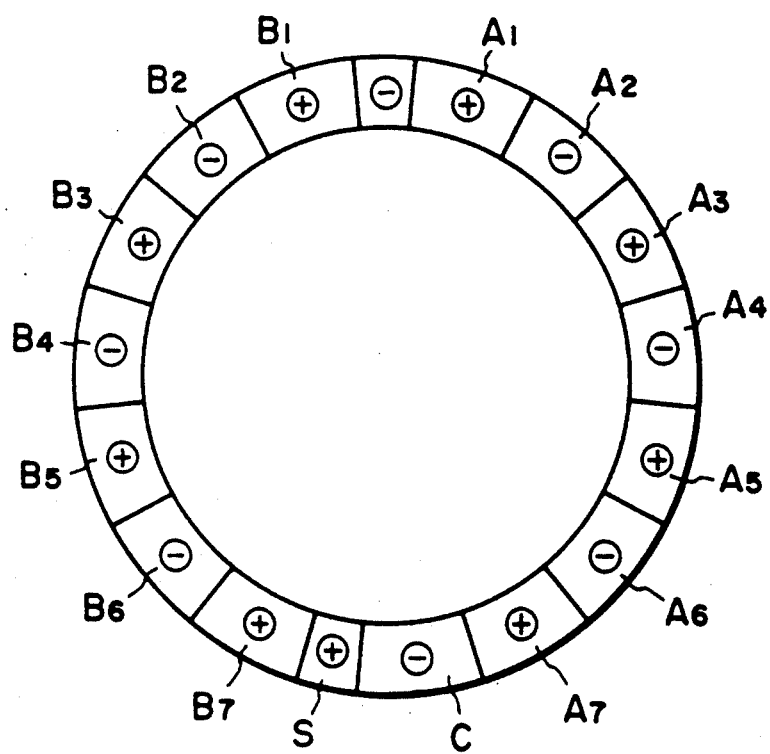
FIG. 33 shows the electrode pattern of a conventional vibration wave motor.

The vibration wave motor of the present embodiment is similar to the example of the prior art shown in FIG. 32 in that an A phase piezo-electric element group 1-2 and a B phase piezo-electric element group 1-3 are provided on a ring-like vibration member 1a as shown in FIG. 6 ($A_1$-$A_7$; $B_1$-$B_7$) so as to form eight travelling vibration waves and an oscillator 3 is drive-controlled on the basis of the detection information from an S phase piezo-electric element 1-1 so that the A phase piezo-electric element group 1-2 and the B phase piezo-electric element group 1-3 are driven through an amplifier 5, a phase shifter 4 and an amplifier 6, but in the present embodiment, an unnecessary vibration suppressing piezo-electric element D polarization-treated to the negative pole (indicated by the reference numeral 1-4 in FIG. 5) is further secured to the vibration member 1a.

The detection signal from the S phase piezo-electric element 1-1 is amplified so as to drive this unnecessary vibration suppressing piezo-electric element 1-4.

That is, the present embodiment is such that the detection signal of the travelling vibration wave detected in the S phase is applied to the unnecessary vibration suppressing piezo-electric element 1-4, thereby negating any unnecessary vibration and maintaining a normal vibration mode of eight waves.

Figure 5B:
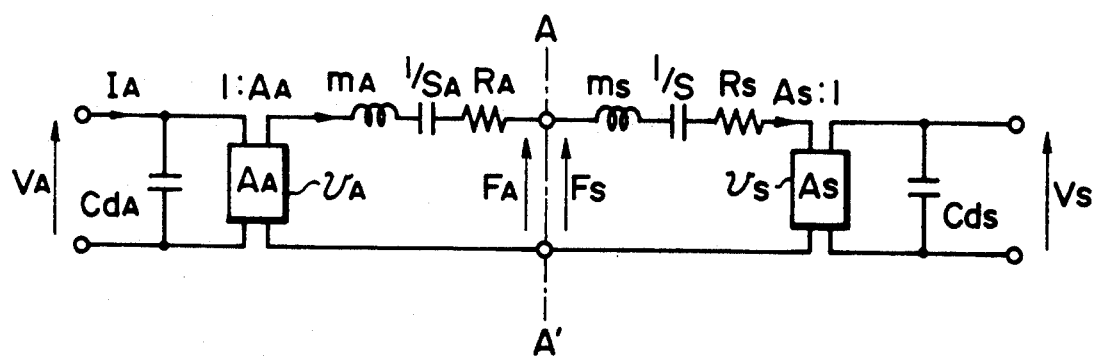
FIG. 5B shows the equivalent circuit of the A phase and B phase of the vibration wave motor.

The equivalent circuit of the A phase and the S phase of the thus constructed vibration wave motor is shown in FIG. 5B.

In FIG. 5B, the left of line A—A' shows the A phase, and the right of the line A—A' shows the S phase.

Cd [F]: braking capacity
A [v/N]: force coefficient
m [kg]: concentration constant of the mass of the vibration system
1/S [N/m]: concentration stiffness of the vibration system
R [NS/m]: concentration constant of the loss of the vibration system
F [N]: extraneous force in the vibration system
v [m/S]: velocity of the mass point in the vibration system
I [A]: electric current flowing into the piezo-electric elements
V [A]: voltage applied to the piezo-electric elements The extraneous force F and the electric current I are given by the following equations:

$$F = -A \cdot V + Z_m \cdot V \quad (1)$$

$$= Y_d \cdot V + A \cdot v \quad (2)$$

where $$Z_m = R + j\left(\omega m - \frac{1}{\omega S}\right)$$

$$Y_d = j\omega C_d \text{ \{admittance [S]\}}$$

That is, in the A phase, when the extraneous force $F_A = 0$, $A_A \cdot V_A = Z_{mA} \cdot V_A$ During the resonance of $$\omega = \frac{1}{\sqrt{m \cdot S}}, A_A \cdot V_A = R_A \cdot v_A$$

Here, $A_A$ and $R_A$ are real numbers and therefore, the driving voltage $V_A$ of A phase and the movement velocity $V_A$ of the mass point are of the same phase.

Also, in the S phase, from $I = 0$, $-Y_d V_S = A_S v_S$. Assuming that $V_A = v_S$, $$V_S = \frac{A_s v_s}{-j\omega C_{dS}} = j\frac{A_s v_s}{\omega C_{dS}}$$

Consequently, $V_S$ is more advanced by 90° than $v_S$, and $V_S$ is more advanced by 90° than $V_A$.

Figure 7:
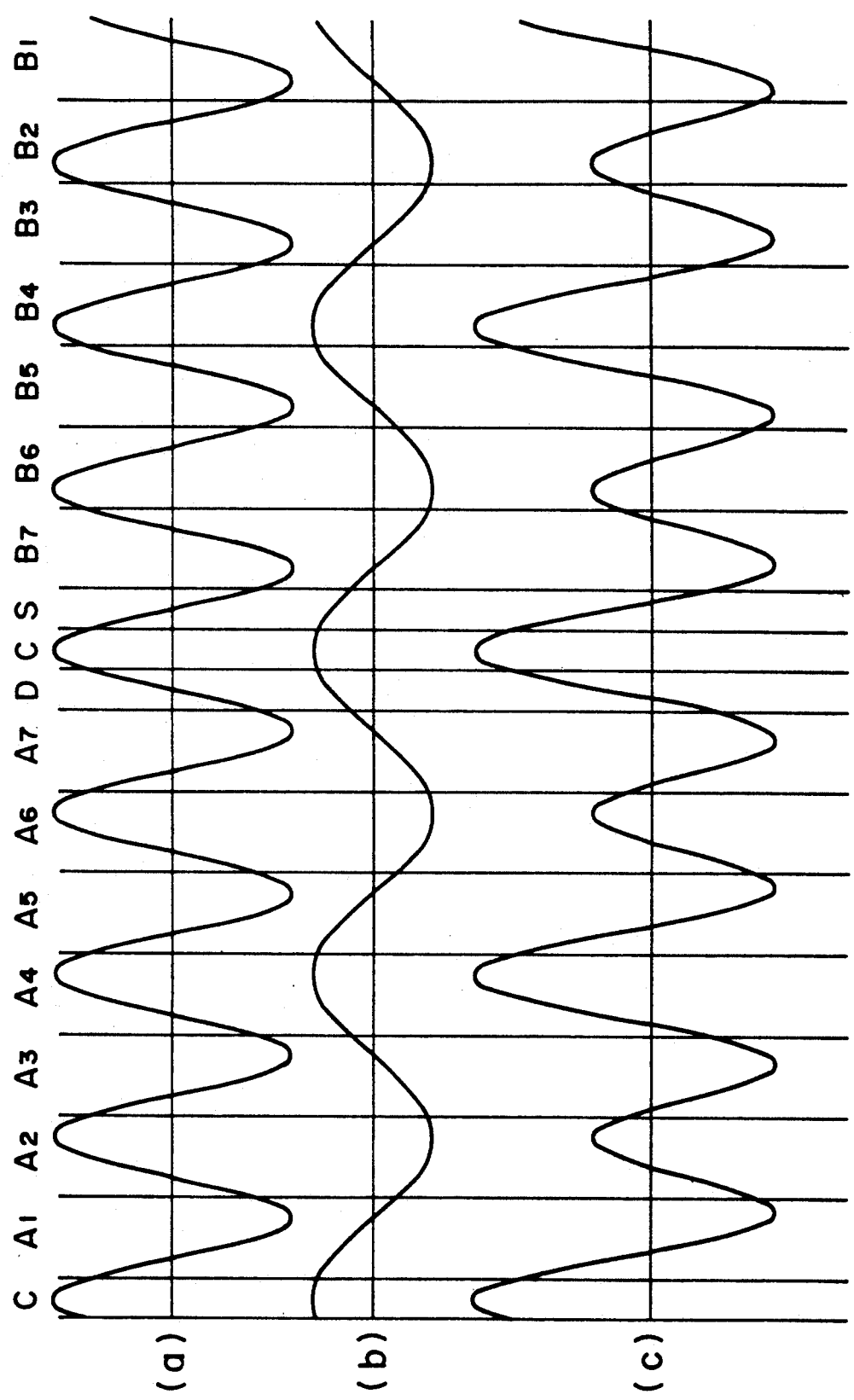
FIG. 7 is a waveform graph showing a state in which unnecessary vibration of four waves is engendered for the driving of eight waves.

The waveform graph when in the thus constructed vibration wave motor of the present embodiment, vibration of four waves has been added as an example of the unnecessary vibration is shown in FIG. 7.

This waveform graph shows the vibration of each portion at a moment when the crests of eight waves and four waves overlap the center positions of the C electrodes C, and in FIG. 7, (a) shows the state of the vibration of each portion of eight waves, (b) shows the state of the vibration of each portion of four waves, and (c) shows the state of the combined vibration. When during the driving of the vibration wave motor, vibration of four waves is caused by some reason or other, the waveform observed is the waveform of (c) in FIG. 7, but the combination of vibrations can be regarded as being substantially linear and therefore can be decomposed into (a) and (b) of FIG. 7.

Here, considering the phase relation between the driving voltage and the produced vibration from the aforementioned basic equation (1) of piezo-electricity, if the relation between the S phase and D phase is the same as the relation between the A phase and the S phase, the voltage and the movement velocity of the mass point are of the same phase and therefore, when it is desired to suppress vibration, a voltage of the opposite phase to the movement velocity may be applied to the unnecessary vibration suppressing piezo-electric element 1-4.

Considering now the S phase for detecting vibration from the aforementioned basic equation (2) of piezo-electricity, the voltage produced is more advanced by 90° than the movement velocity of the mass point and thus, as compared with displacement, the voltage produced is more advanced by 180°.

Accordingly, it becomes possible to suppress unnecessary waves by applying to the D phase a signal taken out from a position of the wave which is advanced by 90°.

That is, the S phase and the D phase can be provided at a position distant by a distance x which satisfies the following condition:

$$\Phi_m = 2\pi \times \frac{m}{l} = \frac{1}{2}\pi + 2a\pi$$

where λ is the circumferential length of the vibration member, Φm is the phase difference between waves to be suppressed (wave number m), and a is an integer.

In the case of the present embodiment, the equivalent positions of the vibration detecting S phase piezo-electric element and the unnecessary vibration suppressing piezo-electric element D deviate by 90° from each other and thus, the signal taken out from the S phase piezo-electric element can be input to the unnecessary vibration suppressing piezo-electric element D.

A specific example of the circuit of the amplifier 7 for the unnecessary vibration suppressing piezo-electric element D shown in FIG. 5 may be a simple non-converting amplifier circuit using an operational amplifier, but may also desirably be a circuit construction as shown in FIG. 8 from which an output current can be much taken out.

In the polarization pattern shown in FIG. 6, the S phase and the D phase are of the same pole, but where they are of different poles as shown in FIG. 9, if the amplifier shown in FIG. 8 is used, four waves which ought to be unnecessary will conversely be vibrated due to the difference in the direction of polarization between the S phase and the D phase and therefore, in such a case, 90° phase shifters may be provided before and behind the amplifier 7 or an amplifier of circuit construction of inverting amplification as shown in FIG. 10 may be used to drive the unnecessary vibration suppressing piezo-electric element D.

Also, the present embodiment is shown with respect to a case where four travelling waves travel from left to right, but a case where the travelling waves travel in the opposite direction is also conceivable and therefore, in that case, a switching circuit may be used to allot the D phase for vibration detection and the S phase for suppression of unnecessary vibration, whereby a similar effect can be obtained.

Figure 27:
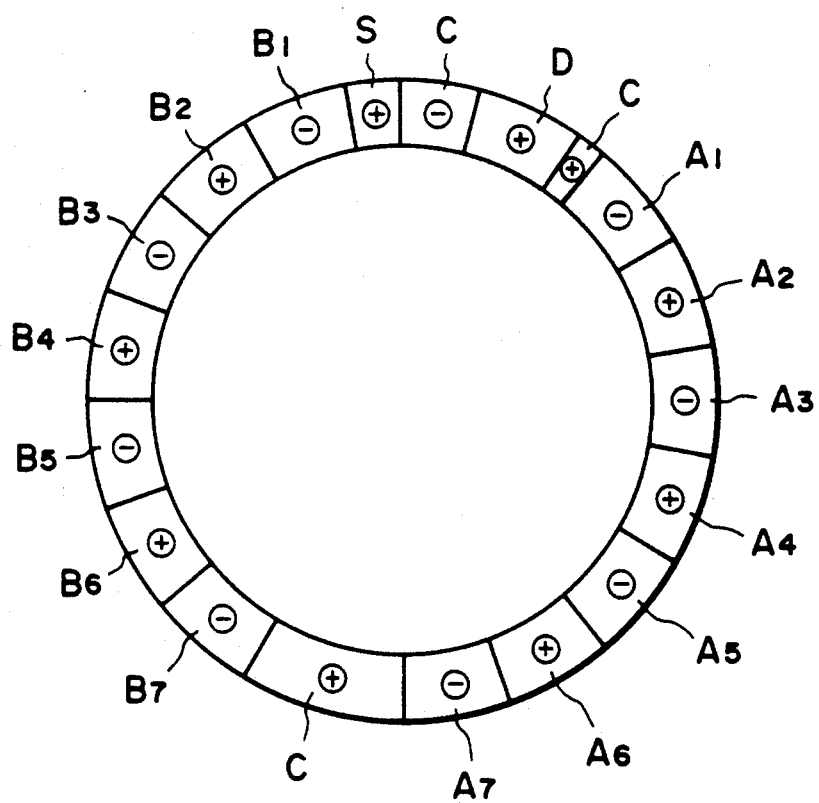
FIG. 27 shows another example of the electrode pattern of the FIG. 6 embodiment.
Figure 28:
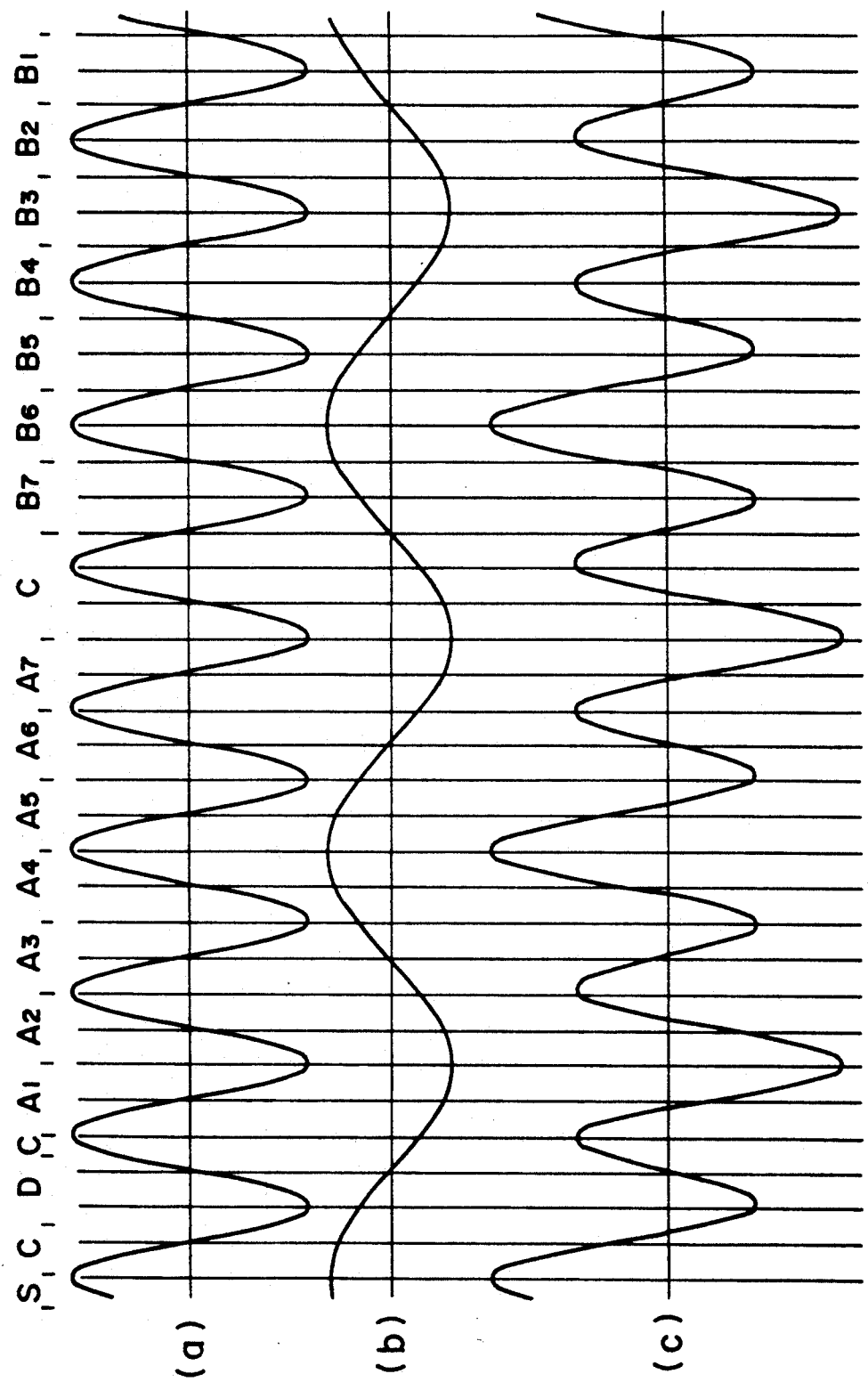
FIG. 28 is a waveform graph showing a case where unnecessary vibration of three waves is produced during the driving of nine waves.

FIG. 27 shows the electrode pattern of a nine-wave drive vibration wave motor, and FIG. 28 shows the waveform graph when unnecessary vibration of three waves has occurred. Here, if the phase difference between the driving waves is set to Φn and the distance x between the S phase and the D phase is set to x=λ/12, $$\text{from } m = 3, \Phi_m = 2\pi \frac{l}{12} \cdot \frac{3}{l} = \frac{1}{2}\pi$$

$$\text{from } m = 9, \Phi_n = 2\pi \frac{l}{12} \cdot \frac{9}{l} = \frac{3}{2}\pi = -\frac{1}{2}\pi + 2\pi$$

and therefore, if the output of the S phase is intactly amplified and input to the D phase, three waves which constitute unnecessary vibration can be suppressed and nine waves which are the driving waves are produced and thus, an improvement in the output can be achieved.

When in FIG. 7 showing the above-described embodiment, the phase difference between the S phase and the D phase of eight waves is considered, there is a phase difference of 180° and there is a phase difference of 180° between the vibration displacement in the S phase and the produced voltage, and a positional phase difference of 180° is added thereto and after all, the voltage input to the D phase and the vibration displacement on the D phase are of the same phase and thus, the vibration and phase of eight waves engendered on the motor differ from each other and tend to engender new waves of equal frequency, and this is not preferable.

Figure 11:
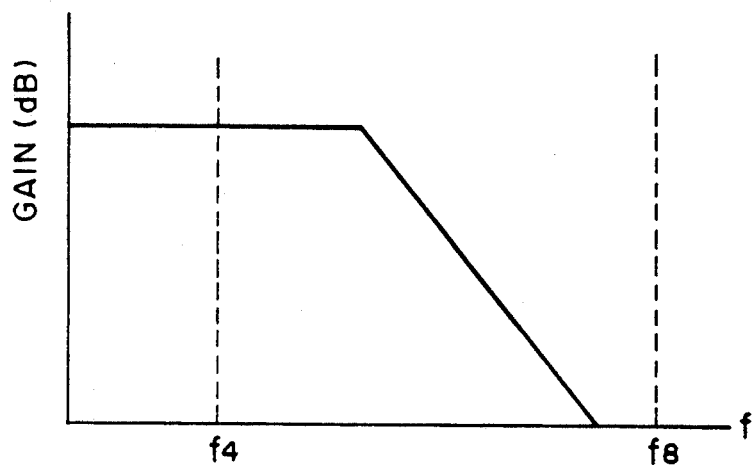
FIG. 11 is a graph showing the attenuation characteristic of a filter used in the embodiment of FIG. 12.
Figure 12:
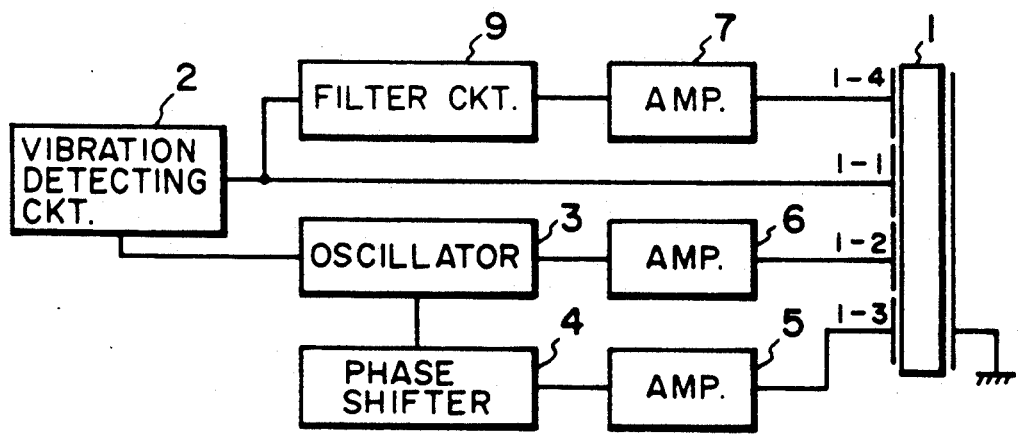
FIG. 12 is a circuit block diagram of another embodiment of the present invention.

FIG. 12 shows the construction of an embodiment constructed to make it possible to suppress unnecessary four waves without affecting the vibration of eight waves in any way. In this construction, a detection signal from the S phase is amplified by an amplifier 7 through a low-pass filter 8 so as to drive the unnecessary vibration suppressing piezo-electric element D, and the low-pass filter 8 has a cut-off frequency between the frequency $f_8$ of eight waves and the frequency $f_4$ of four waves, as shown in FIG. 11.

That is, by inputting to the D phase a signal passed through the low-pass filter 8 having the cut-off frequency as shown in FIG. 11, it is possible to suppress unnecessary four waves without affecting eight waves in any way.

Each of the above-described embodiments is a case where the driving mode is eight waves and the unnecessary vibration is four waves, and in such case, the positional phase difference between the S phase and the D phase is 90° or 180° and therefore, it is possible to apply the signal detected by the S phase directly to the D phase. However, the unnecessary vibration is not limited to four waves, but there is a case where it is of other mode, that is, as shown, for example, in FIG. 13 (wherein, as in FIG. 7, it is to be understood that waves travel from left to right), six waves shown in (b) are created relative to eight waves shown in (a) and travelling waves shown in (c) are created. In such case, the six waves in the S phase are advanced by 135° relative to the D phase and therefore, by applying the signal from the S phase directly to the D phase as in the circuit construction of the embodiment shown in FIG. 5, it is not possible to obtain a sufficient vibration suppressing effect.

Figure 14:
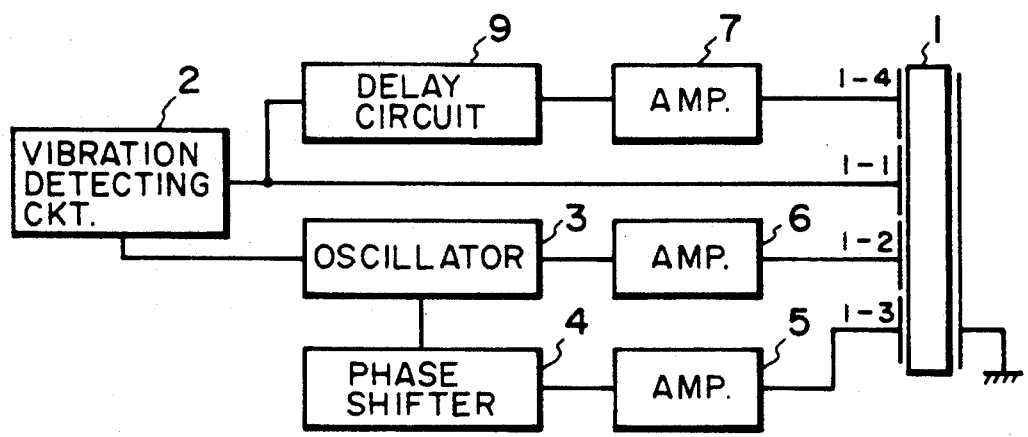
FIG. 14 is a circuit block diagram of another embodiment of the present invention.

FIG. 14 is a block diagram showing an embodiment for coping with six waves. In this embodiment, the signal from the S phase 1-1 is output to an amplifier 7 through a delay circuit 9 of a delay time Δt so as to drive the unnecessary vibration suppressing piezo-electric element D.

The delay time Δt of this delay circuit 9 can be set to such Δt that satisfies the following relation:

$$\Phi_6 = 2\pi \times \frac{6}{l} - 2\pi f_6 \cdot \Delta t = \frac{1}{2}\pi + 2a\pi$$

where $f_6$ is the frequency of six waves, x is the center interval between the S phase and the D phase, λ is the circumferential length of the motor (the vibration member), and a is an integer. $\Phi_6$ indicates the phase difference between the six waves.

Figure 13:
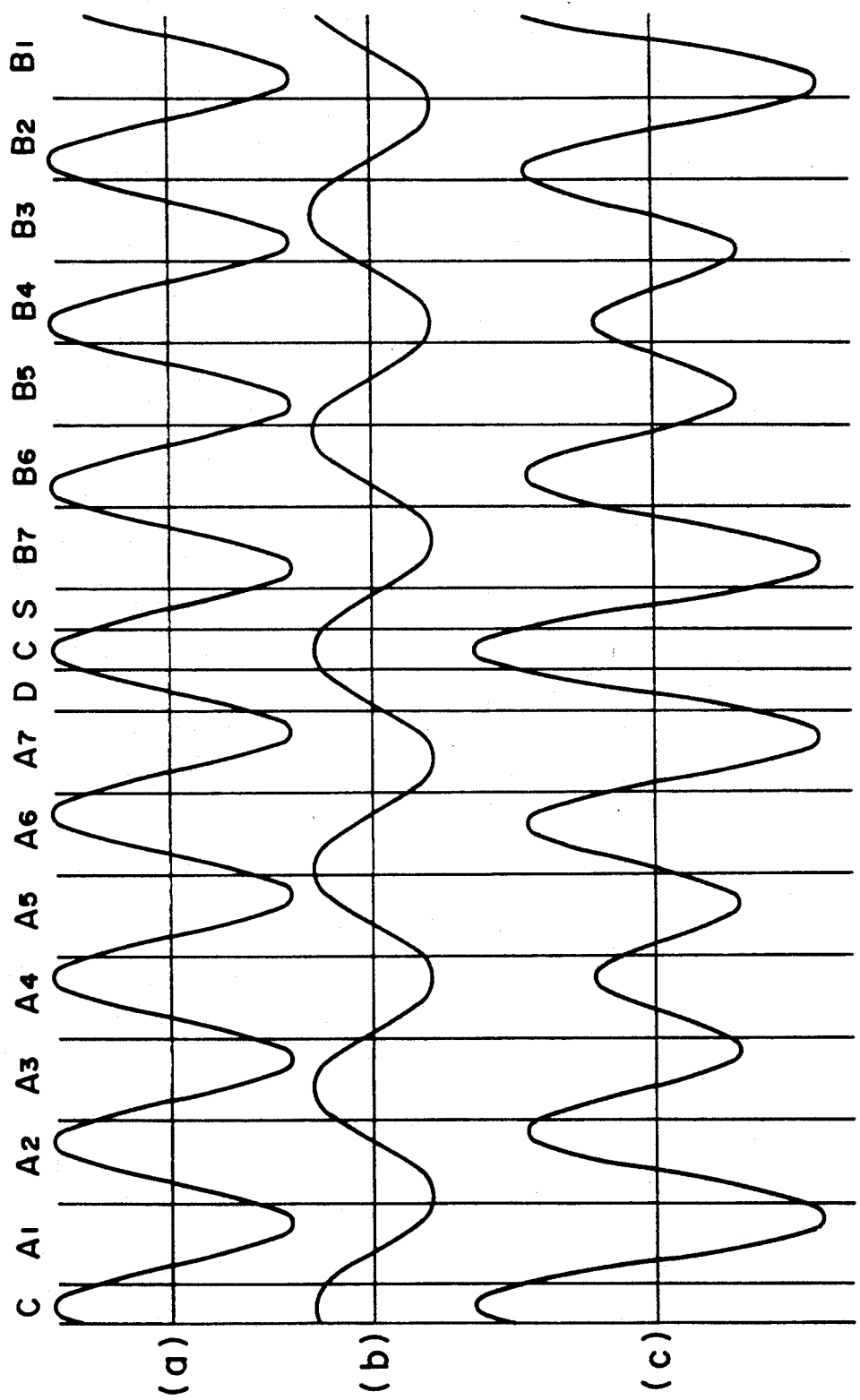
FIG. 13 is a waveform graph for illustrating the embodiment of FIG. 14.

The direction of travel of the six waves has been described as the direction from left to right in FIG. 13, but where the direction of travel of the six waves is opposite, a similar effect can be obtained by reversing the functions of the S phase and the D phase as in the case of the aforedescribed four waves, and a similar effect can be obtained by changing over Δt to such Δt that satisfies the following relation:

$$\Phi_6 = 2\pi \times \frac{6}{l} + 2\pi f_6 \cdot \Delta t = \frac{1}{2}\pi + 2a\pi$$

The delay circuit 9 may conveniently be an active type device such as a CCD or a BBD (bucket bricade device) which can change the delay time, but it is also possible to use a delay line.

As regards also the eight waves for driving, in order not to affect vibration, it is preferable to set Δt to such Δt that, with the direction of rotation being also taken into account, satisfies the following relation:

$$\Phi_8 = 2\pi \times \frac{8}{7} \pm 2\pi f_8 \cdot \Delta t = -\frac{1}{2}\pi + 2b\pi$$

where $f_8$ is the frequency of the eight waves, and b is an integer. However, it is often difficult to satisfy the conditions of the six waves and the eight waves at one time. In such a case, it is desirable to provide a filter on the input side or the output side of the delay circuit or on both sides, and attenuate the frequency of the eight waves.

Figure 15:
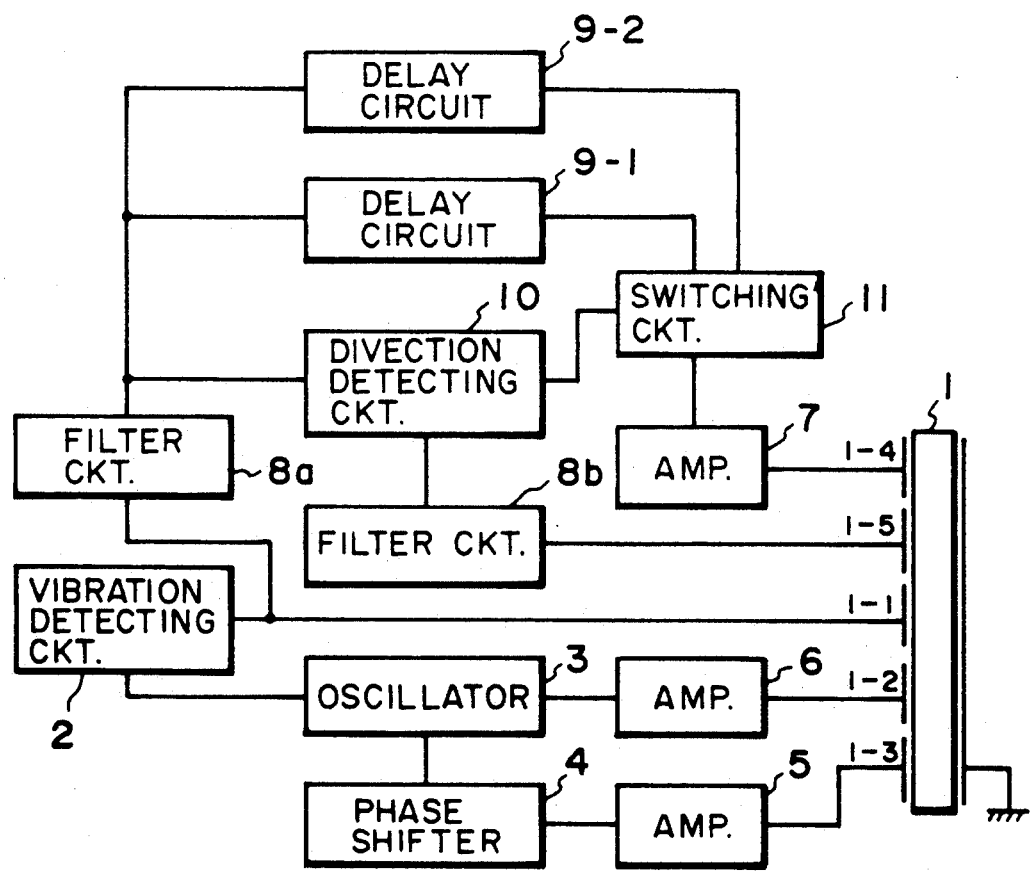
FIG. 15 is a circuit block diagram showing a modification of the FIG. 14 embodiment.

A circuit block diagram in that case is shown in FIG. 15.

In the circuit shown in FIG. 15, the signal from the S phase 1-1 and the signal from the C phase 1-5 are used as vibration detection signals, and two delay circuits 9-1 and 9-2 each comprising a delay line are provided and also, two filter circuits 8a and 8b each having a cut-off frequency between $f_6$ and $f_8$, and the signals from the S phase 1-1 and the C phase 1-5 are passed through the filter circuits 8a and 8b, respectively, to thereby take out a signal of six waves only as shown in (b) in FIG. 13, and by the signal from the C phase 1-5 taken out from the filter circuit 8b, the direction of travel of the six waves is detected in a direction detecting circuit 10, and in conformity with this detected direction of travel of the six waves, one of the two delay circuits 9-1 and 9-2 is selected by a switching circuit 11, and the signal from the filter circuit 8a is delayed by a selected delay time, and the D phase 1-4 is driven by an amplifier 7.

The direction detecting circuit 10 can be comprised, for example, of two comparators and a D-flip-flop circuit.

Figure 16:
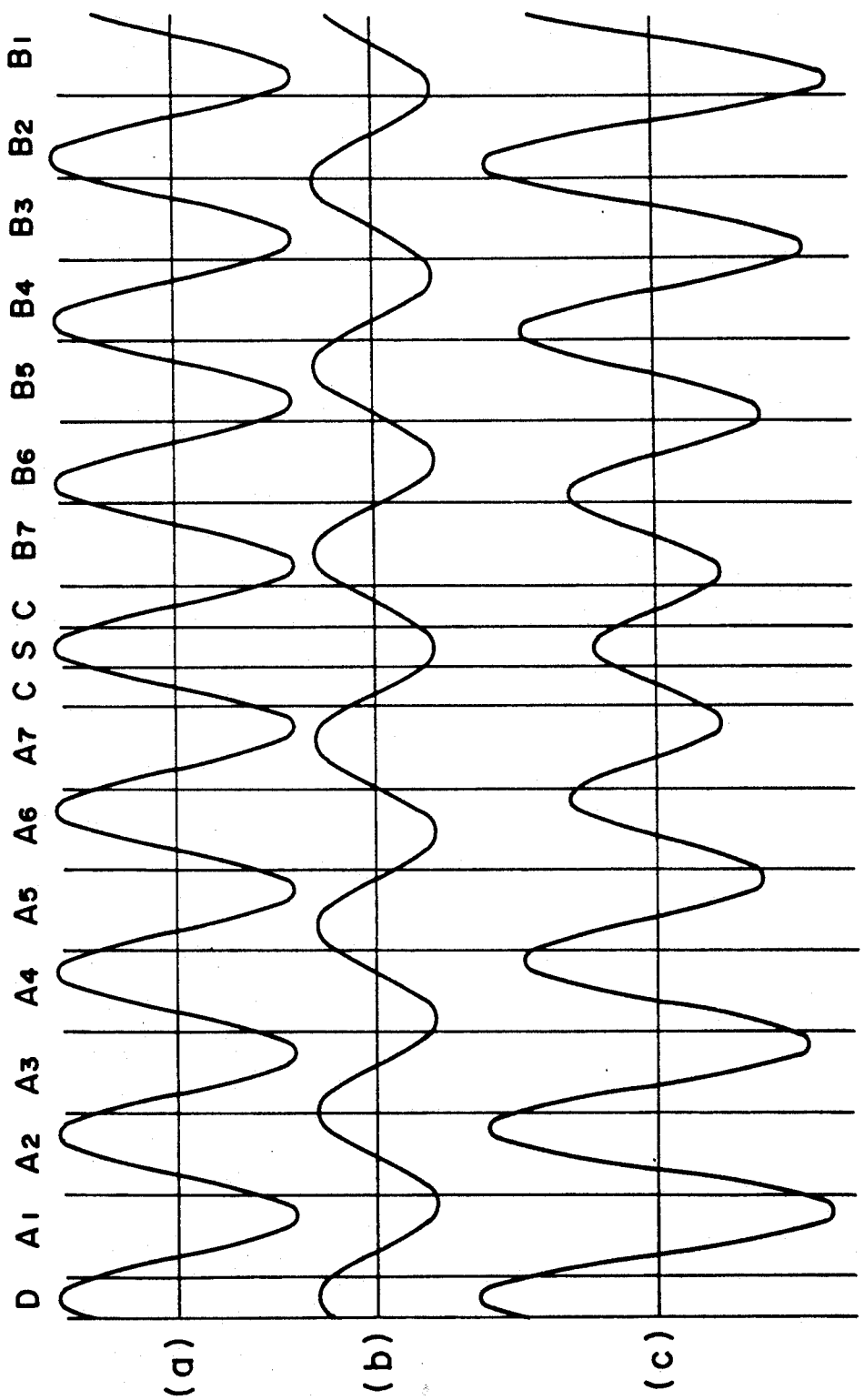
FIG. 16 is a waveform graph for illustrating the embodiment of FIG. 18.

In the above-described circuit shown in FIG. 15, the direction of travel of unnecessary vibration is detected by the signal after passed through the filter circuit 8b, but where the frequency of unnecessary vibration and the frequency of driving are very approximate to each other, it is sometimes difficult to remove the signal of driving frequency by the use of a filter. For example, in a case c where, as shown in FIG. 16, seven waves of unnecessary vibration shown in (b) are mixedly present in eight waves of driving shown in (a), a highly accurate filter of high order becomes necessary to separate the eight waves and the seven waves from each other, and this cannot be said to be suitable for practical use. In such a case, a signal taken out from a point spaced apart by an integer times ½ of the wavelength of unnecessary vibration can be phase-shifted and input to the unnecessary vibration suppressing piezo-electric element D.

That is, the S phase for vibration detection can be provided at a position x which satisfies $$\Phi_7 = 2\pi \times \frac{7}{l} = a\pi. \text{ (a is an integer.)}$$

Figure 17:
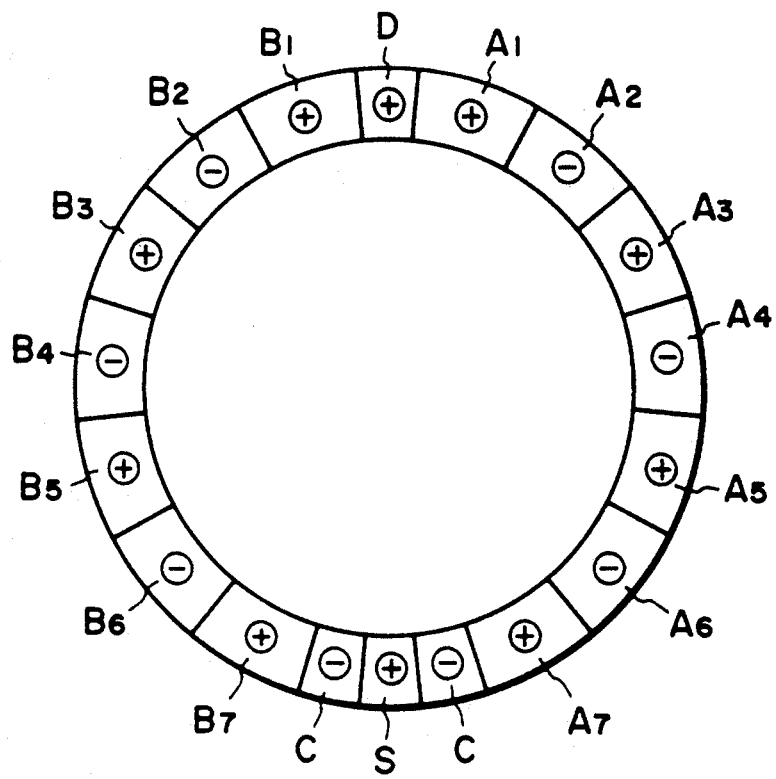
FIG. 17 shows the electrode pattern of the embodiment of FIG. 18.

Further, considering the eight waves of driving, it is preferable that $$\Phi_8 = 2\pi \times \frac{8}{l} = b\pi, \text{ (b is an integer.)}$$

and furthermore, if the phase difference between the light waves and the seven waves is $$\Phi_{8-7} = 2\pi \times (8-7)/\lambda = \pi + 2c\pi,$$

this means that between the S phase for vibration detection and the D phase for suppression of unnecessary vibration, the eight waves are of the same phase, the seven waves are of the opposite phase or the two are in opposite relationship, and if the phase shifter is set in a direction for suppressing the seven waves of unnecessary vibration, the eight waves of driving will be in a direction for adding to vibration, and this is very convenient. FIG. 17 shows an electrode pattern which satisfies such a positional relation between the S phase and the D phase, and FIG. 18 shows a block diagram of a driving circuit therefor.

Figure 18:
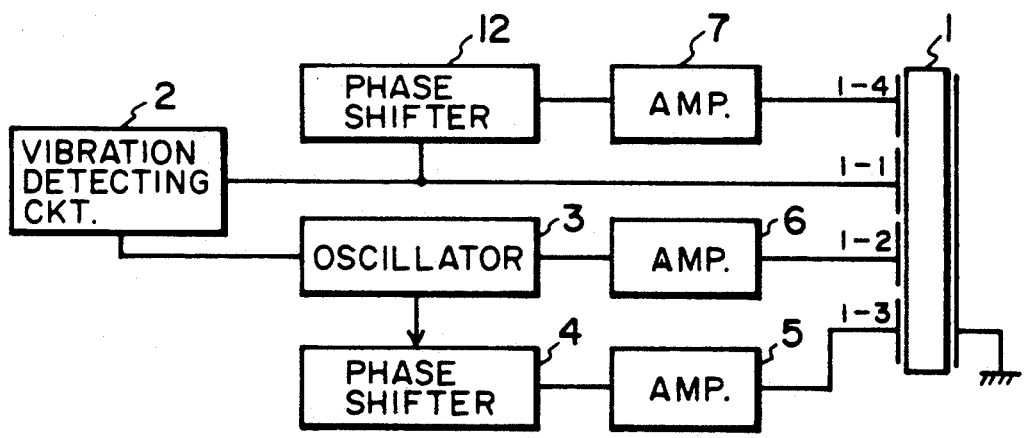
FIG. 18 is a circuit block diagram of another embodiment of the present invention.

In the driving circuit of FIG. 18, a phase shifter 12 is provided at the preceding stage of an amplifier 7, and the signal from the S phase is phase-shifted by this phase shifter 12 and the D phase is driven by the amplifier 7, and the phase shifter 12 can be comprised of a differential circuit, an integrating circuit or a differential circuit and an integrating circuit.

Figure 19:
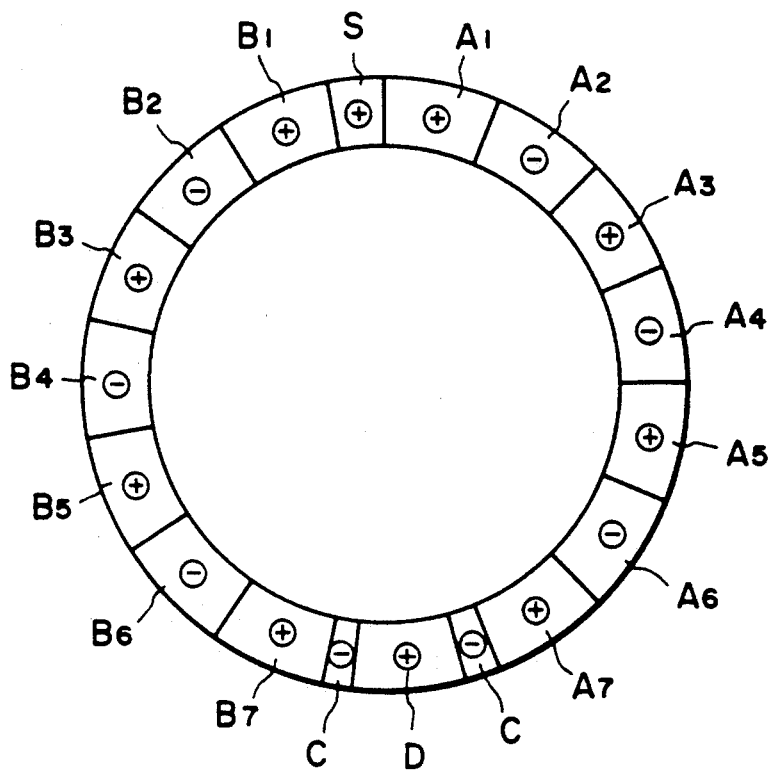
FIGS. 19, 20, 21 and 22 show other examples of the electrode pattern of the motor.
Figure 20:
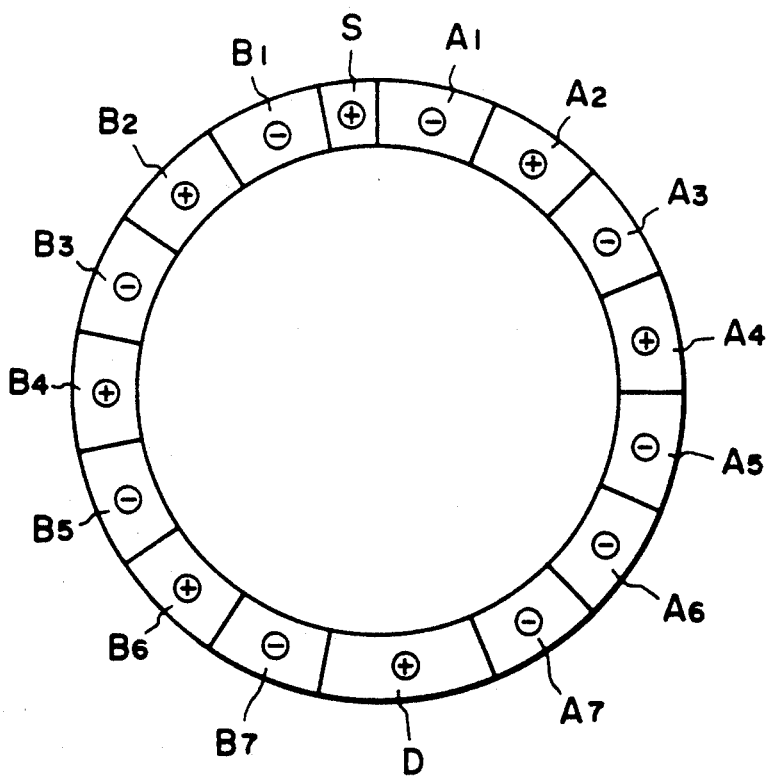
Figure 21:
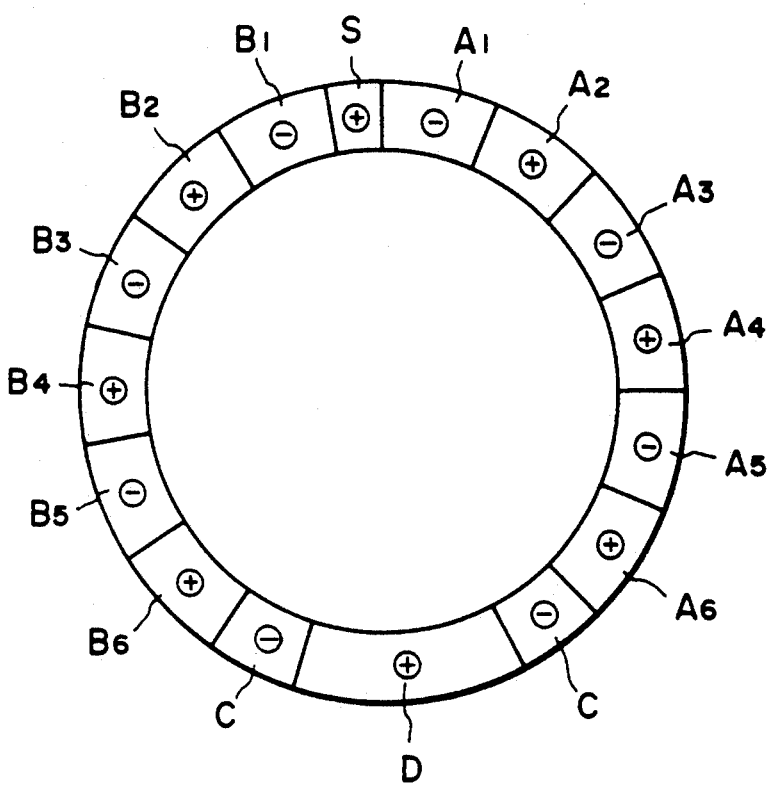

The area of the D phase for suppression of unnecessary vibration may desirably be of the order of one-half wavelength of unnecessary vibration (the width thereof is fixed), but if a construction is adopted in which the eight waves of driving are vibrated as in each of the aforedescribed embodiments, the area of the D phase for suppression of unnecessary vibration may preferably be of the order of one-half wavelength of the eight waves, as shown in FIG. 19. However, when the driving frequency signal can be sufficiently attenuated by a filter as when the unnecessary vibration is four waves, as shown in FIG. 21, the electrode area for unnecessary vibration suppression may be an electrode area conforming to the wavelength of the unnecessary vibration, irrespective of the wavelength of the eight waves.

Figure 22:
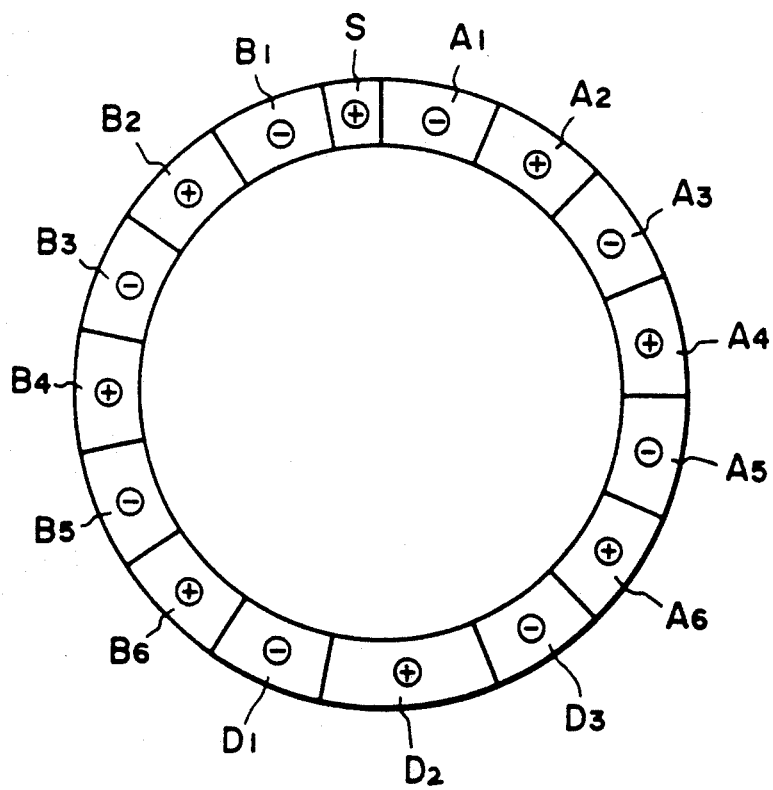

If the electrode area can be secured sufficiently relative to one-half wavelength, it is also possible to use a plurality of electrodes $D_1$, $D_2$ and $D_3$ as the phase for suppression of unnecessary vibration, as shown in FIG. 22.

Where the limitation of the electrode area which can be used for other than the driving phase for the resonance driving of eight waves is severe, one or both of the phase D for suppression of unnecessary vibration and the phase S for vibration detection can be formed of a piezo-electric high molecular material such as PVDF.

Figure 23:
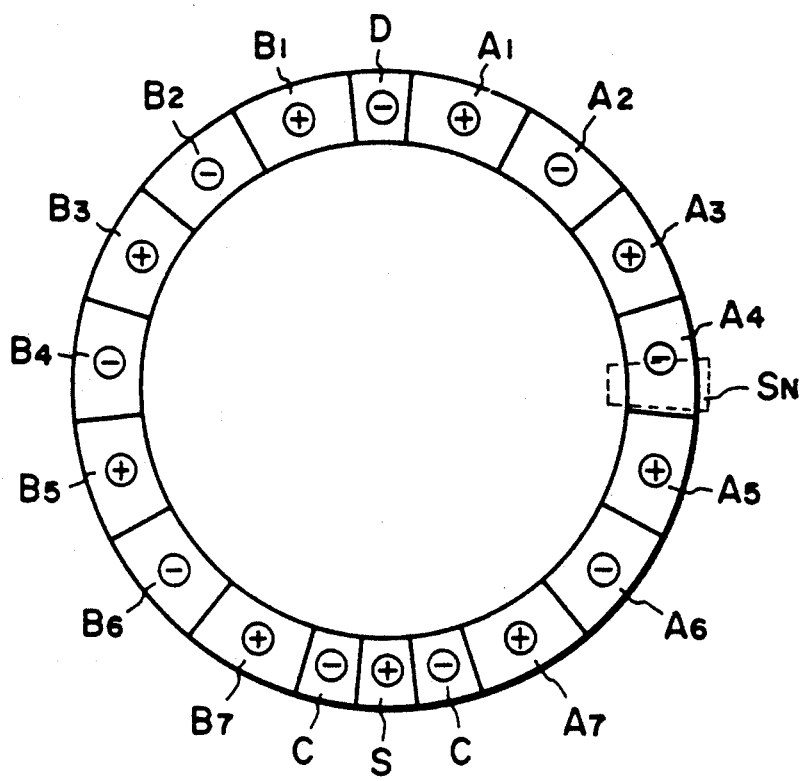
FIG. 23 shows the electrode pattern of the embodiment of FIG. 24.

FIG. 23 shows the electrode pattern of a vibration wave motor using PVDF for a vibration detecting phase $S_N$.

Assuming that in the present embodiment, unnecessary vibration is six waves, the position of the vibration detecting phase $S_N$ made of PVDF which is indicated by broken line in FIG. 23 and the position of the D phase are of the same phase with respect to eight waves, and are of the opposite phases with respect to six waves and therefore, it becomes possible to suppress the six waves and vibrate the eight waves simply by phase-shifting the phase $S_N$ by 90°.

Figure 24:
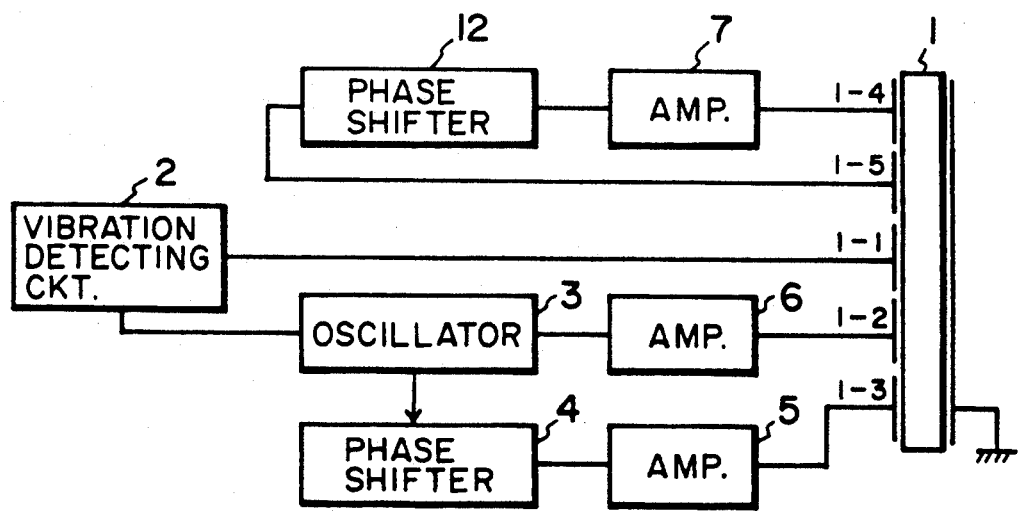
FIG. 24 is a circuit block diagram of another embodiment of the present invention.

The circuit block diagram in this case is shown in FIG. 24. That is, the signal from the $S_N$ phase 1-5 is applied to the D phase by an amplifier 7 through a 90° phase shifter 12.

The embodiment of FIG. 25 is an embodiment for effecting the suppression of unnecessary vibration when there is a plurality of wave numbers of unnecessary vibration.

In FIG. 25, the signal from the S phase 1-1 is divided into two lines through two delay circuits 9-1 and 9-2 differing in delay time from each other, the signal of one delay circuit 9-1 is output to an adder 13, the signal of the other delay circuit 9-2 is output to the adder 13 through a filter circuit 8, and the signal of the adder 13 is output to the D phase 1-4.

That is, such setting that satisfies the relation between the respective wave numbers of unnecessary vibration and the driving waves is affected, and the respective signals are added and amplified to drive the D phase 1-4, thereby suppressing the unnecessary vibration.

Also, as shown in FIG. 26, the signal from the S phase 1-1 may be divided into two lines through two filter circuits 8-1 and 8-2 and two phase shifters 12-1 and 12-2, and they may be added and amplified by an adder 13 and output to the D phase 1-4, whereby a similar effect can be obtained.

In the circuits shown in FIGS. 25 and 26, there are provided filter circuits, but these may be provided as required with the phase relation between the driving waves and other unnecessary vibration taken into account with respect to each unnecessary vibration.

Figure 29:
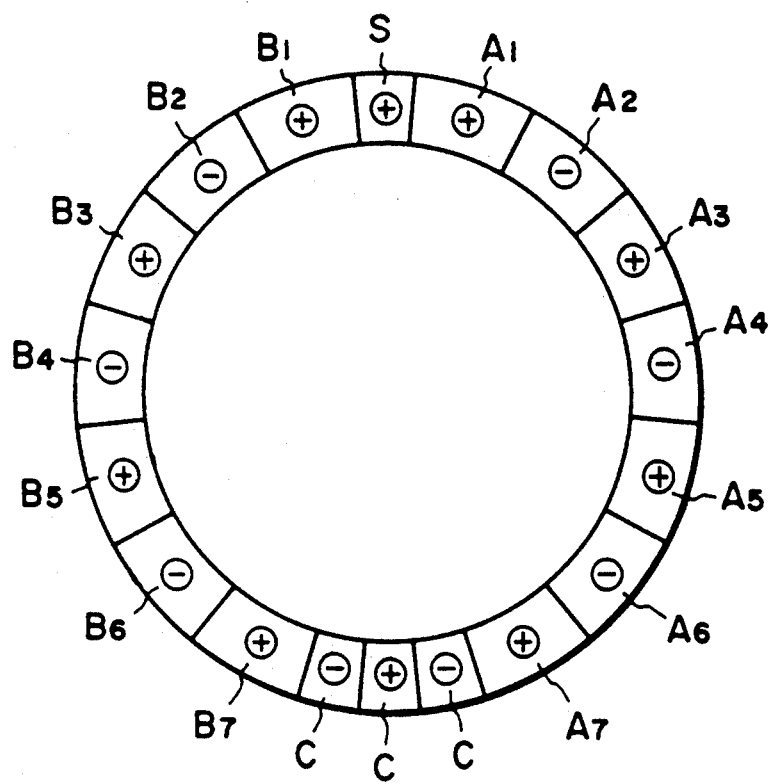
FIG. 29 shows the electrode pattern of the vibration wave motor of the embodiment of FIG. 31.

In each of the above-described embodiment, there is provided the driving phase D exclusively for suppression of vibration, and an electrode pattern for enabling the A phase which is the driving phase to be used also as the driving phase for suppression of vibration is shown in FIG. 29.

Figure 30:
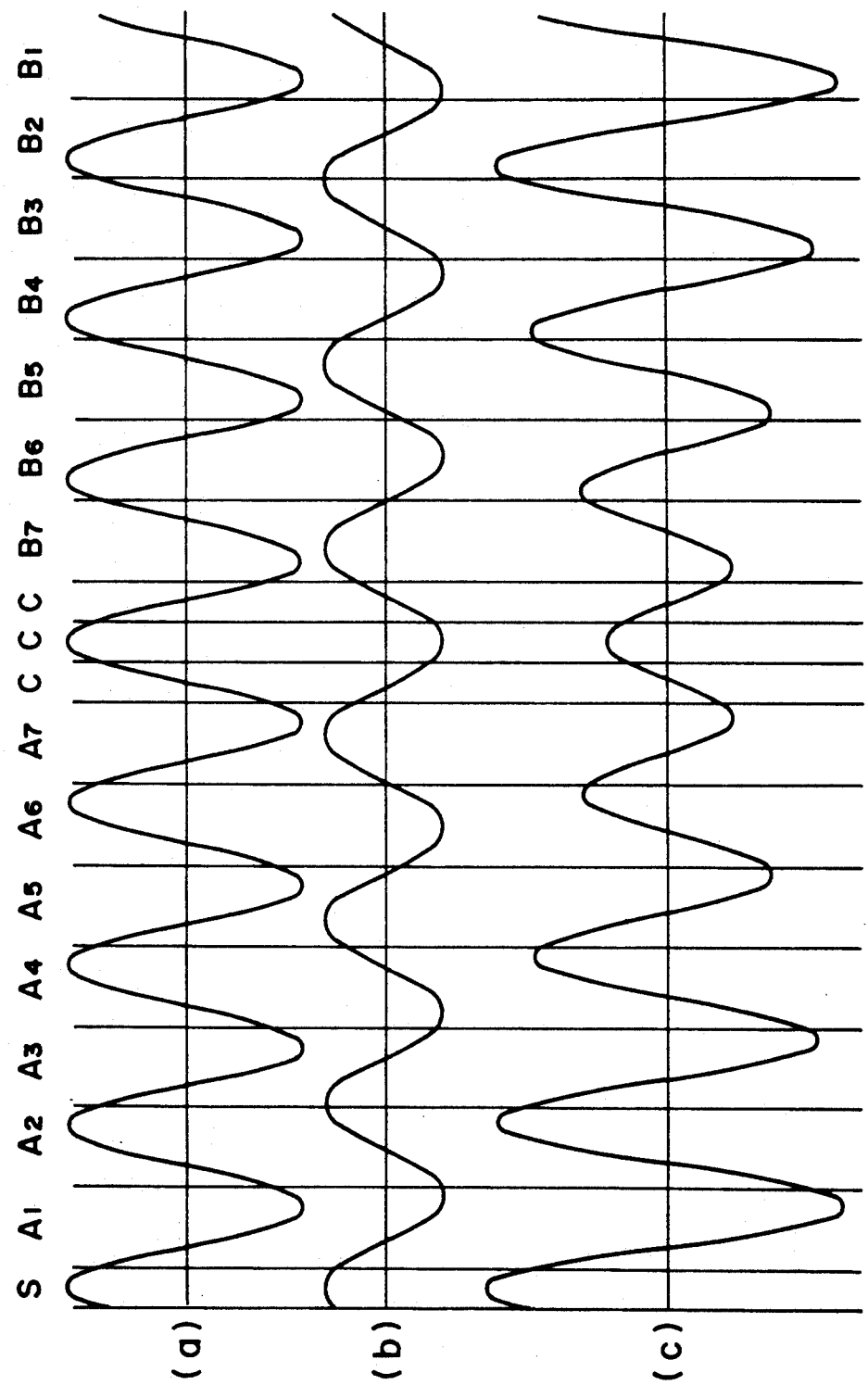
FIG. 30 is a waveform graph for illustrating the embodiment of FIG. 31.

The waveform graph when unnecessary vibration of seven waves has been engendered in a vibration wave motor having such an electrode pattern (driving of eight waves) is shown in FIG. 30.

In this case, if the suppression of unnecessary vibration is to be effected by the use of the A phase, assuming that the circumferential length of the vibration member is $\lambda$, the distance x between the center of the A phase for driving and the center of the S phase for vibration detection is $x = 15/64\ \lambda$ and therefore, $$\Phi_7 = 2\pi \frac{15}{64} / \frac{7}{1} = \frac{105}{32} \pi = 3\pi + \frac{9}{32} \pi$$

$$\Phi_8 = 2\pi \frac{15}{64} / \frac{8}{1} = \frac{120}{32} \pi = 3\pi + \frac{24}{32} \pi$$

but here, by the use of a delay element having a delay time $\Delta t$, $\Phi_7$ and $\Phi_8$ may be changed into $$\Phi_7 = 2\pi \times \frac{7}{1} + 2\pi f_7 \Delta t = \pm \frac{1}{2} \pi + 2a\pi$$

$$\Phi_8 = 2\pi \times \frac{8}{1} + 2\pi f_8 \Delta t = \pm \frac{1}{2} \pi + 2b\pi$$

and thereafter, the signal from the S phase may be input to an amplifier for driving the A phase, with a predetermined time delay.

Figure 31:
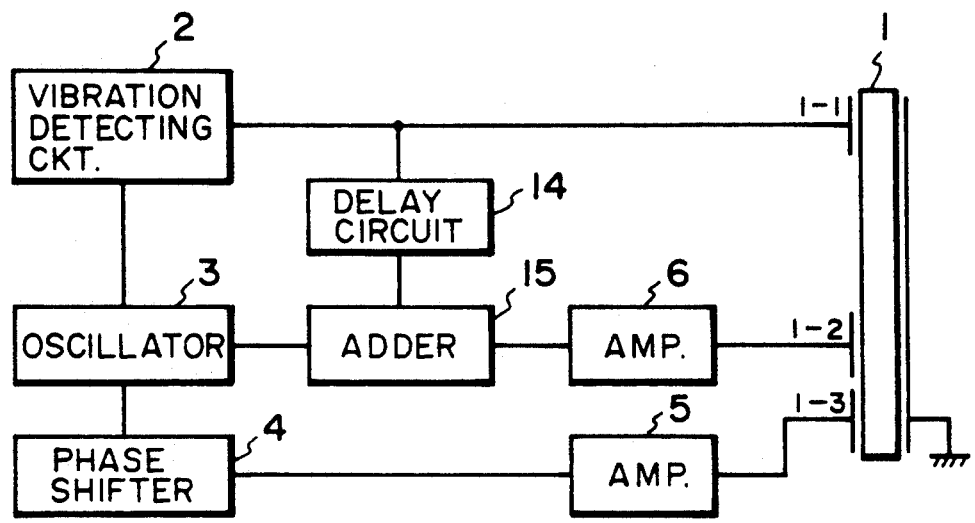
FIG. 31 is a circuit block diagram of another embodiment of the present invention.

FIG. 31 is a block diagram showing an example of a driving circuit for realizing such a driving method. The output from an oscillator 3 is output to an amplifier 6 for driving the A phase, through an adder 15 comprising, for example, an operational amplifier, and the detection signal of the S phase 1-1 is put out to the adder 15 through a delay circuit 14.

Figure 34:
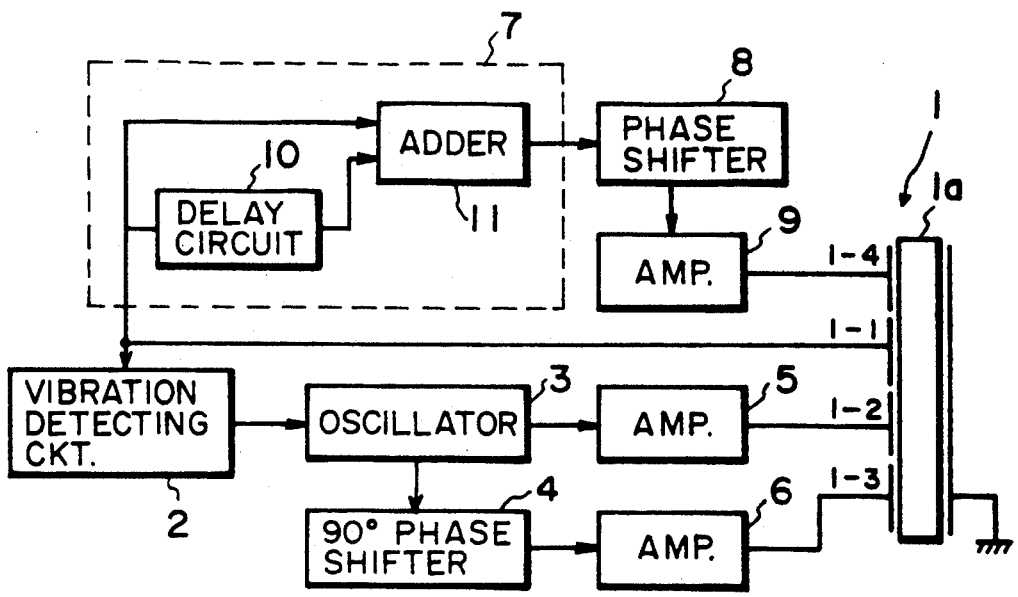
FIG. 34 is a block diagram schematically showing the construction of a drive control circuit in another embodiment of the vibration wave motor of the present invention.
Figure 35:
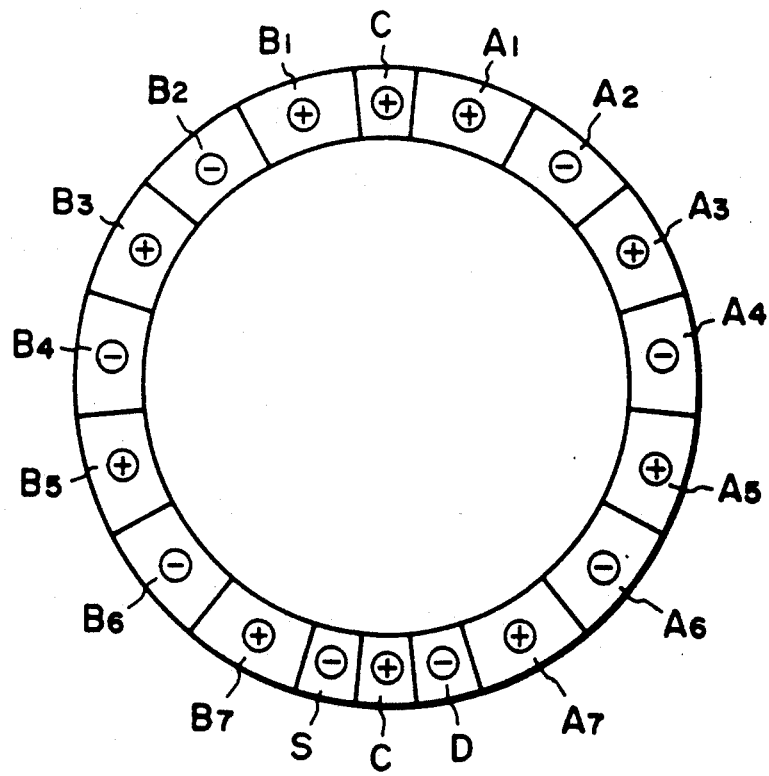
FIG. 35 shows the electrode pattern of the same vibration wave motor.

FIG. 34 is a block diagram showing another embodiment of the present invention, and FIG. 35 is a plan view showing the electrode pattern of the vibration wave motor thereof.

In the vibration wave motor of the present embodiment, an A phase piezo-electric element group 1-2 and a B phase piezo-electric element group 1-3 are provided on a ring-like vibration member 1a as shown in FIG. 35 to form eight travelling vibration waves, and an oscillator 3 is drive-controlled on the basis of the detection information from an S phase piezo-electric element 1-1 detected by a vibration detecting circuit 2 so that the A phase piezo-electric element group 1-2 and the B phase piezo-electric element group 1-3 are driven through an amplifier 5, a phase shifter 4 and an amplifier 6, and this construction is the same as that of each of the above-described embodiments. In this embodiment, an unnecessary vibration suppressing D phase piezo-electric element (indicated by 1-4 in FIG. 34) polarization-treated to the negative pole is further secured to the vibration member 1a, and the detection signal from the S phase piezo-electric element 1-1 is passed through a driving signal attenuating circuit 7 and a phase shifting circuit 8, whereafter it is amplified by an amplifier 9 so as to drive a unnecessary vibration suppressing piezo-electric element 1-4.

Thus, in the present embodiment, the unnecessary vibration included in the detection signal of the travelling vibration waves detected by the S phase is negated by the driving of the piezo-electric element 1-4 to thereby realize a normal vibration mode of eight waves.

The driving signal attenuating circuit 7 which forms a feature of the present embodiment is comprised of a delay circuit 10 and an adder 11, whereby a vibration signal to be applied to the unnecessary vibration suppressing piezo-electric element 1-4 (the D phase) is suitably taken out and adjusted by the phase shifter 8 to a phase suitable for suppressing the unnecessary vibration of the vibration member, whereafter it is input to the D phase through the amplifier 9.

The operation of the embodiment of FIG. 34 will be further described hereinafter.

The driving frequency $f_D$ of the vibration wave motor is first produced from the oscillator 3 of FIG. 34, and then is amplified by the amplifier 5, whereafter it is input to the driving phase 1-2 (the A phase) of the vibration wave motor. The output of the oscillator 3 is input also to the 90° phase shifter 4, whereby it is phase-shifted by 90°, and thereafter is amplified by the amplifier 6 and input to another driving phase 1-3 (the B phase). On the other hand, the output from the S phase 1-1 is detected by the vibration detecting circuit 2, and this detection signal is fed back to the oscillator 3 to control the vibration wave motor to a predetermined condition.

The above-described controlling operation is similar to that in the prior art.

Figure 36:
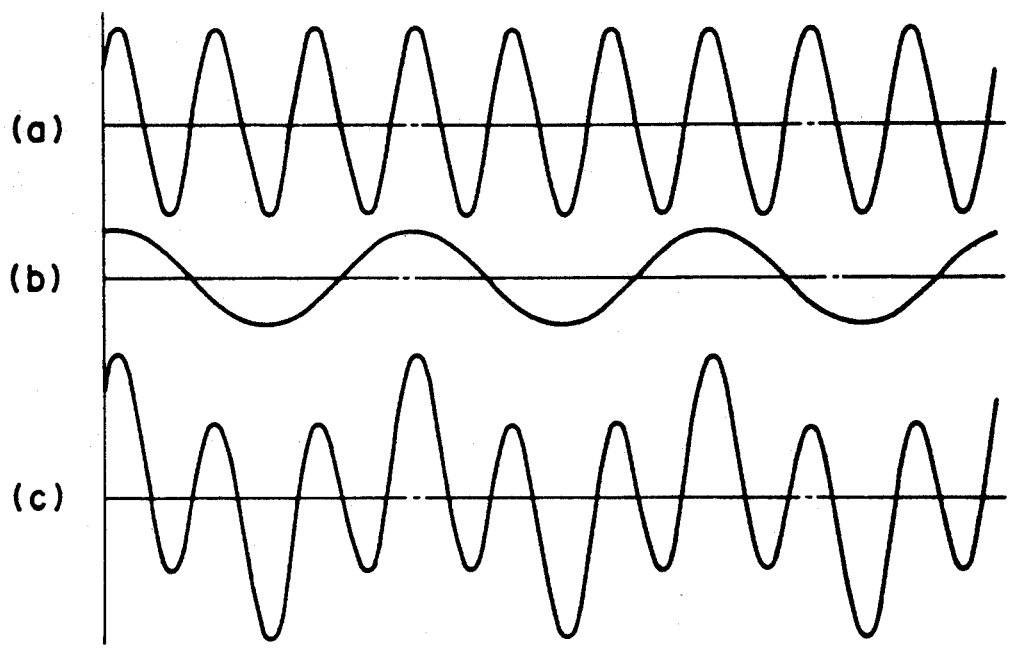
FIG. 36 shows an example of the S phase output signal in the same embodiment.
Figure 37:
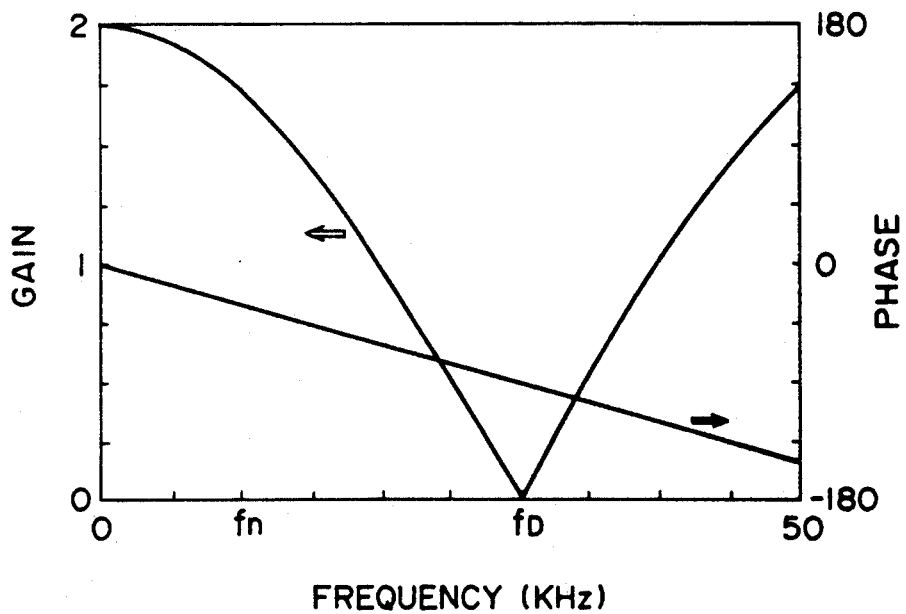
FIG. 37 is a graph showing the frequency transmission characteristic in an attenuation circuit for a driving wave for driving a vibration member in the same embodiment.
Figure 38:
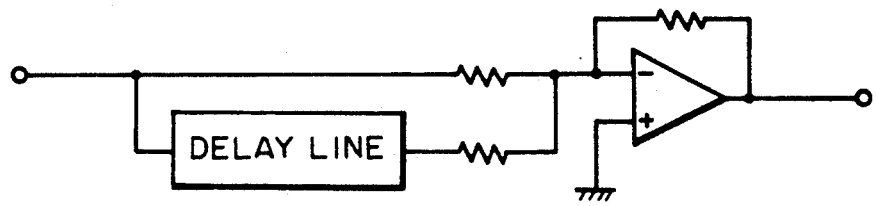
FIG. 38 is a diagram showing a specific construction of the driving wave attenuation circuit shown in FIG. 34.

Now, the state of the output signal of the S phase when vibration which is not as per the design value is engendered on the vibration wave motor due to some factor or other is shown in FIG. 36C, and this is synthesized by an ideal output signal (a) conceivable in designing (for the sake of convenience, this is regarded as $f_D = 30$ kHz) and a vibration output (b) which is not as per the design value (for the sake of convenience, this is regarded as $f_n = 10$ kHz). In the present embodiment, this synthesized signal is input to the driving signal attenuating circuit 7. Here, supposing a case where the delay time Δt of the delay circuit 10 of the circuit 7 is set to $$\Delta t = \frac{T}{2} \text{ (sec.)} \quad \left( T = \frac{1}{f_D} \right),$$

the frequency transmission characteristic of the circuit 7 at this time is shown in FIG. 37. From this FIG. 37, it is seen that of the signals passed through the circuit 7, the gain of the signal $f_D$ of the driving frequency (FIG. 36) is attenuated to substantially zero and further, with regard to the signal output $f_n$ (FIG. 36B) which is not as per the design value, it involves a phase variation of about 30° from FIG. 37, but can obtain a gain about 1.7 times as great. So, $f_D$ is thus attenuated, and as regards $f_n$, it becomes possible to amplify the amplified signal by the amplifier 9 after the conditions of the phase thereof have been satisfied by the phase shifter 8, and input it to the D phase 1-4 to thereby suppress the vibration of $f_n = 10$ kHz. As such a delay circuit 10, use may be made, for example, of a delay line. A specific example of such driving signal attenuating circuit 7 is shown in FIG. 38.

Figure 39:
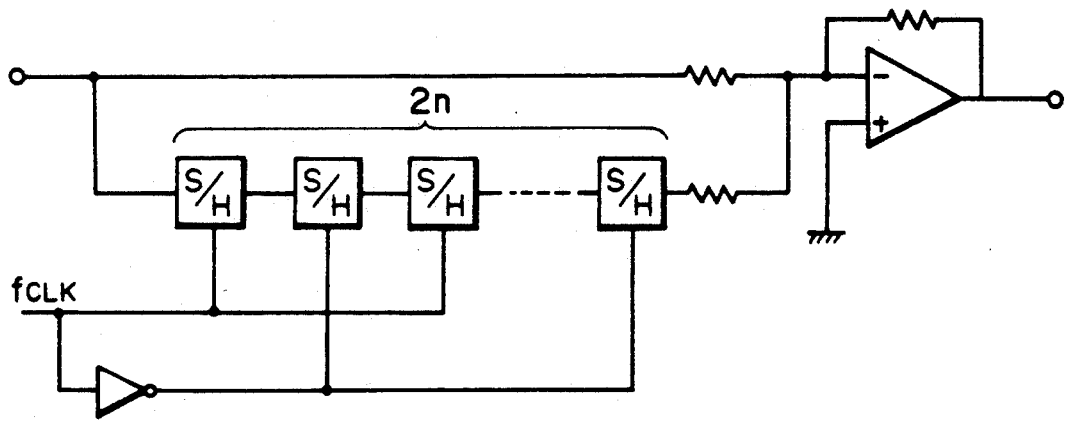
FIG. 39 is a diagram showing another specific construction of the driving wave attenuation circuit.

A delay line is employed as an example of the construction of the delay circuit, but of course, it is also possible to construct the delay circuit of a delay element such as a CCD (charge coupled device) or a BBD (bucket bricade device), or construct the delay circuit by arranging sampling and holding circuits as shown in FIG. 39. In the example shown in FIG. 39, two sampling and holding circuits form one stage, and the delay circuit is constructed of total n stages (the number of sampling and holding circuits being 2n), the delay time Δt in this case is $$\Delta t = n/f_{CLK} \text{ (sec.)}$$

and therefore, n and $f_{CLK}$ may be adjusted so that Δt may be $$\Delta t = \frac{T}{2}$$

relative to the period T of the driving frequency of the vibration wave motor.

In the vibration wave motor, it is known that the resonance frequency is varied by a variation in load or temperature. Thus, as regards the delay time given by the above-described delay circuit, it is particularly preferable in practical use to follow it.

Figure 40:
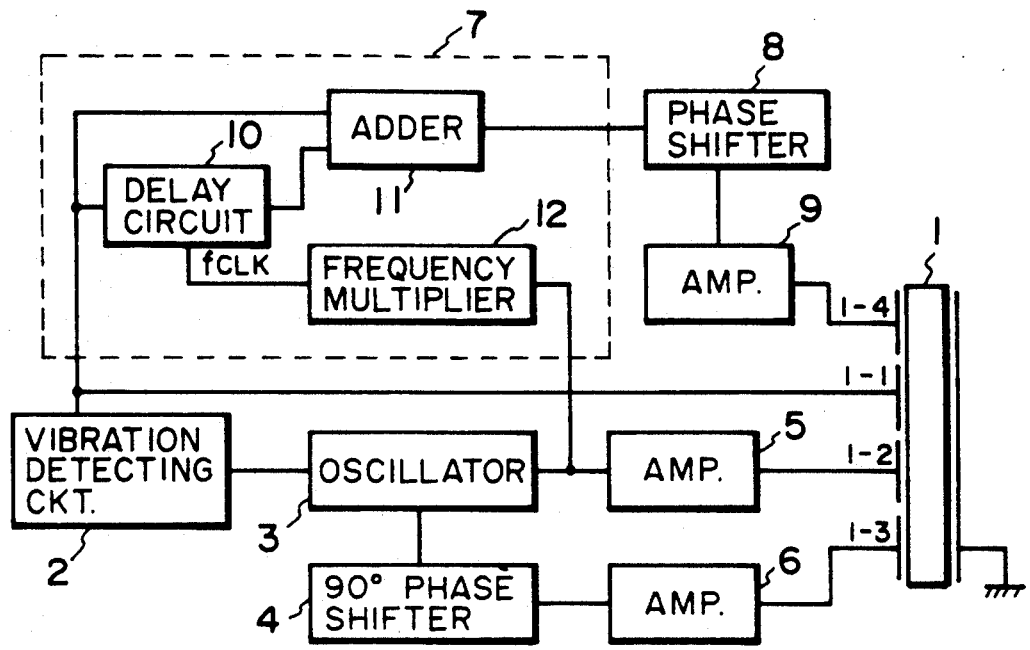
FIG. 40 is a block diagram schematically showing the construction of a drive control circuit in another embodiment of the vibration wave motor of the present invention.

FIG. 40 shows a preferred embodiment of a drive control circuit constructed so as to have a compensating effect for such a variation in load or temperature, and the difference thereof from the embodiment shown in FIG. 34 is that the output from the oscillator 3 is input to the delay circuit 10 through a frequency multiplier 12.

By such a construction, the delay time Δt in the delay circuit 10 can correspond to any variation in the driving frequency $f_D$ of the vibration wave motor even if $f_D$ varies with time, and the relation that Δt=T/2 can always be satisfied.

The frequency $f_{CLK}$ for controlling the delay time is made by the use of the driving frequency of the vibration wave motor 1 in the embodiment of FIG. 40, but it is also possible to make the driving frequency of the vibration wave motor by controlling the delay time controlling frequency $f_{CLK}$ by the output of the vibration detecting circuit 2, and frequency-dividing it. Of course, in such case, the relation between the period of the driving frequency and the delay time becomes more accurate.

Figure 41:
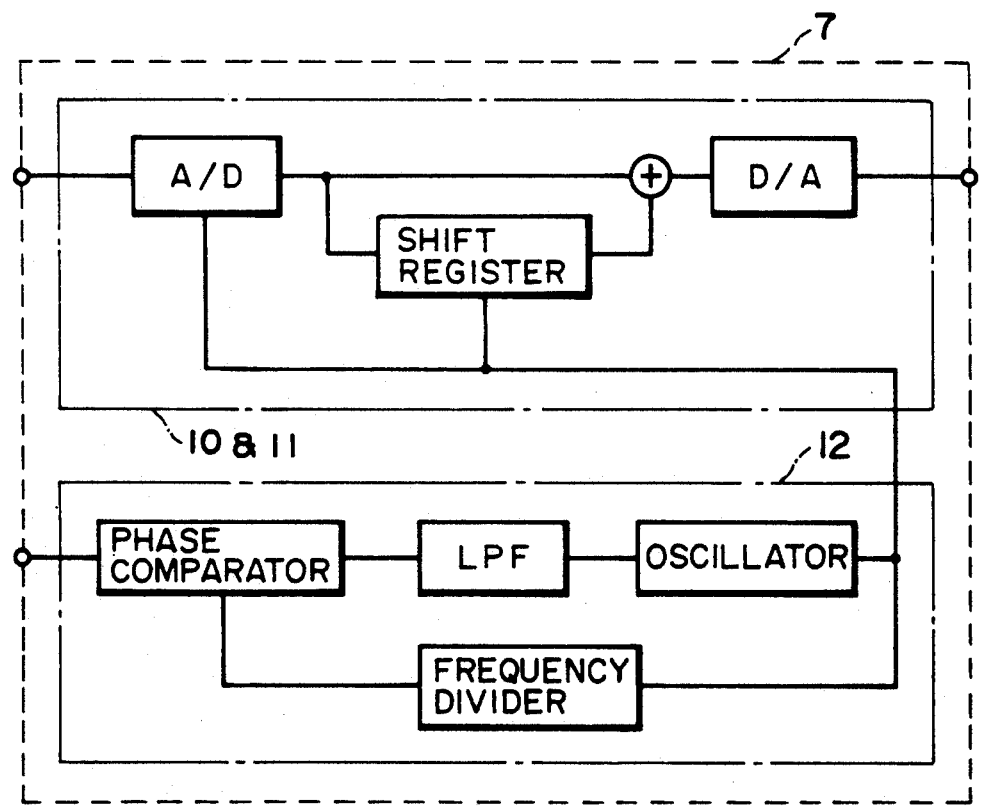
FIG. 41 diagrammatically shows the specific construction of the driving wave attenuation circuit in the same embodiment.

Also, the delay circuit 10 in the construction of FIG. 40 can be constructed of a delay element such as CCD or BBD, or by arranging sampling and holding circuits, as previously described, and besides, can be constructed digitally as shown in FIG. 41. Also, the frequency multiplier 12 can be constructed of a frequency multiplier circuit using a phase lock loop as shown in FIG. 41, or the like.

While each of the above embodiments has been described as the case where the delay time by the delay circuit 10 is $$\Delta t = \frac{T}{2},$$

this is not restrictive, but the delay time can also be $$\Delta t = \frac{nT}{2} . \text{ (} n \text{ is a natural number.)}$$

Figure 42:
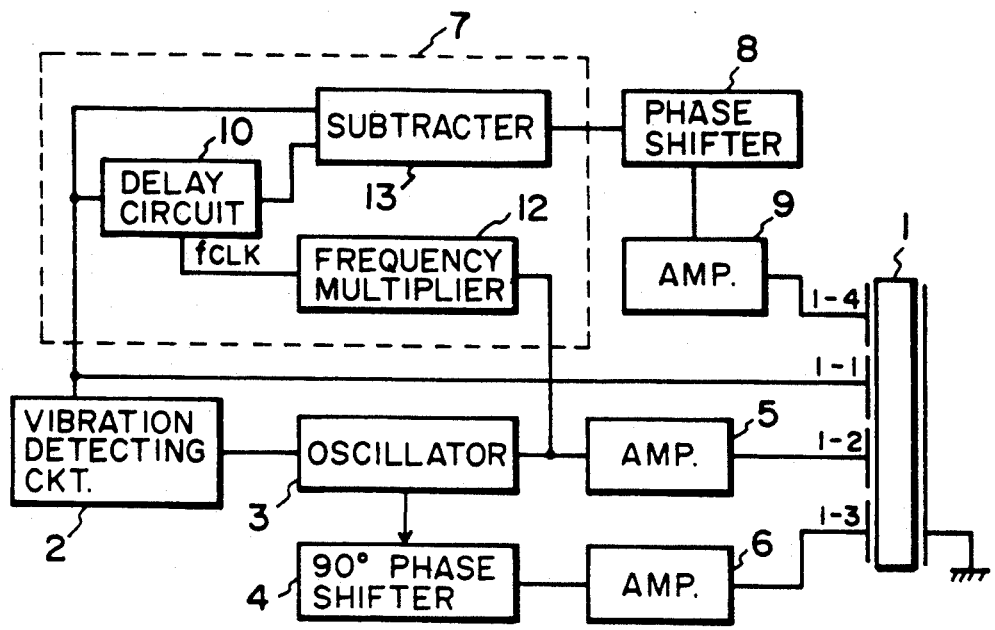
FIG. 42 is a block diagram schematically showing the construction of a drive control circuit in another embodiment of the vibration wave motor of the present invention.
Figure 43:
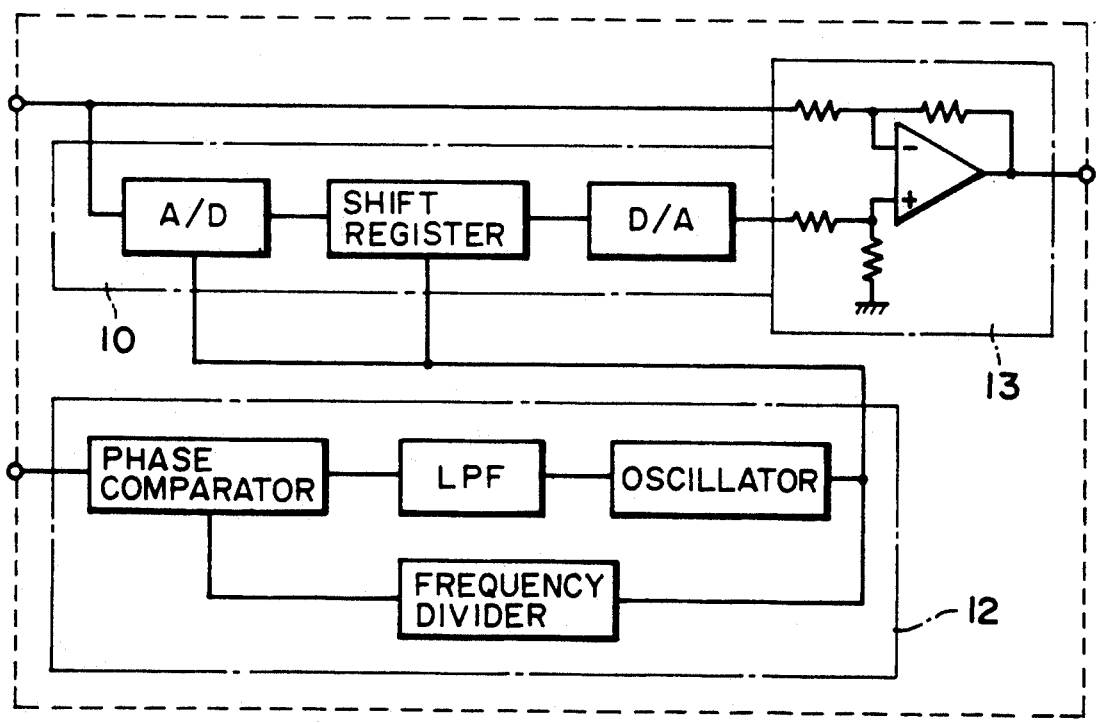
FIG. 43 diagrammatically shows the specific construction of the driving wave attenuation circuit in the embodiment of FIG. 42.
Figure 44:
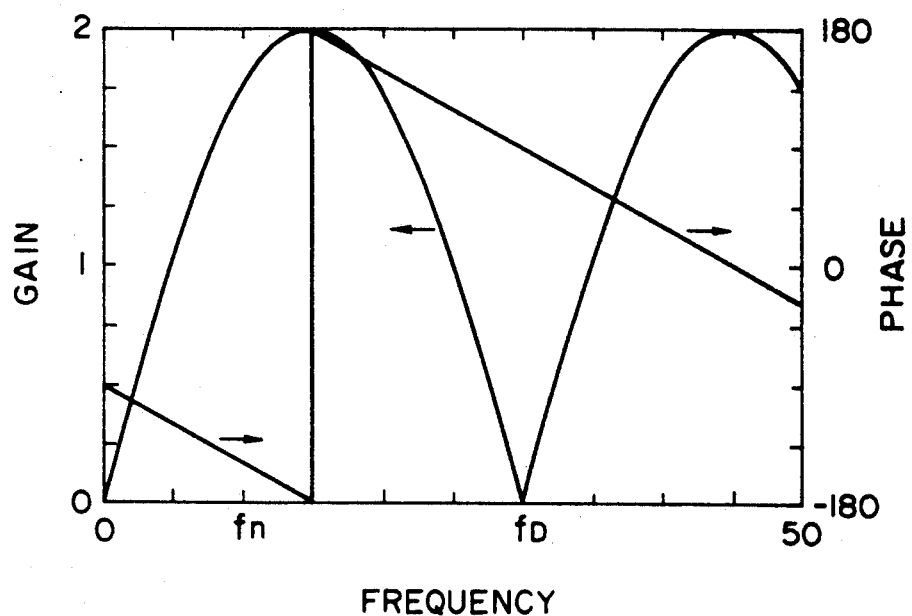
FIG. 44 is a graph showing the frequency transmission characteristic in an attenuation circuit for a driving wave for driving a vibration member in the embodiment of FIG. 42.

FIGS. 42 to 44 specifically show an embodiment in which n=2, FIG. 42 being a schematic block diagram showing the general construction of a drive control circuit in the same embodiment, and FIG. 43 showing a specific example of the construction of the driving frequency attenuating circuit 7.

Also, an example of the frequency transmission characteristic of the driving frequency attenuating circuit 7 controlled by these is shown in FIG. 44.

As described above, in the vibration wave motor according to each of the embodiments shown in FIGS. 34 to 44, the signal of the driving frequency which is unnecessary for suppressing the generation of the vibration which is not as per the design value can be greatly attenuated to thereby enhance the utilization efficiency of the power source, and a sufficient amplification degree can be secured even for a low power source voltage. Also, the generation of the vibration which is not as per the design value can be suppressed powerfully and therefore, proper operation of the vibration wave motor can be provided, and an increase in the irregularity of rotation, a sudden reduction in the number of rotations and torque, and generation of abnormal sound can be suitably suppressed.

Figure 45:
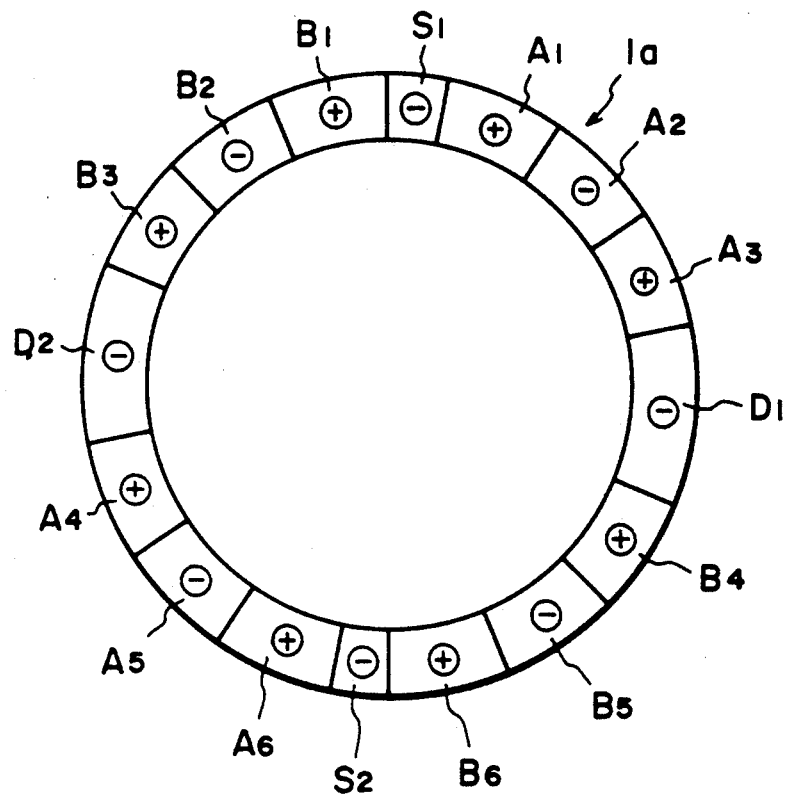
FIG. 45 shows the polarization pattern of a vibration member in another embodiment of the vibration wave motor shown in FIG. 46.
Figure 46:
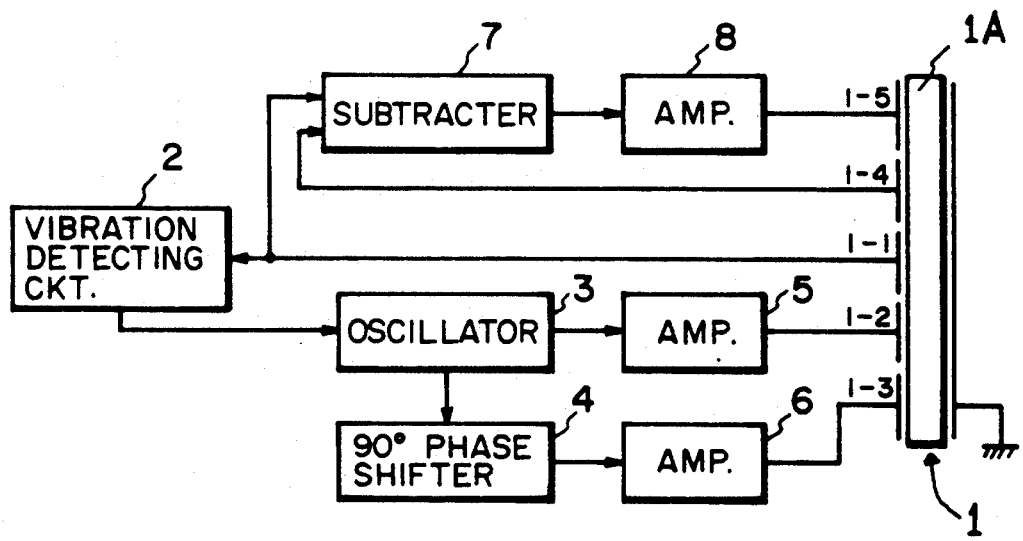
FIG. 46 is a block diagram schematically showing the construction of a drive control circuit in another embodiment of the vibration wave motor of the present invention.

FIG. 45 exemplarily shows the polarization pattern of a piezo-electric element group (electro-mechanical energy converting elements formed on the vibration member of a vibration wave motor according to another embodiment of the present invention, and FIG. 46 shows the construction of a drive control circuit used to drive the same.

In the vibration wave motor 1 of the present embodiment, an A phase piezo-electric element group 1-2 ($A_1$–$A_6$ in FIG. 45) and a B phase piezo-electric element group 1-3 ($B_1$–$B_6$ in FIG. 45) are provided in a pattern as shown in FIG. 45 on a ring-like vibration member 1a to thereby form eight travelling vibration waves, and an oscillator 3 is drive-controlled on the basis of a detection signal from an S phase piezo-electric element 1-1 which is the vibration detecting phase so that the A phase piezo-electric element group 1-2 and the B phase piezo-electric element group 1-3 are driven through an amplifier 5, a 90° phase shifter 4 and an amplifier 6, and this construction itself is the same as the construction of each of the above-described embodiments.

A feature of the present embodiment is that in addition to the above-described construction, a second S phase piezo-electric element 1-4 (hereinafter referred to as the $S_2$ phase) is disposed at the rotation-symmetrical position of the vibration member on the ring (i.e., a position spaced apart by $(\lambda_8/2) \times 8$; $\lambda_8$ indicates the wavelength in the case of eight waves) relative to the S phase piezo-electric element 1-1 (hereinafter referred to as the $S_1$ phase) of the vibration member 1a and a signal of the difference between the outputs from the $S_1$ phase and the $S_2$ phase is made by a subtraction circuit 7, and another feature of the present embodiment is that this difference signal is amplified by an amplifier 8 and input to a driving phase $D_2$ 1-5 for suppressing unnecessary vibration (hereinafter referred to as the $D_2$ phase) provided on the vibration member.

Figure 47:
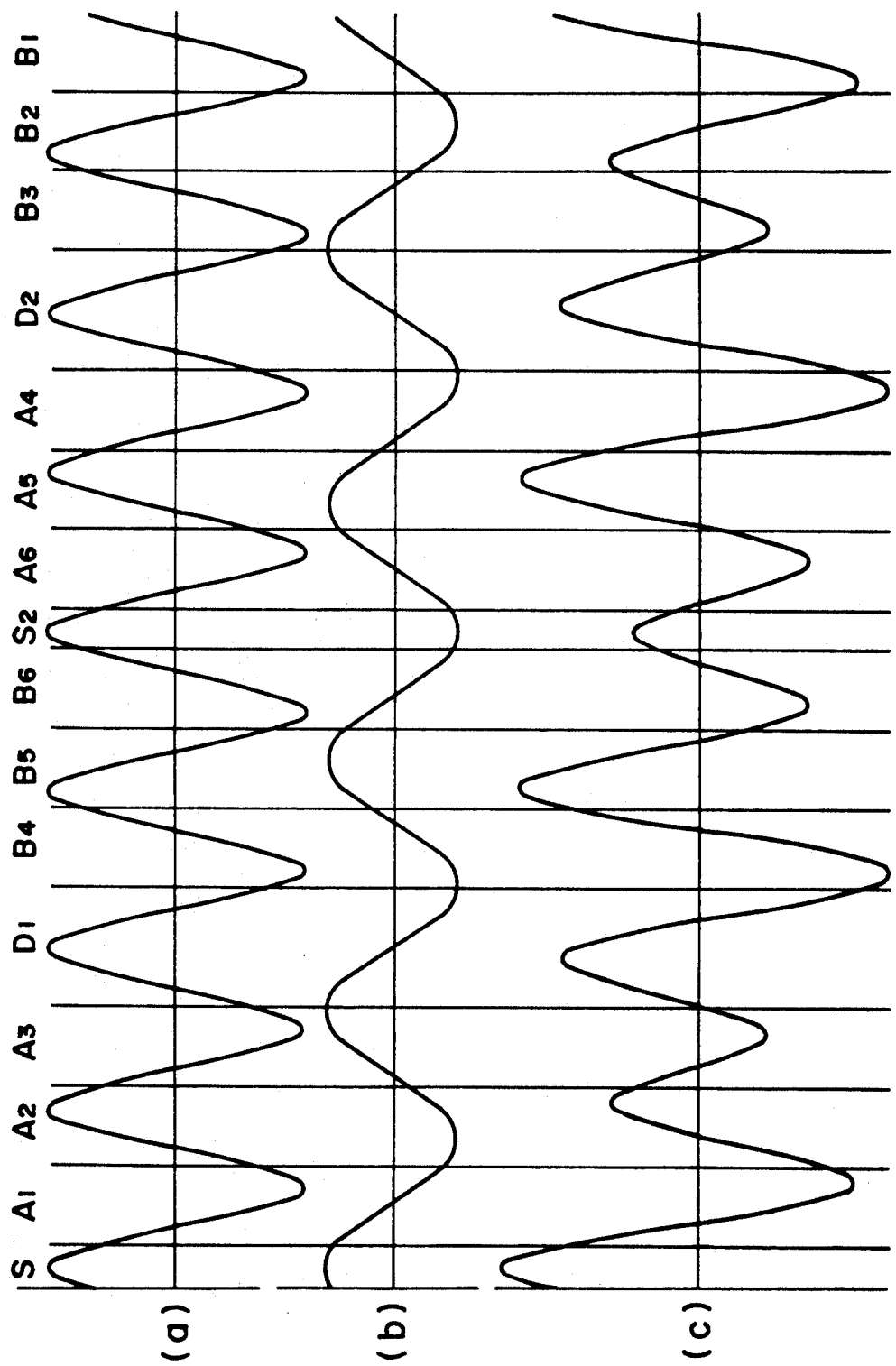
FIG. 47 shows an example of the state at a certain moment, of waves produced on a vibration member in the embodiment of FIG. 46.

The operation of this construction will hereinafter be described by way of example. The state of each vibration on the vibration wave motor at a certain moment when besides a vibration of the driving frequency of eight waves (for the sake of description, it is assumed that this vibration is a vibration of about 30 kHz), a vibration of five waves (for the sake of description, it is assumed that this vibration is a vibration of about 10 kHz) has been engendered on the vibration wave motor for some reason or other is shown in FIG. 47. Here, FIG. 47A shows the state of the vibration of eight waves caused by the driving of the vibration member, FIG. 47B shows the state of the vibration of five waves engendered naturally, and in this figure, for the facilitation of understanding, the peaks of the vibrations of eight waves and five waves, respectively, are shown as being coincident with each other at the $S_1$ phase.

FIG. 47C shows the state of the vibration actually observed on the vibration member, and this is expressed as the linear sum of these waves in the relation with FIGS. 47A and 47B.

Here, when the positional relation between the two vibration detecting phases, i.e., the $S_1$ phase and the $S_2$ phase, is set as shown in FIG. 45, the positional phase difference $\Delta\phi_8$ between the $S_1$ phase and the $S_2$ phase is $$\Delta\phi_8 = \frac{8\lambda_8}{2} \times \frac{2\pi}{\lambda_8} = 4 \times 2\pi$$

and the eight waves on the $S_1$ phase and the eight waves on the $S_2$ phase are of the same phase.

In contrast, the phase difference $\Delta\Phi_5$ between the five waves is $$\Delta\phi_5 = \frac{8\lambda_8}{2} \times \frac{5\lambda_5}{8\lambda_8} \times \frac{2\pi}{\lambda_5} = \frac{5}{2} \times 2\pi$$

and therefore, five waves on the $S_1$ phase and the five waves on the $S_2$ phase are of the opposite phases. In FIG. 45, the directions of polarization of the $S_1$ phase and the $S_2$ phase are the same, as shown, and thus, if a signal of the difference between the output of the $S_1$ phase and the output of the $S_2$ phase is made in the subtraction circuit 7 of FIG. 46, the signals of the eight waves of said driving signal are mutually attenuated and are absent on this difference signal and thus, only a vibration component of five waves which is unnecessary vibration is taken out. The input to the amplifier 8 becomes a signal smaller by an amount corresponding to the driving signal removed as described above, and a great amplification degree can be obtained even for a low power source voltage.

The amplified signal, in the present embodiment, is input to a third driving phase $D_1$ (or $D_2$ phase, or both of these phases) shown in FIG. 45 which is provided on the vibration member for the purpose of suppressing unnecessary vibration, whereby vibration of five waves naturally engendered on the vibration member can be suppressed.

The relation between the positions of the $S_1$ phase and the $S_2$ phase and the positions of the D phase and the $D_2$ phase is $$2\pi \frac{x}{\lambda_5} = a\pi + \frac{1}{2}\pi$$

(where x represents the center interval between the S phase and the D phase, a is an integer, and $\lambda_5$ represents the wavelength of the five waves ($\lambda_5 = \lambda/5$)).

Also, GND phase or C phase may be provided by the utilization of the unused electrodes of the $D_1$ phase and the $D_2$ phase. Alternatively, the vibration member may be directly connected to GND phase.

Figure 48:
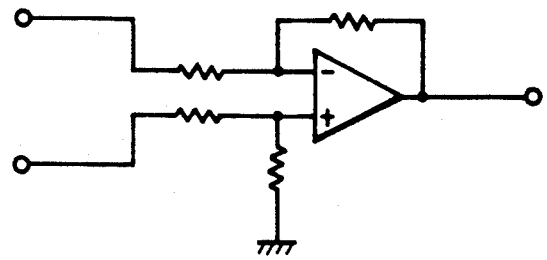
FIG. 48 shows an example of the construction of a subtraction circuit used in the FIG. 46 embodiment.

FIG. 48 shows an example of the construction of the subtraction circuit 7 used in the above-described embodiment.

The above description of the present embodiment has been made with the case of five waves taken as an example of unnecessary vibration, but similar description can be made even in a case where unnecessary vibration is seven waves.

Figure 49:
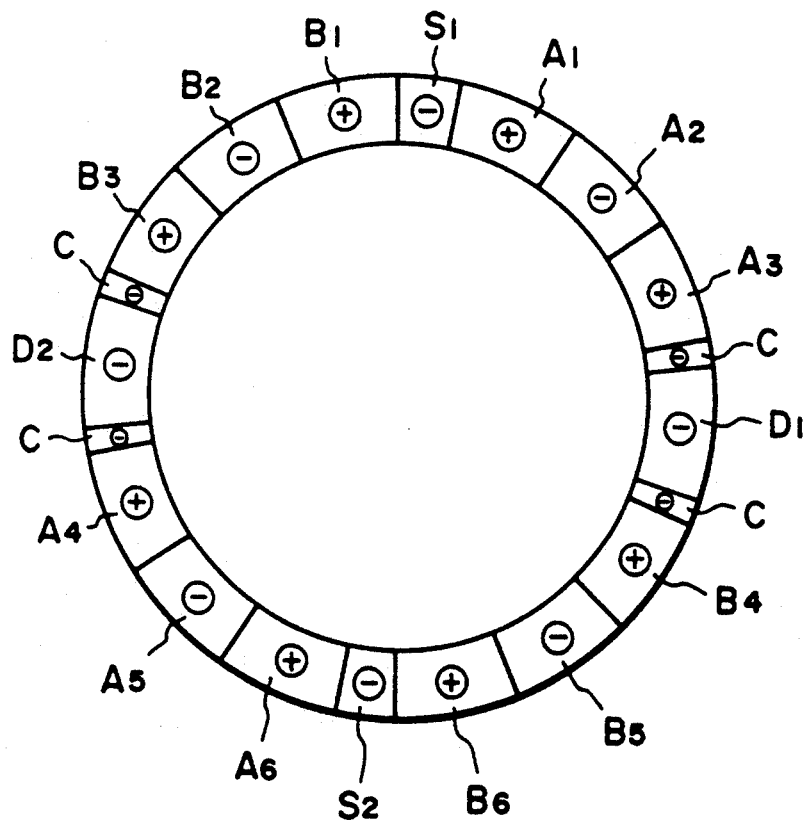
FIG. 49 shows the polarization pattern of a vibration member in the embodiment of FIG. 50.

FIG. 49 shows an embodiment of the vibration wave motor having a polarization pattern which enables more excellent vibration suppression to be accomplished when unnecessary vibration is seven waves.

That is, in the vibration wave motor of the embodiment of FIGS. 45 and 46, as can be seen from FIG. 45 which shows the polarization pattern thereof, the $D_1$ phase (or the $D_2$ phase) which is the third driving phase provided on the vibration member to suppress unnecessary vibration has the length thereof with respect to the circumferential direction (i.e., the direction of travel of the travelling vibration waves) made longer than one-half wavelength of seven waves. Such a construction results in the fact that the effect for vibration suppression is not always sufficient.

So, the present embodiment is a vibration wave motor having a polarization pattern in which is provided a third driving phase, i.e., $D_1$ phase (or $D_2$ phase) suitable for a case where the unnecessary vibration to be suppressed is seven waves, and this is shown in FIG. 49.

That is, common electrodes C are provided on both sides of the $D_1$ phase (and the $D_2$ phase), whereby D phase is provided so as to have a circumferential length approximate to one-half wavelength of unnecessary vibration, thereby improving the effect of suppressing unnecessary vibration.

Figure 50:
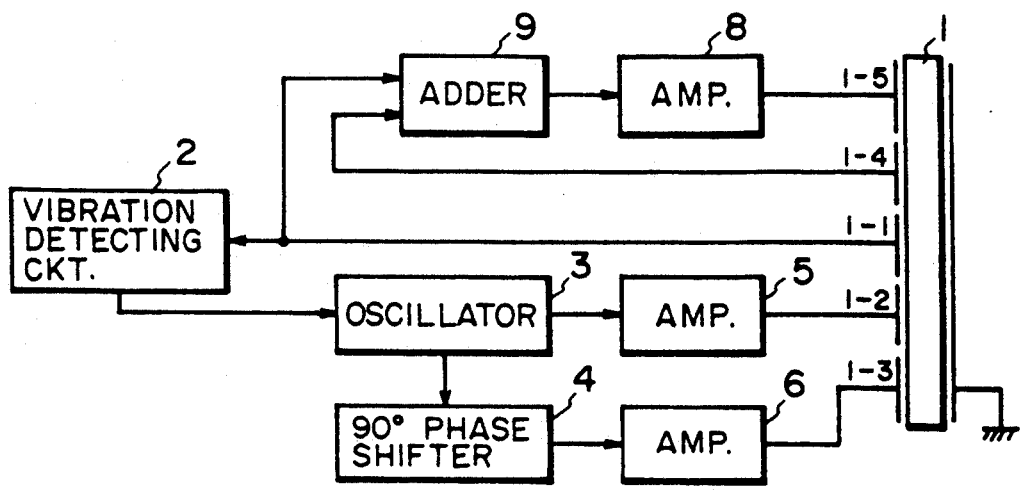
FIG. 50 is a block diagram schematically showing the construction of another embodiment of the drive control circuit of the vibration wave motor of the present invention.
Figure 51:
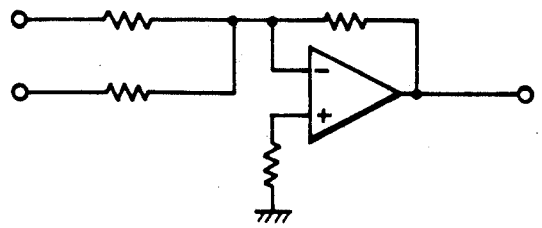
FIG. 51 shows an example of the construction of an adder circuit used in the FIG. 50 embodiment.

In the embodiments of FIGS. 45 and 49, the directions of polarization of the $S_1$ phase and the $S_2$ phase are of the same phase, but unlike this, the directions of polarization of the $S_1$ phase and the $S_2$ phase may of course be of the opposite phases. FIGS. 50 and 51 show the construction of the control circuit in a case where such $S_1$ phase and $S_2$ phase are provided in opposite phases. That is, the circuit of this embodiment is of a construction using an adder circuit as a signal processing circuit for synthesizing the signals of detected vibrations to thereby attenuating the driving signal.

The embodiments previously shown in FIGS. 45 to 51 have been described with respect to a case where the frequency of the driving signal for vibrating the vibration member and the frequency of the signal of unnecessary vibration to be suppressed are in the relation of an even number and an odd number. Actually, however, there is conceivable a case where both of the frequencies of these signals are even numbers (or odd numbers), or a case where the signal of unnecessary vibration to be suppressed is a plurality of waves.

Figure 52:
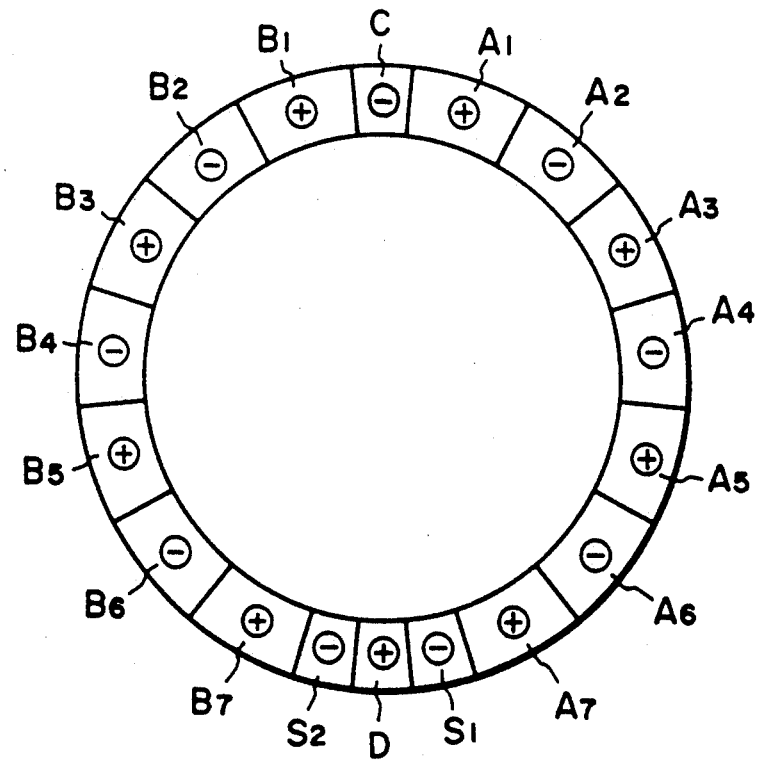
FIG. 52 shows the polarization pattern of a vibration member in an embodiment of the present invention shown in FIG. 54.

The present embodiment is an embodiment for copying with such cases, and in the present embodiment, as shown by the polarization pattern of FIG. 52, use is made of a vibration member having D phase provided between the $S_1$ phase and the $S_2$ phase, whereby unnecessary vibrations of seven, six and four waves engendered on the vibration member are suppressed. The driving signal of the vibration member in the present embodiment is eight waves.

Figure 53:
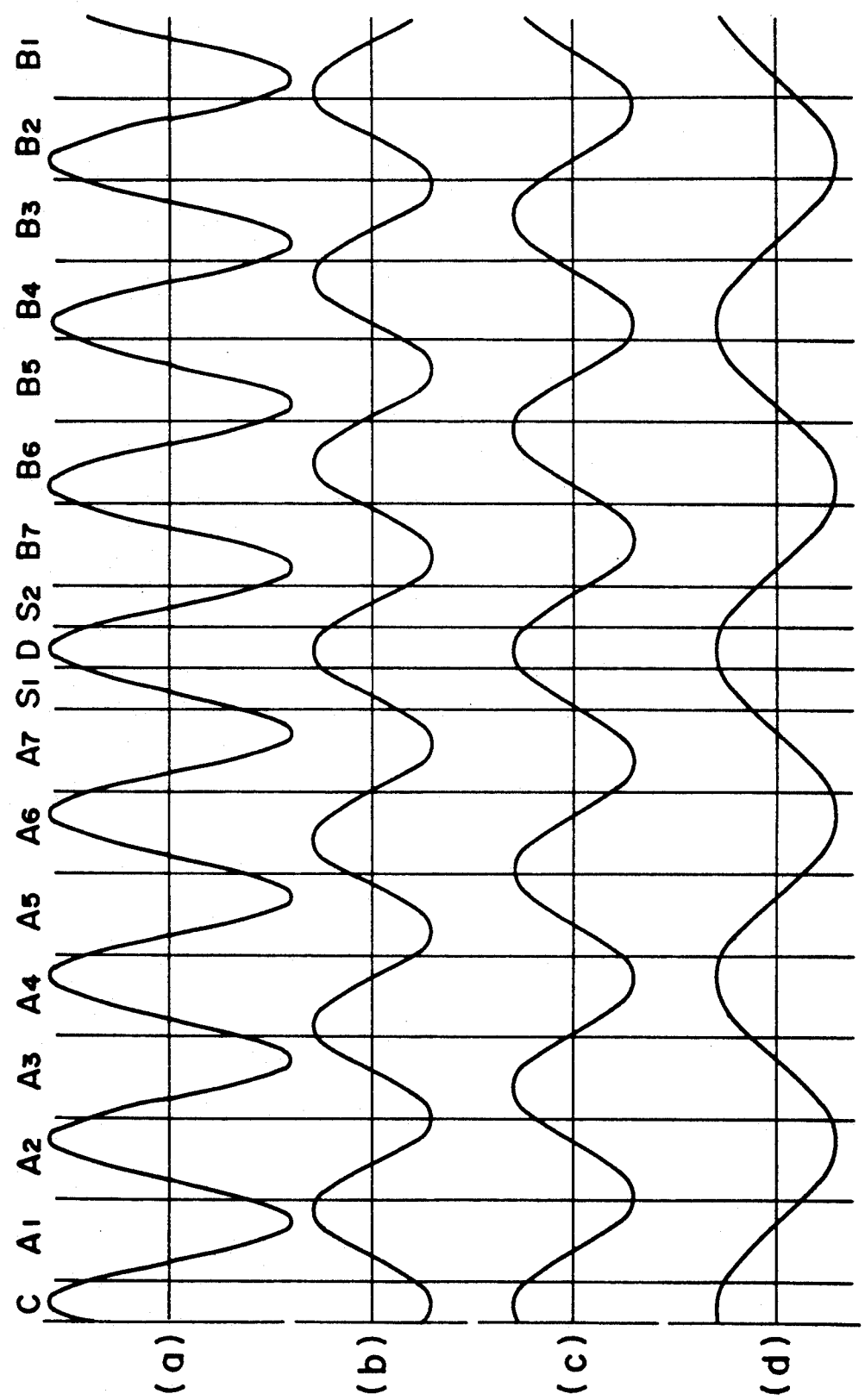
FIG. 53 shows an example of the state at a certain moment of waves produced on a vibration member in the same embodiment.

The states of vibrations at a moment when the greatest amplitude positions of respective waves coincide with the center of the D phase are shown in FIG. 53. FIG. 53(a) shows the state of the vibration of the eight waves of the driving signal, FIG. 53(b) shows the state of the vibration of seven waves, FIG. 53(c) shows the state of the vibration of six waves, and FIG. 53(d) shows the state of the vibration of four waves.

In the construction shown in FIG. 52, the positional phase differences between the center of the D phase and the centers of the $S_1$ phase and the $S_2$ phase are both set to $\lambda_8/4$ (accordingly, the positional phase difference between the $S_1$ phase and the $S_2$ phase is $\lambda_8/2$) and therefore, if a signal of the sum of the output of the $S_1$ phase and the output of the $S_2$ phase is made, the signal $V_n$ of each wave is as follows with the wave on the D phase as the reference:

$$V_8 = \cos\left(\omega_8 t - \frac{2\pi}{\lambda_8} \cdot \frac{\lambda_8}{4}\right) +$$

$$\cos\left(\omega_8 t + \frac{2\pi}{\lambda_8} \cdot \frac{\lambda_8}{4}\right)$$

$$= \cos\left(\omega_8 t - \frac{1}{2}\pi\right) + \cos\left(\omega_8 t + \frac{1}{2}\pi\right)$$

$$= 2\cos(\omega_8 t) \cdot \cos\left(-\frac{1}{2}\pi\right) = 0$$

In the same manner, $$V_7 = \cos\left(\omega_7 t - \frac{\lambda_8}{4} \cdot \frac{7\lambda_7}{8\lambda_8} \cdot \frac{2\pi}{\lambda_7}\right) +$$

$$\cos\left(\omega_7 t + \frac{\lambda_8}{4} \cdot \frac{7\lambda_7}{8\lambda_8} \cdot \frac{2\pi}{\lambda_7}\right)$$

$$= 2\cos(\omega_7 t) \cdot \cos\left(-\frac{7}{16}\pi\right)$$

$$V_6 = \cos\left(\omega_6 t - \frac{\lambda_8}{4} \cdot \frac{6\lambda_6}{8\lambda_8} \cdot \frac{2\pi}{\lambda_6}\right) +$$

$$\cos\left(\omega_6 t + \frac{\lambda_8}{4} \cdot \frac{6\lambda_6}{8\lambda_8} \cdot \frac{2\pi}{\lambda_6}\right)$$

$$= 2\cos(\omega_6 t) \cdot \cos\left(-\frac{3}{8}\pi\right)$$

$$V_4 = \cos\left(\omega_4 t - \frac{\lambda_8}{4} \cdot \frac{4\lambda_4}{8\lambda_8} \cdot \frac{2\pi}{\lambda_4}\right) +$$

$$\cos\left(\omega_4 t + \frac{\lambda_8}{4} \cdot \frac{4\lambda_4}{8\lambda_8} \cdot \frac{2\pi}{\lambda_4}\right)$$

$$= 2\cos(\omega_4 t) \cdot \cos\left(-\frac{1}{4}\pi\right)$$

(where $\omega_n$ represents the frequency of n waves, and $\lambda_n$ represents the wavelength of n waves.)

According to this result, in a vibration member having the polarization pattern of FIG. 52, by making a signal of the sum of the outputs of the $S_1$ phase and the $S_2$ phase, the signal of eight waves which are the vibrations of the driving wave is completely removed from the signal of this sum and thus, the signals of all waves of lower orders than this driving wave coincide with the phase of the wave of the D phase lying between the $S_1$ phase and the $S_2$ phase. This also holds true of the case of other waves which are not described herein, for example, five or three vibration waves.

Figure 54:
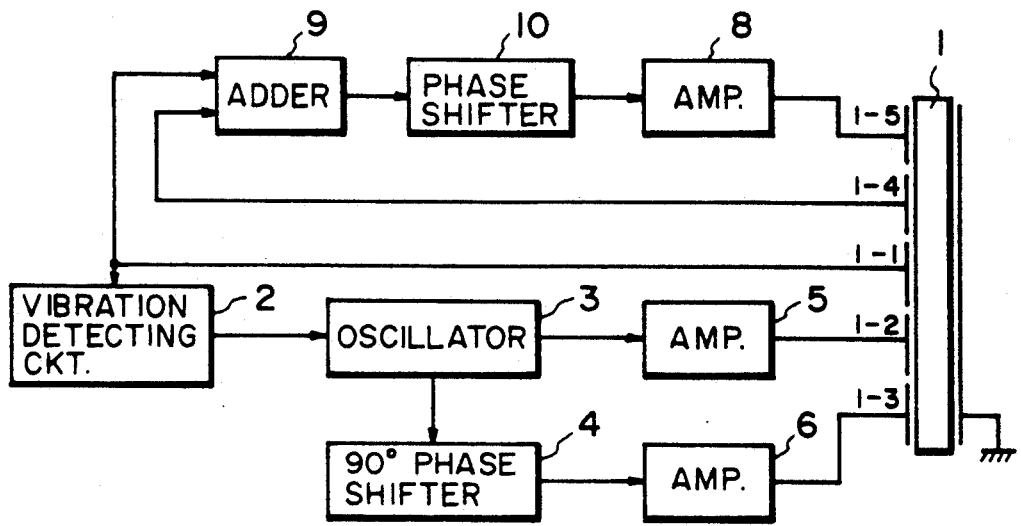
FIG. 54 is a block diagram schematically showing the construction of the drive control circuit of a vibration wave motor according to another embodiment of the present invention.

Accordingly, by effecting vibration control by the use of a vibration control circuit shown in FIG. 54, it becomes possible to suppress all the other necessary vibrations than the driving vibration. The phase shifter shown in FIG. 54 is for phase-shifting the D phase by 90° for the purpose of suppressing unnecessary vibration from the positional relations between the $S_1$ phase, the $S_2$ phase and the D phase of the polarization pattern of this embodiment and driving the D phase, and may be comprised, for example, of an integrating circuit.

Figure 55:
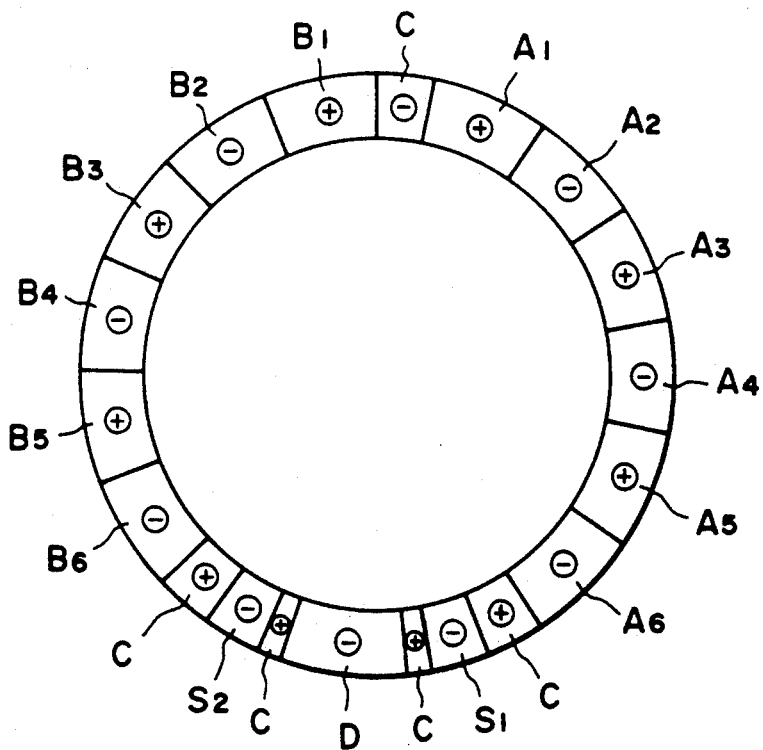
FIGS. 55 to 57 show the polarization patterns of vibration members in further embodiments of the present invention.

FIG. 55 shows still another embodiment of the present invention. The embodiment shown in this figure is a modification of the vibration member described with reference to FIG. 52, and specifically is an example in which the $S_1$ phase, the $S_2$ phase, the D phase and common electrodes C are combined together to thereby secure a large area of the D phase provided on the vibration member.

That is, in this FIG. 55, there is shown a construction in which for the eight waves (wavelength $\lambda_8$) of the frequency of driving, the interval between the two $S_1$ and $S_2$ phases is the wavelength of driving ($=\lambda_8$), the D phase is positioned intermediate of the $S_1$ phase and the $S_2$ phase and the circumferential length of the D phase is one-half of the wavelength ($=\lambda_7$) of seven waves which are of the order lower by 1 than the driving frequency 8. By such a construction, the effect of suppressing the unnecessary vibration of the wavelength to be suppressed is improved even further.

Also, if the waves to be suppressed are waves of the other low orders than seven waves, it is suitable to make the circumferential length of the D phase to one-half of the wavelength of the waves to be suppressed, and this can be easily realized by the construction of the present embodiment.

The operation of suppressing unnecessary vibration in FIG. 55 will now be described. In the construction of FIG. 55, the interval between the $S_1$ phase and the $S_2$ phase is coincident with the wavelength $\lambda_8$ and moreover, the directions of polarization thereof are the same and therefore, by making a difference between the output of the $S_1$ phase and the output of the $S_2$ phase, it is possible to attenuate the component of the driving signal.

The relations between the respective waves are as follows:

$$V_8 = \cos\left(\omega_8 t - \frac{\lambda_8}{2} \cdot \frac{2\pi}{\lambda_s}\right) -$$

$$\cos\left(\omega_8 t + \frac{\lambda_8}{2} \cdot \frac{2\pi}{\lambda_8}\right)$$

$$= 2\sin(\omega_8 t) \cdot \sin(-\pi) = 0$$

In the same manner, $$V_7 = \cos\left(\omega_7 t - \frac{\lambda_8}{2} \cdot \frac{7\lambda_7}{8\lambda_8} \cdot \frac{2\pi}{\lambda_7}\right) -$$

$$\cos\left(\omega_7 t + \frac{\lambda_8}{2} \cdot \frac{7\lambda_7}{8\lambda_8} \cdot \frac{2\pi}{\lambda_7}\right)$$

$$= 2\sin(\omega_7 t) \cdot \sin\left(\frac{7}{8}\pi\right)$$

$$V_6 = \cos\left(\omega_6 t - \frac{\lambda_8}{2} \cdot \frac{6\lambda_6}{8\lambda_8} \cdot \frac{2\pi}{\lambda_6}\right) -$$

$$\cos\left(\omega_6 t + \frac{\lambda_8}{2} \cdot \frac{6\lambda_6}{8\lambda_8} \cdot \frac{2\pi}{\lambda_6}\right)$$

$$= 2\sin(\omega_6 t) \cdot \sin\left(\frac{6}{8}\pi\right)$$

$$V_4 = \cos\left(\omega_4 t - \frac{\lambda_8}{2} \cdot \frac{4\lambda_4}{8\lambda_8} \cdot \frac{2\pi}{\lambda_4}\right) -$$

$$\cos\left(\omega_4 t + \frac{\lambda_8}{2} \cdot \frac{4\lambda_4}{8\lambda_8} \cdot \frac{2\pi}{\lambda_4}\right)$$

$$= 2\sin(\omega_4 t) \cdot \sin\left(\frac{4}{8}\pi\right)$$

That is, by making a signal of the difference between the two S phases (the $S_1$ phase and the $S_2$ phase) spaced apart from each other by an amount corresponding to the wavelength $\lambda_8$ of the waves of the driving signal, the wave becomes a wave which is 90° out of phase with the central wave of the two S phases and moreover, the magnitude of the waves of the driving signal can be made O. Accordingly, in this case, the 90° phase shifter described in connection with FIG. 54 need not be described in the control circuit, and the outputs of the two S phases are subtracted by the use of the drive control circuit shown in FIG. 46 and are thereafter amplified and input to the D phase, whereby unnecessary vibration can be suppressed and therefore, the circuit construction becomes simpler.

Also, in FIG. 55, some (or all) of the electrodes hot used for driving (the C electrodes in FIG. 55) can be utilized as electrodes of first, second and third driving phases, thereby further improving the effect of suppressing unnecessary vibration in the vibration wave motor of the present invention.

Figure 56:
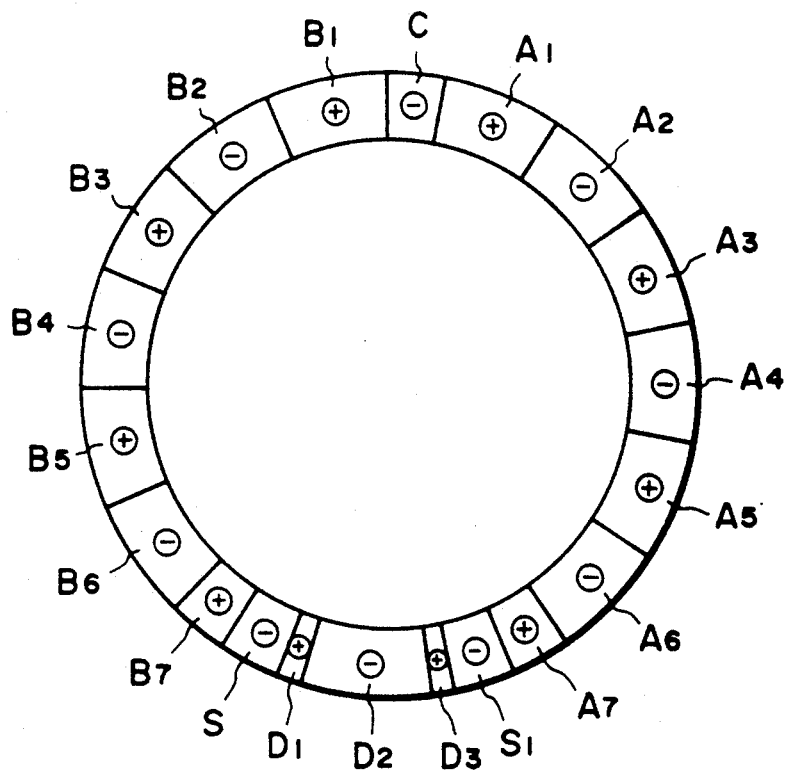

The specific polarization pattern of the vibration member in this case is shown, for example, in FIG. 56.

Figure 57:
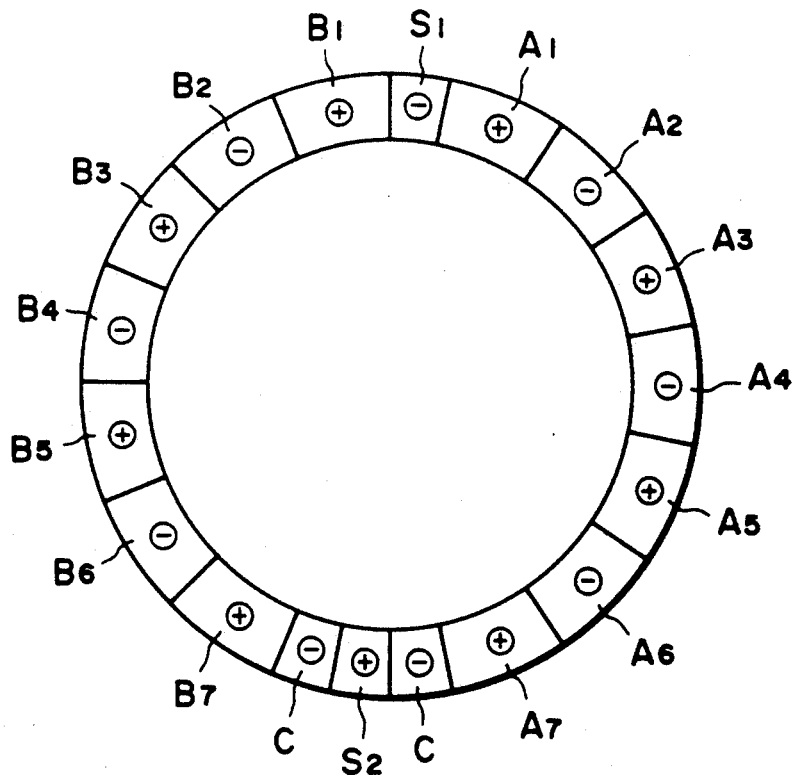
Figure 58:
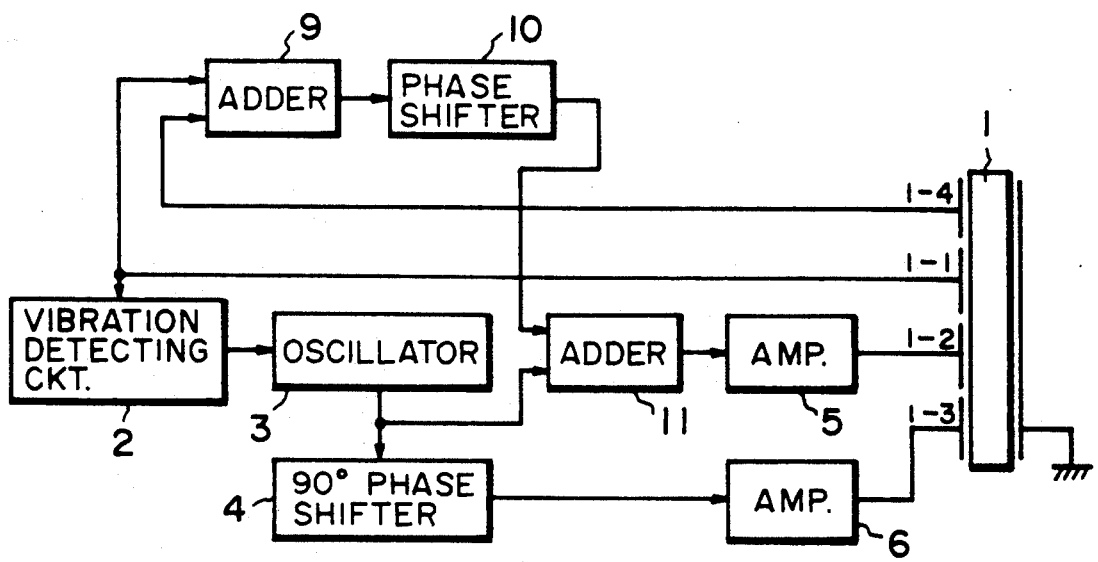
FIG. 58 is a block diagram schematically showing the construction of a drive control circuit for driving a vibration member having the polarization pattern of FIG. 57.

Also, where the wave number of the vibration to be suppressed is approximate to the wave number of the vibration of the driving signal, it is possible to utilize the A phase or the B phase (or both) which is the above-described driving phase as a third driving phase. An example of the polarization pattern of the vibration member in such case is shown in FIG. 57, and the construction of the control circuit used in such case is shown in FIG. 58. That is, in the present embodiment, the component of the waves of the driving signal is attenuated by an adder circuit 9, and a signal representative of unnecessary vibration is taken out and is phase-shifted by a predetermined amount by the phase shifter, whereafter it is superposed on the driving signal of the A phase which is the driving phase, whereby the A phase is driven to thereby achieve the suppression of unnecessary vibration.

As regards the amount of phase shift by the phase shifter shown in FIG. 58, assuming that the vibration mode to be suppressed is seven waves, the circumferential distance d to the center of the A phase (the center of the $A_4$ phase) is found as follows by the use of the wavelength $\lambda_8$ of the driving wave:

$$d = \frac{\lambda_8}{2} + 3 \cdot \lambda_8 + \frac{\lambda_8}{4} + \frac{\lambda_8}{8} = \frac{31}{8}\lambda_8$$

This can be expressed as follows by the phase $\theta$ of seven waves:

$$\theta = \frac{2\pi}{\lambda_7} \cdot d = \frac{2\pi}{\lambda_7} \cdot \frac{31}{8} \cdot \lambda_8$$

$$= \frac{2\pi}{\lambda_7} \cdot \frac{31}{8} \cdot \frac{7}{8}\lambda_7 = \frac{434}{64}\pi = 6\frac{50}{64}\pi$$

It is desirable that after the phase shift, $\theta' = 2a\pi \pm \frac{1}{2}\pi$ (a is an integer, and the sign thereof is determined by the direction of polarization and the direction of travel of the vibration to be suppressed).

From $$\theta' = \theta + \Delta\theta$$

$$\Delta\theta = -\frac{18}{64}\pi \text{ or } \frac{46}{64}\pi$$

Accordingly, the amount of phase shift can be set on the basis of this.

Figure 59:
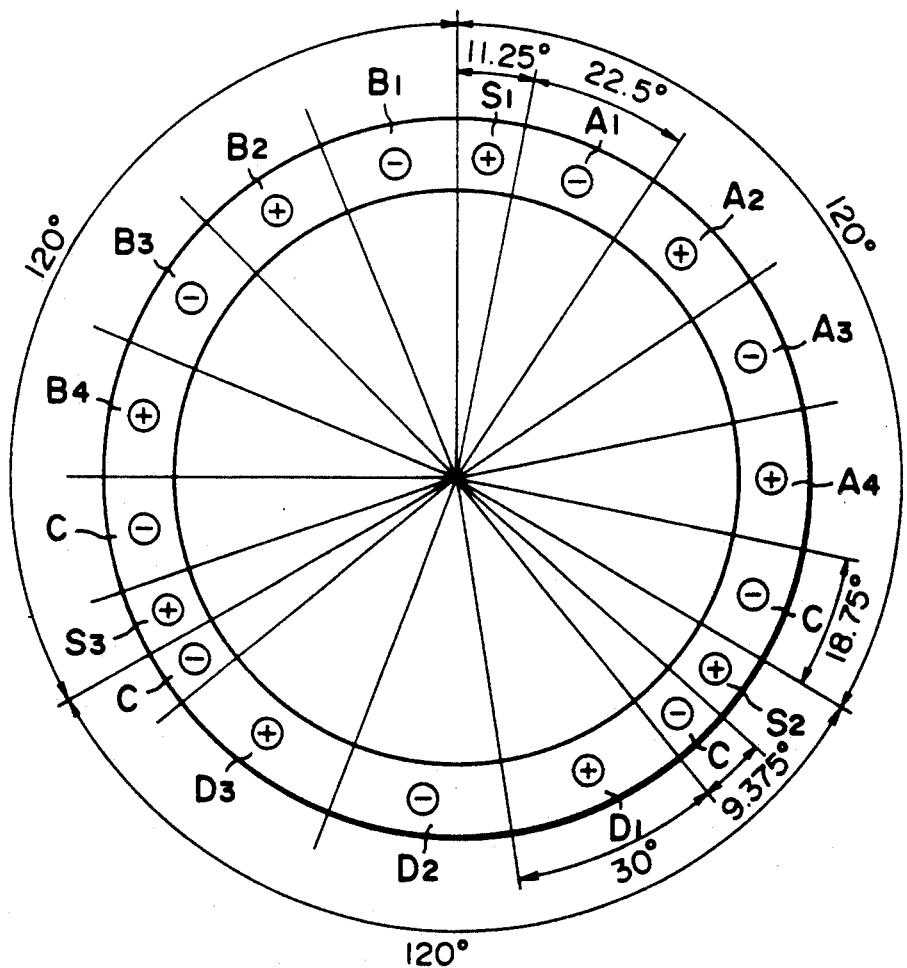
FIGS. 59 to 61 illustrate another embodiment of the present invention, FIGS. 59 and 61 showing the polarization patterns of a vibration member in the same embodiment, and FIG. 60 being a block diagram schematically showing the construction of a driving circuit for driving a vibration member having such polarization patterns.
Figure 60:
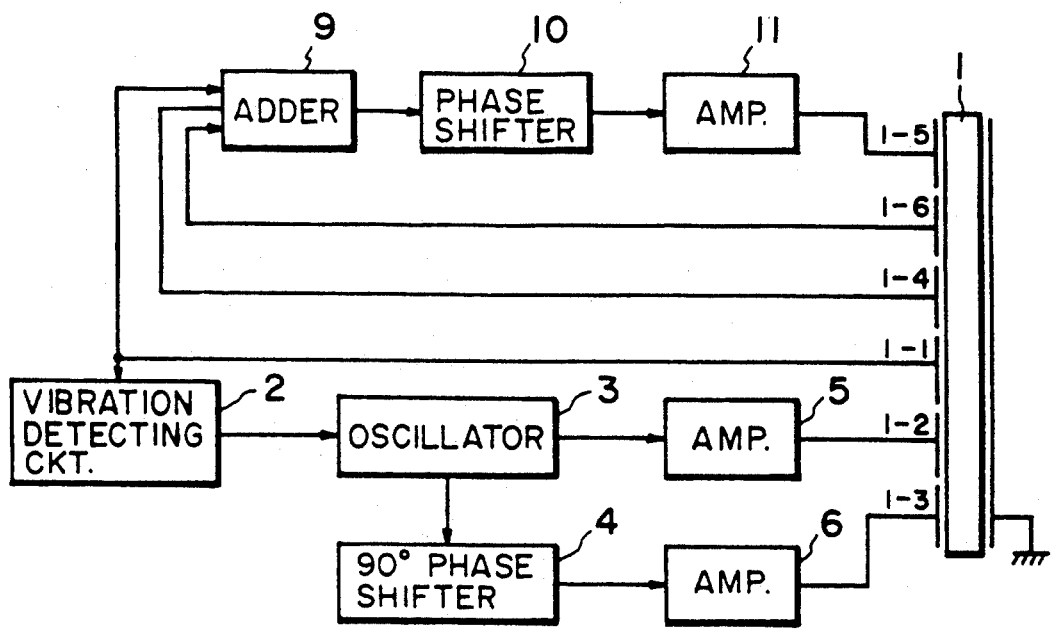
Figure 61:
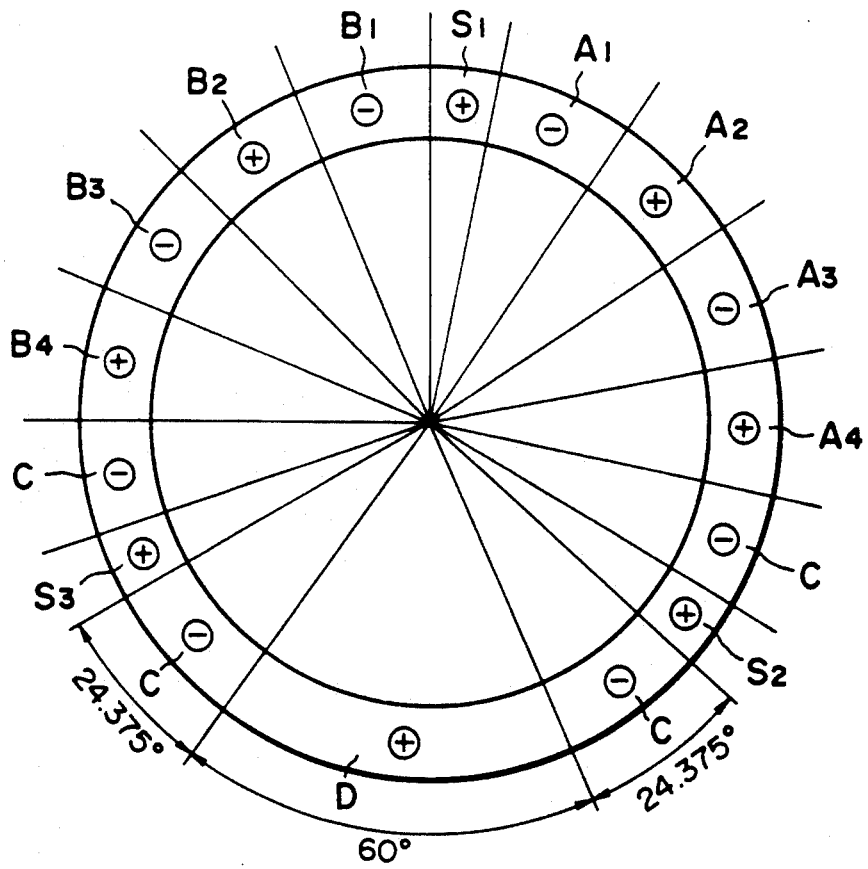

FIGS. 59 to 61 show an embodiment in which three or more S phases are provided, and the embodiment shown in FIGS. 59 to 61 will hereinafter be described.

In FIG. 59, the wave number of the driving vibration of the vibration wave motor is eight, and A phase piezoelectric element groups $A_1$-$A_4$ and $B_1$-$B_4$ for driving are spatially disposed with an interval of $\lambda_8/4$ therebetween, and $S_1$-$S_3$ phases which are vibration detecting phases are disposed at three locations spaced apart by 120° from one another.

Here, supposing a vibration of six waves, for example, as unnecessary vibration, the component of the sum of the output voltages of the $S_1$-$S_3$ phases is as follows (with the center of the $S_1$ phase as the reference):

$$V_8 = \cos\left(\omega_8 t - \frac{2\pi}{\lambda_8} \cdot 0\right) +$$

$$\cos\left(\omega_8 t - \frac{2\pi}{\lambda_8} \cdot \frac{L}{3}\right) +$$

$$\left\{\cos\left(\omega_8 t - \frac{2\pi}{\lambda_8} \cdot \left(-\frac{L}{3}\right)\right)\right\}$$

$$= \cos(\omega_8 t) + \cos\left(\omega_8 t - \frac{2\pi}{\lambda_8} \cdot \frac{L}{3}\right) +$$

$$\cos\left(\omega_8 t + \frac{2\pi}{\lambda_8} \cdot \frac{L}{3}\right)$$

Here, $8\lambda_8 = L$ (L being the circumferential length) and therefore, $$V_8 = \cos(\omega_8 t) + \cos(\omega_8 t - 16/3 \cdot \pi) +$$
$$\cos(\omega_8 t + 16/3 \cdot \pi)$$
$$= \cos(\omega_8 t) + \cos(\omega_8 t) \cdot \cos(16/3 \cdot \pi) +$$
$$\sin(\omega_8 t) \cdot \sin(16/3 \cdot \pi) + \cos(\omega_8 t) \cdot \cos(16/3 \cdot \pi) -$$
$$\sin(\omega_8 t) \cdot \sin(16/3 \cdot \pi)$$
$$= \{1 + 2\cos(16/3 \cdot \pi)\} \cdot \cos(\omega_8 t)$$

However, $\cos(16/3 \cdot \pi) = -\frac{1}{2}$ and accordingly, $V_8 = 0$. With regard to six waves, $$V_6 = \cos\left(\omega_6 t - \frac{2\pi}{\lambda_6} \cdot 0\right) +$$

$$\cos\left(\omega_6 t - \frac{2\pi}{\lambda_6} \cdot \frac{L}{3}\right) +$$

$$\left\{\cos\left(\omega_6 t - \frac{2\pi}{\lambda_6} \cdot \left(-\frac{L}{3}\right)\right)\right\}$$

Since $L = 6\lambda_6$, $$V_6 = \cos(\omega_6 t) + \cos(\omega_6 t - 4\pi) +$$
$$\cos(\omega_6 t + 4\pi)$$
$$= 3\cos(\omega_6 t)$$

and with regard to six waves, there is obtained a signal amplified to three times.

The vibration control circuit in this case can be constructed as the circuit block of FIG. 60 in which the adder circuit of FIG. 54 is replaced with a three-input type one.

It is apparent that where the $S_1$-$S_3$ phases are disposed as shown in FIG. 59, a result similar to that in the case of the previously shown six waves is obtained with regard also to three waves and nine waves which are multiples of 3 and waves which are multiplies thereof. Also, if for example, three waves is the subject of unnecessary vibration, it will result in further improved efficiency to make the circumferential length of the D phase approximate to $\frac{1}{2}$ of the wavelength of the relevant subject unnecessary vibration, as shown in FIG. 61 which is a modification of FIG. 59.

As regards the C phases of FIGS. 59 and 61, some or all thereof may be GND phases as in the case described above.

Figure 62:
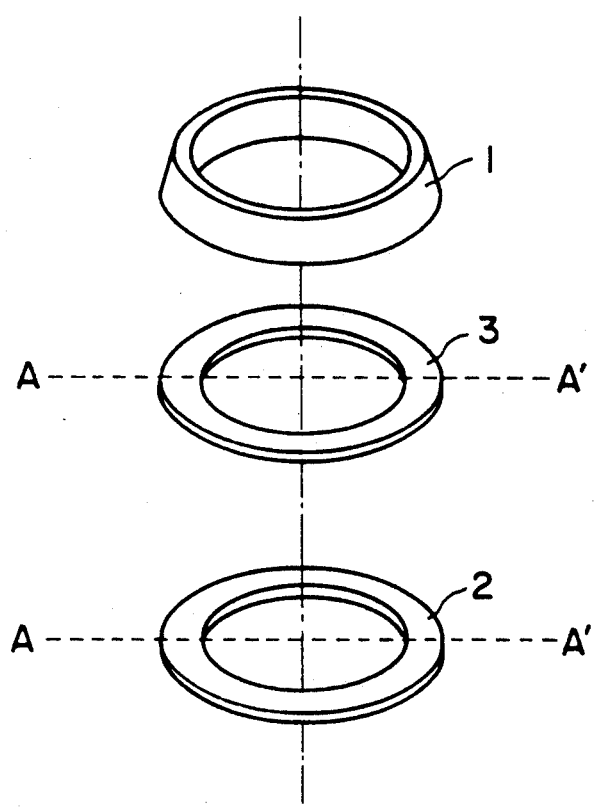
FIG. 62 is an exploded perspective view of a vibration member showing another embodiment of the vibration wave motor according to the present invention.

FIG. 62 is a perspective view of another embodiment of the present invention.

Figure 63A:
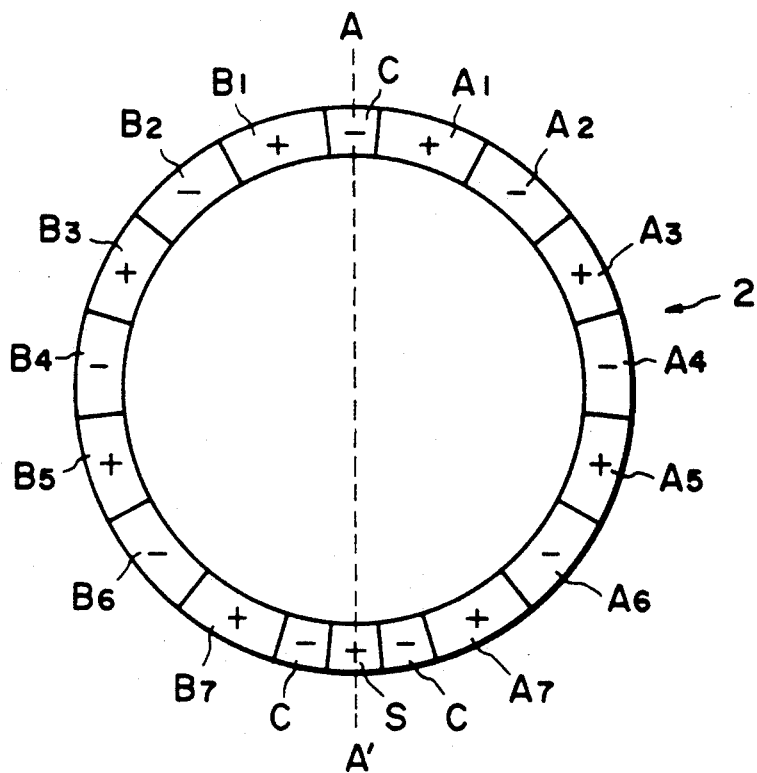
FIGS. 63A and 63B show the electrode patterns of a PZT thereof.
Figure 63B:
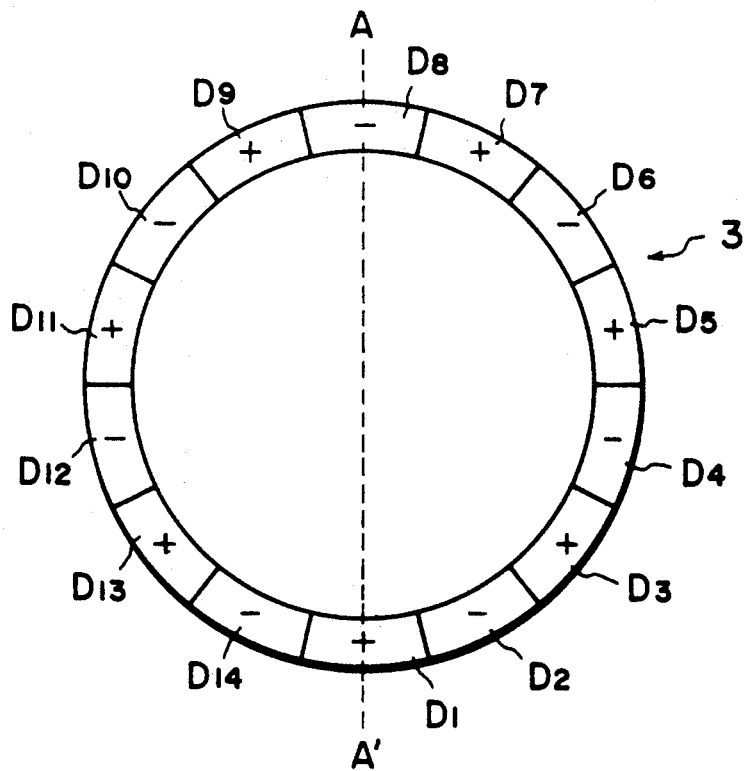
Figure 64:
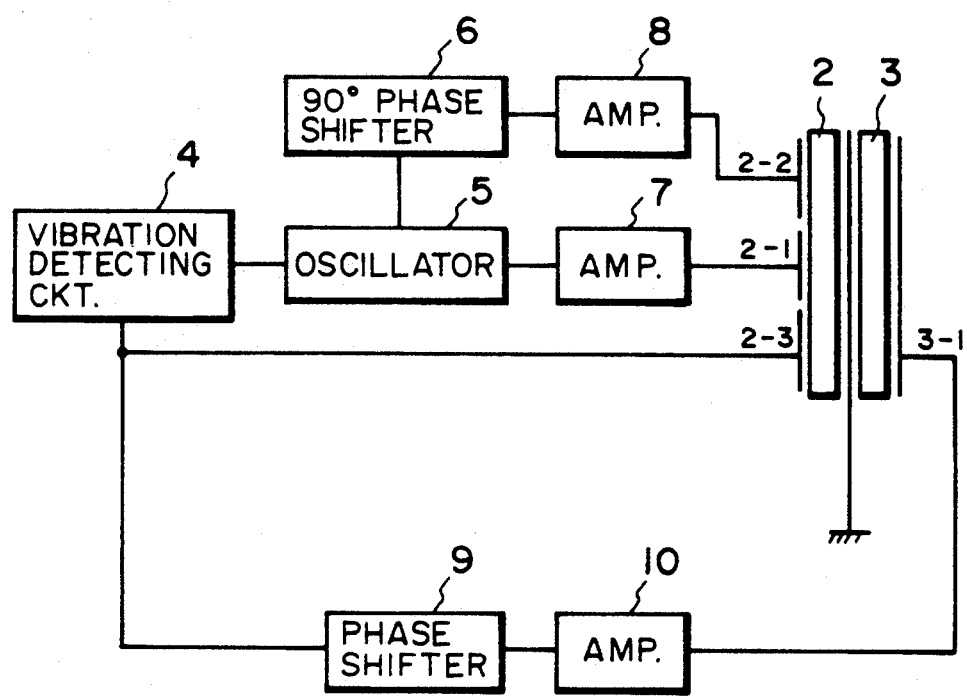
FIG. 64 is a block diagram of a circuit used in the motor shown in FIG. 62.

In FIG. 62, the reference numeral 1 designates a resilient member, the reference numeral 2 denotes an electro-mechanical energy converting element generating travelling vibration waves of the design value (hereinafter referred to as PZT), and the reference numeral 3 designates a PZT for suppressing unnecessary vibration. These PZT's 2 and 3 are subjected to the electrode arrangement and polarization as shown, for example, in FIGS. 63A and 63B, and are lamination-arranged. This embodiment shows the wave number of the travelling vibration waves of the design value as eight, and the wave number of unnecessary vibration of other value than the design value as seven. Also, the PZT's 2 and 3 are adhesively secured to each other so that the lines A—A' of FIG. 62 and the lines A—A' of FIG. 63 coincide with each other. FIG. 64 is a circuit block diagram of the present embodiment, and the output of an oscillator 5 is input to one electrode 2-1 (A phase) of the PZT 2 through an amplifier 7. On the other hand, the output of the oscillator 5 is passed through a 90° phase shifter 6, and thereafter is amplified by an amplifier 8 and input to another electrode 2-2 (B phase) of the PZT 2, whereby travelling vibration waves are generated on the resilient member. Further, the travelling vibration waves on the resilient member are detected by a vibration detecting phase 2-3 (hereinafter referred to as the S phase), and the state of vibration is detected by a vibration detecting circuit 4, and the oscillation frequency of the oscillator 5 is controlled to thereby maintain a predetermined state of vibration. Also, when vibration of other value than the design value is generated due to the frictional force between the resilient member and the moving member, the vibration of other value than the design value can be suppressed by providing vibration of the opposite phase to the generated vibration.

Figure 78:
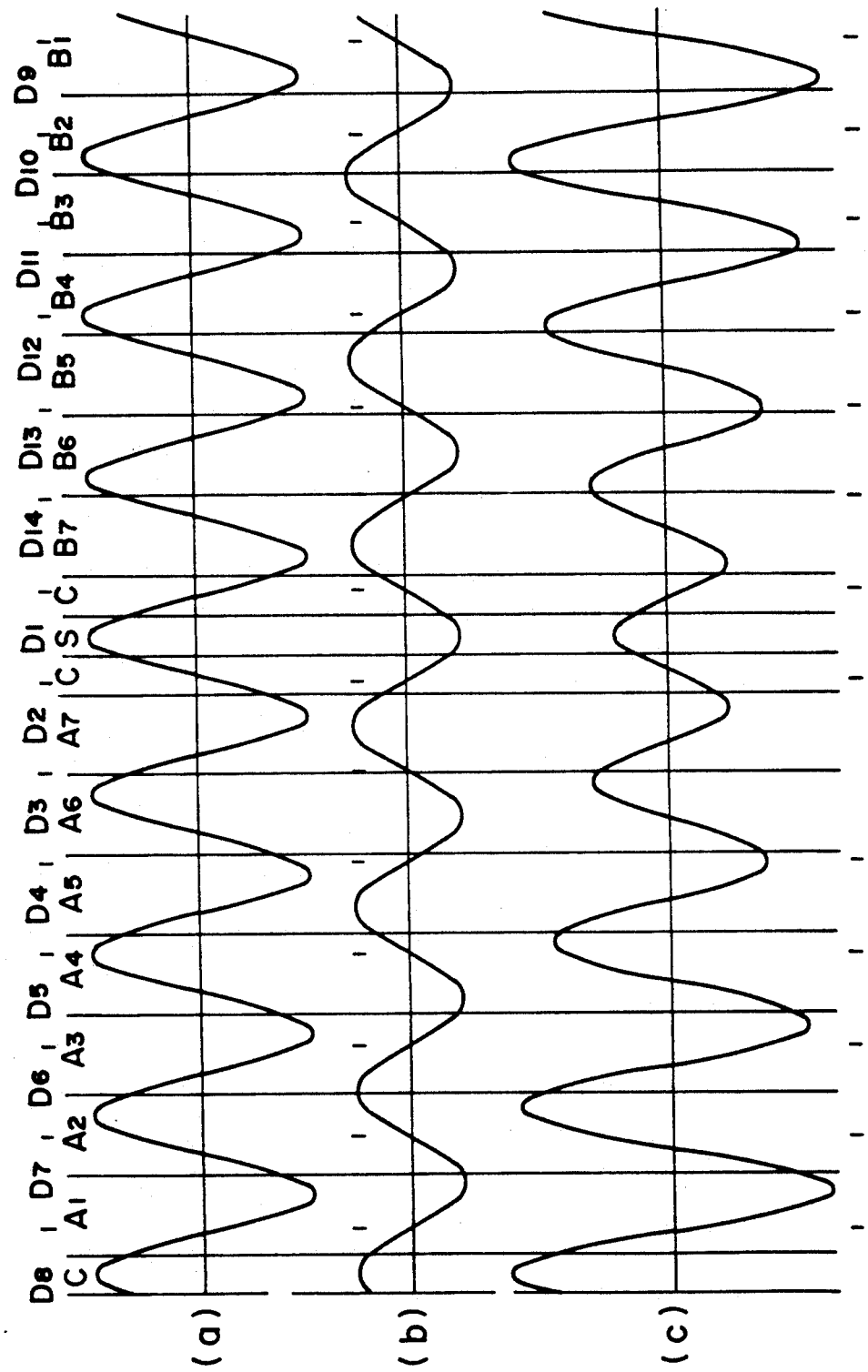
FIGS. 78(a), (b) and (c) illustrate the operation of the FIG. 62 embodiment.

The vibration being generated on the resilient member is such as shown in FIG. 78. FIG. 78 shows the driving waves (eight waves) which are of the design value in (a), the generated unnecessary vibration (seven waves) in (b), and the vibration obtained by synthesizing these when actually observed in (c), and shows the electrode arrangement of the PZT of FIG. 63A by a dotted line, and shows the electrode arrangement of the PZT of FIG. 63B by a short solid line.

Here, to suppress the generated vibration of seven waves, vibration of the opposite phase to the vibration shown in FIG. 78B can be generated. For that purpose, by the basic equations of piezo-electricity $$F = -A_D V_D + Z_m V_D \; (Z_m = R)$$

$$I = Y_d V_s + A_s V_s$$

$$(Y_{ds} = j\omega c_d)$$

with I=0 in the S phase, $V_S$ can be expressed as $$V_s = -\frac{A_s v}{Y_{ds}} = j\frac{A_s v_s}{\omega c_d} \qquad (1)$$

and likewise, with F=0 in the driving phase, $V_D$ can be expressed as $$V_D = \frac{Z_m v_D}{A_D} = \frac{R v_D}{A_D} \qquad (2)$$

(Here, $A_S$ and $A_D$ are the force coefficients of the S phase and the D phase, respectively, $C_d$ is the brake capacity of the S phase, $\omega$ is the angular frequency of the seven-wave vibration, and R is the input resistance of the seven-wave vibration.) Further, from FIG. 78, it is apparent that the S phase and the D phase (the $D_1$ phase) exist at the same position and therefore, to negate the seven-wave vibration being generated, $$v_s = -v_D \qquad (3)$$

is established and accordingly, a voltage which is $$V_D = \frac{j\omega c_d R}{A_S A_D} V_S \qquad (4)$$

can be given to the D phase.

In the present embodiment, the use of the PZT exclusively for use as the unnecessary vibration suppressing phase (the D phase) leads to the following effects.

1. A wide area of the D phase can be secured and therefore, the force coefficient can be made great. Accordingly, the gain of the amplifier 10 can be made small with a result that the power source voltage can be made low.

2. If the vibration mode to be suppressed is limited to one as shown in FIG. 63B, the force coefficient can be made zero relative to the other modes. Accordingly, if only the saturation of the D phase input signal does not occur, there will arise no problem even if the signal of the driving frequency is not attenuated.

Also, as an electric power supply method in the present embodiment, it is relatively simple to make those surfaces of the PZT's 2 and 3 which are secured to each other into a common electrode (a grounded electrode) as shown in FIG. 64, and supply electric power to the surfaces opposite thereto.

Figure 65A:
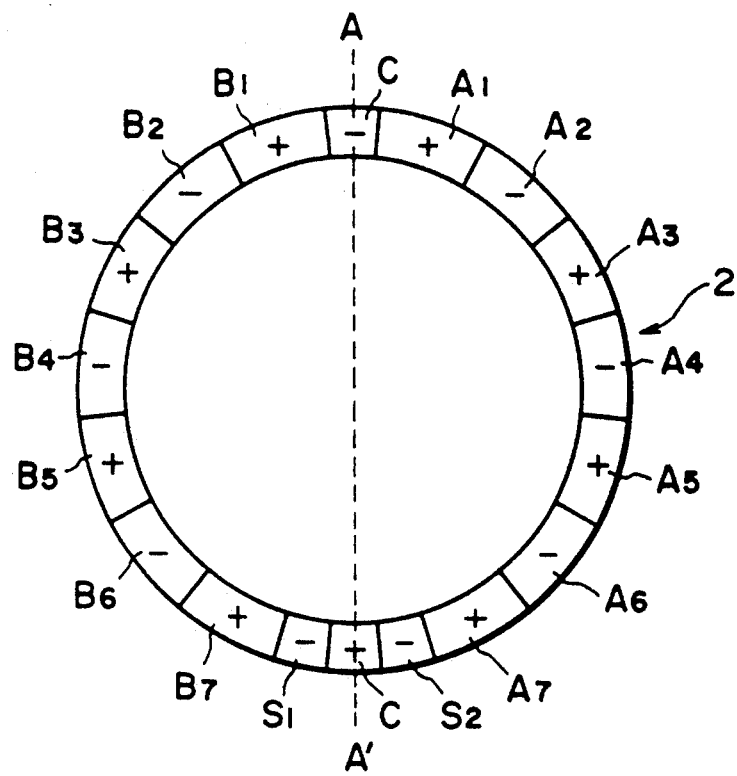
FIGS. 65A and 65B show the electrode patterns of a PZT in the circuit of FIG. 66 which shows another embodiment.
Figure 65B:
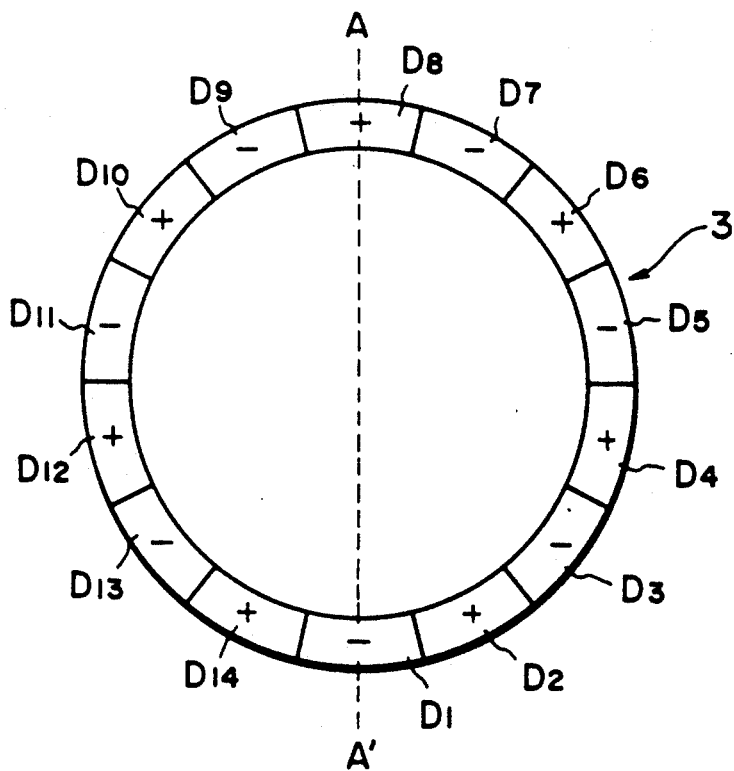
Figure 66:
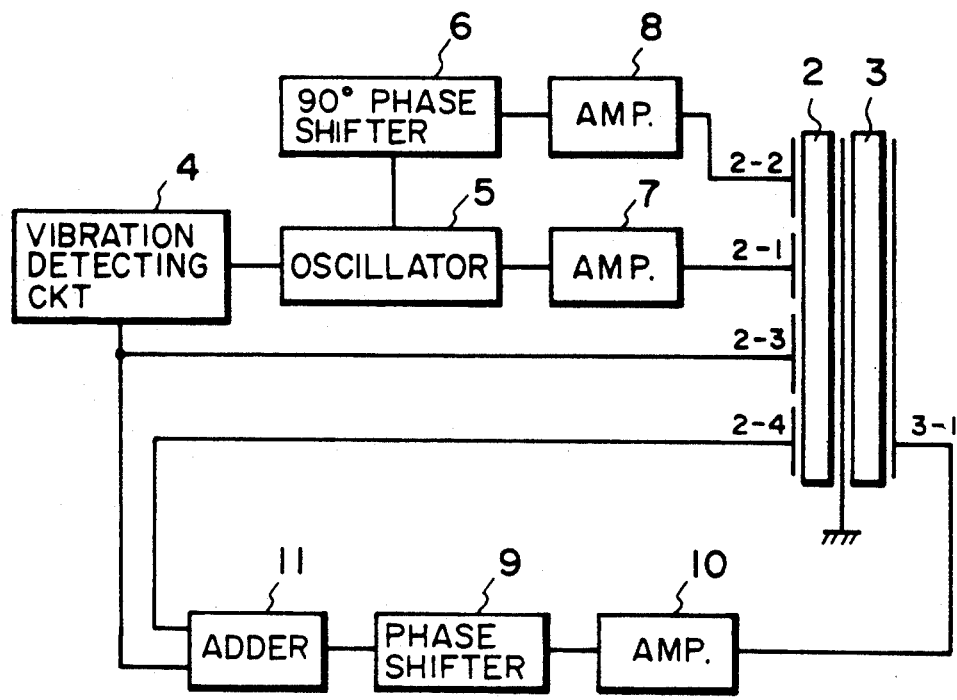
FIG. 66 is a circuit block diagram showing another embodiment of the present invention.

FIGS. 65 and 66 show another embodiment of the present invention. In the previous embodiment (FIGS. 63 and 64), the attenuation of the driving signal is not effected and therefore, where the supply of electric power to the PZT 3 is effected through the resilient member 1, a great voltage is applied to the resilient member and it becomes necessary to take the insulation with respect to the surrounding parts into consideration.

The present embodiment is of a construction in which as shown in FIG. 65A, two S phases $S_1$ and $S_2$ are provided at locations distant by integer times the ¼ wavelength of the driving wave and as shown in FIG. 66, the outputs of the two S phases 2-3 and 2-4 are added or subtracted by an adder 11 so as to suppress a driving frequency signal. Also, the fact that the direction of polarization in FIG. 65B is opposite to that in FIG. 63B is made to correspond to the fact that the direction of polarization of the S phase in FIG. 65A is opposite to that in FIG. 63A, but of course, this is also possible by reversing the surface of one PZT when adhesively securing the PZT's 2 and 3 to each other or by reversing the phase on the circuit.

Figure 67A:
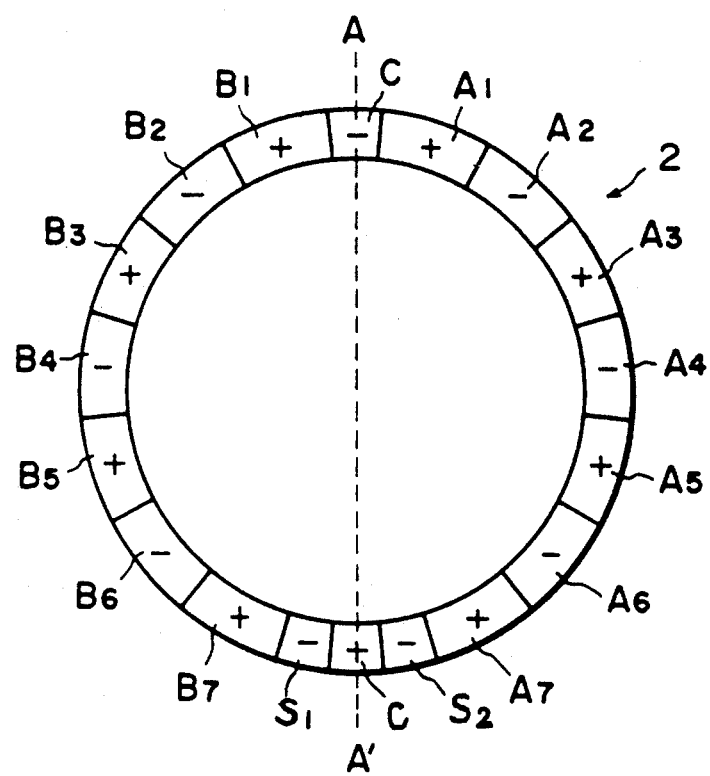
FIGS. 67A and 67B show the electrode patterns of a PZT in another embodiment shown in FIG. 68.

FIG. 67 shows still another embodiment of the present invention.

Figure 67B:
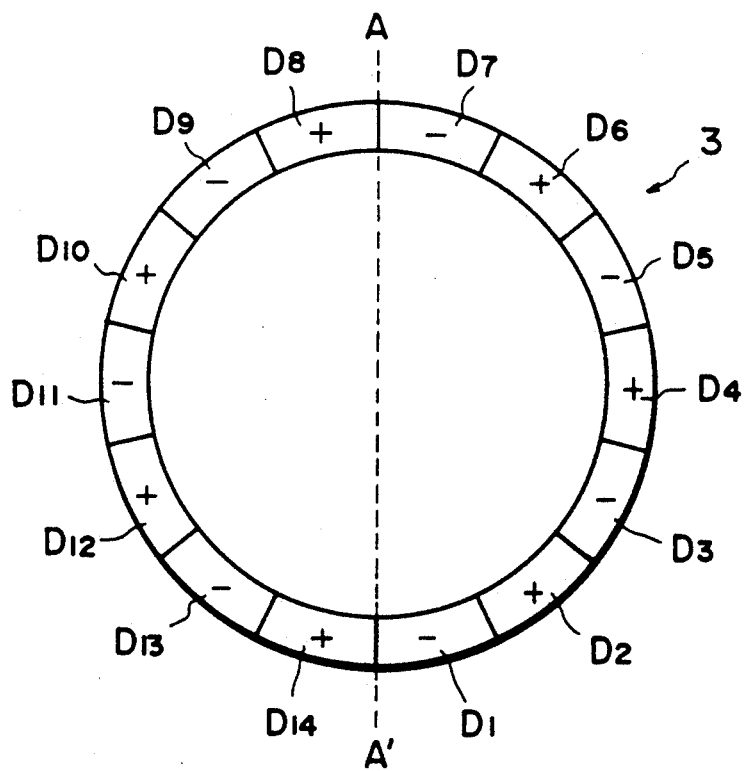
Figure 68:
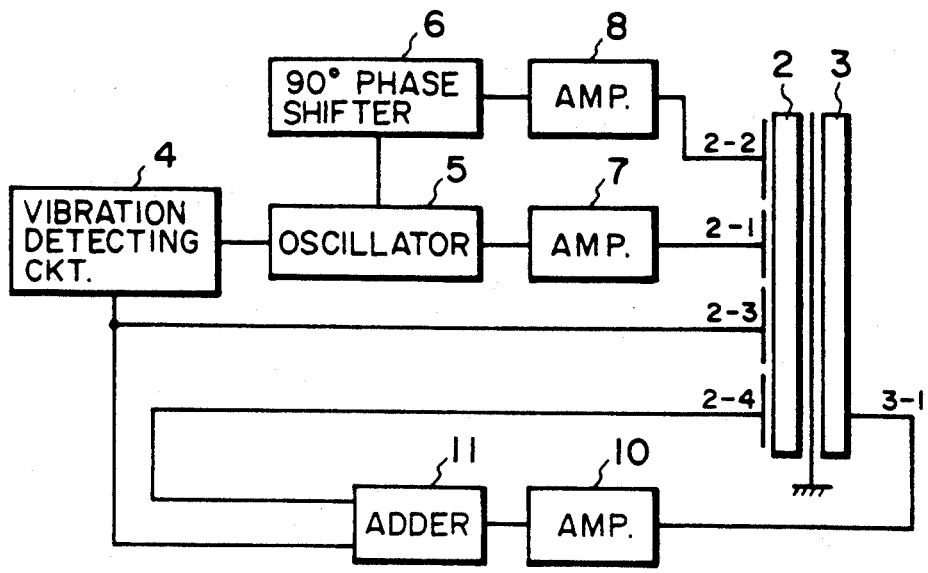
FIG. 68 is a circuit block diagram showing another embodiment of the present invention.

This embodiment is one in which as shown in FIG. 67B, the PZT 3 is deviated by 90° of the waves to be suppressed, for example, when it is adhesively secured, and in the driving circuit in this case, the phase shifter 9 in FIGS. 64 and 66 becomes unnecessary as shown in FIG. 68. However, depending on the direction of travel of the waves to be suppressed, the content of the amplifier 10 need be selected to one of inverting amplification and non-inverting amplification.

Figure 69:
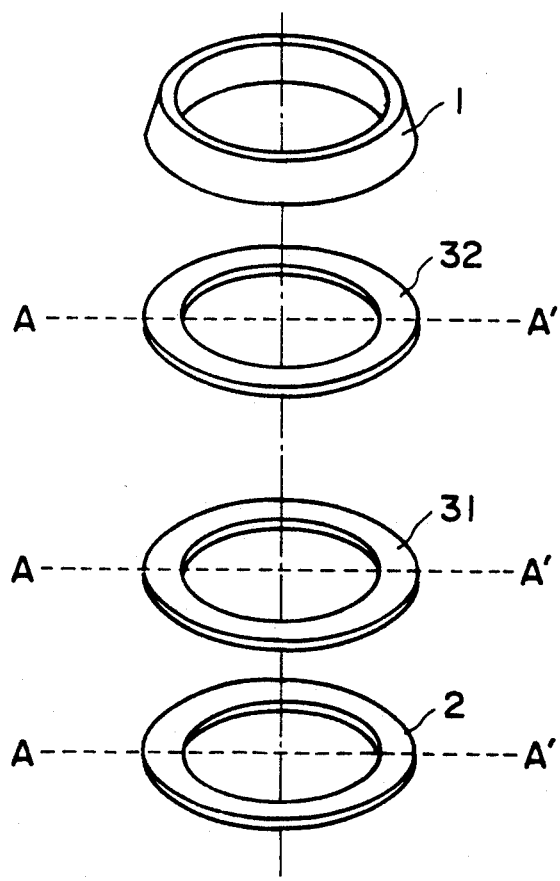
FIG. 69 is an exploded perspective view of a vibration member in another embodiment of the present invention.

FIG. 69 shows another embodiment of the present invention.

Figure 70A:
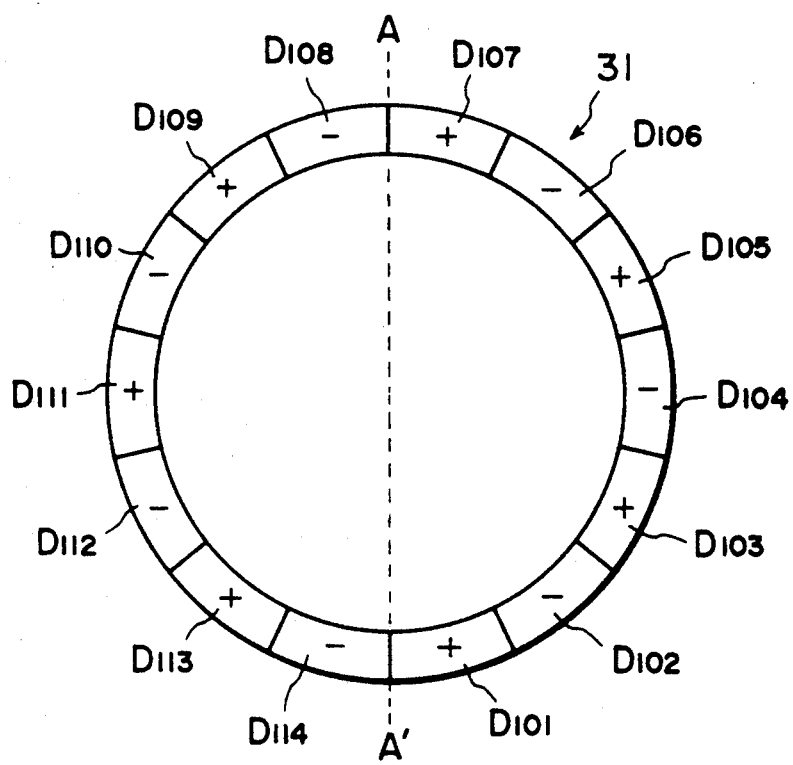
FIGS. 70A and 70B show the electrode patterns of PZT in the FIG. 69 embodiment.
Figure 70B:
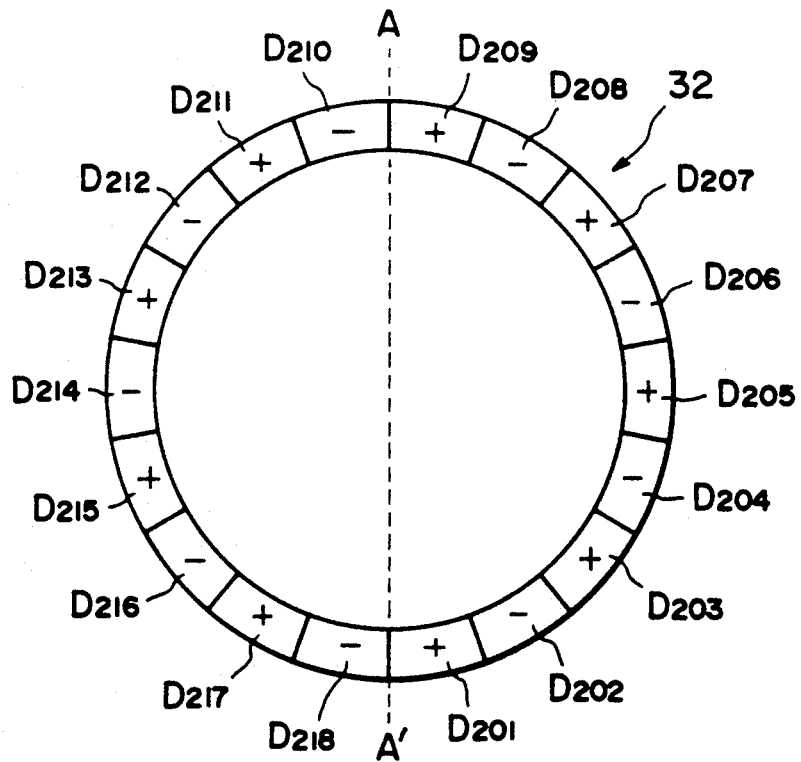
Figure 71:
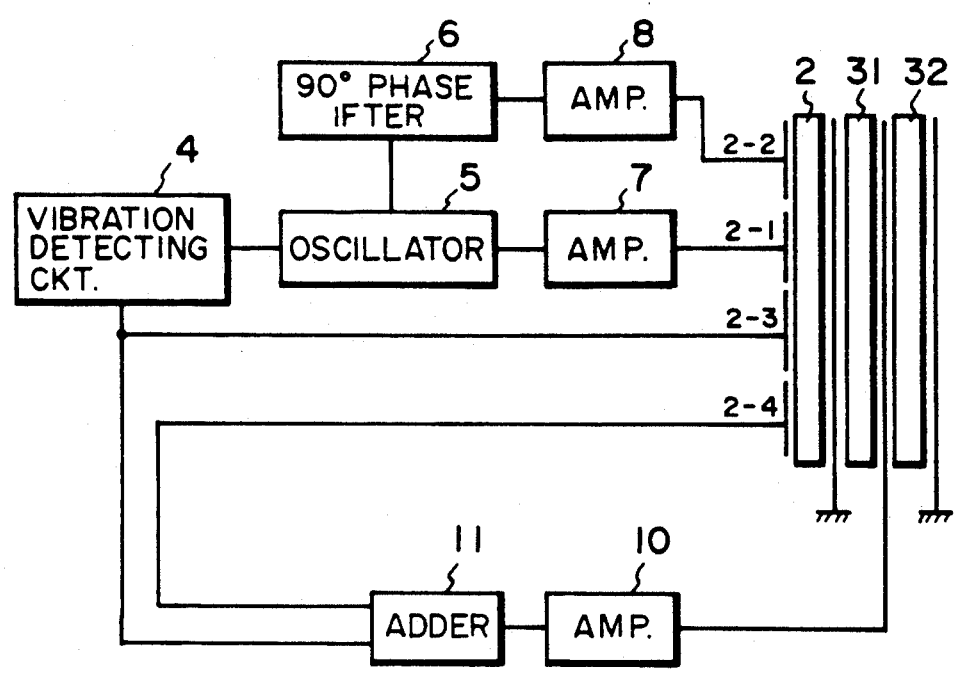
FIG. 71 is a circuit block diagram of the FIG. 69 embodiment.

This embodiment enables a plurality of unnecessary vibration modes to be suppressed at a time by making the vibration suppressing PZT into two first and second PZT's 31 and 32. The electrode arrangements of the PZT's 31 and 32 in this case are shown in FIGS. 70A and 70B. The driving PZT has the electrode arrangement of FIG. 65A. A block diagram of the driving circuit is shown in FIG. 71, but this circuit is basically the same as the circuit of FIG. 68 and therefore need not be described.

Figure 72:
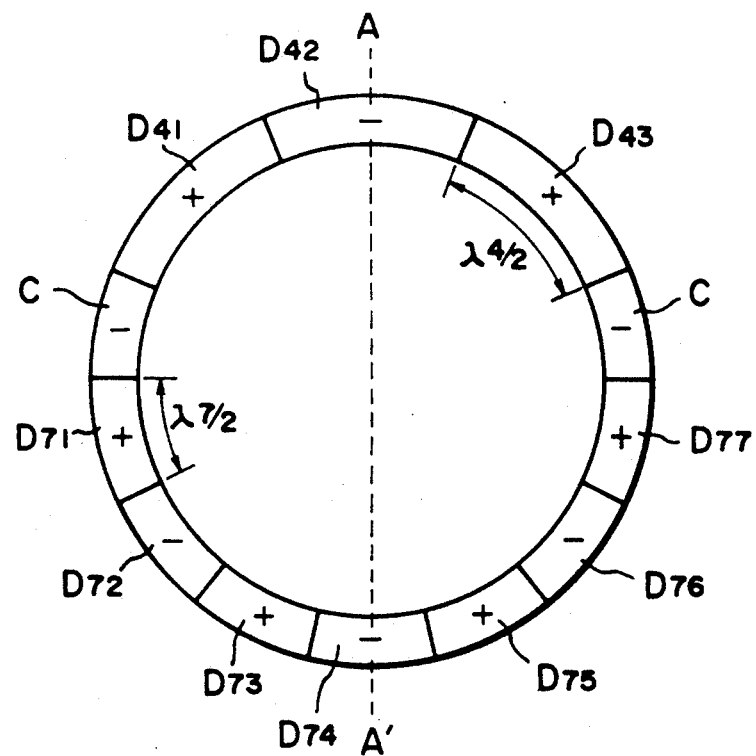
FIG. 72 shows the electrode pattern of PZT in an embodiment shown in FIG. 73.

FIG. 72 shows another embodiment of the present invention.

The hitherto described embodiments (FIGS. 62–71) have been shown with respect to an example in which electrodes of only one mode are arranged on an unnecessary vibration suppressing PZT, but it is also possible to arrange electrodes of a plurality of modes on a PZT. An example of the electrode arrangement on the PZT in this case is shown in FIG. 72. The driving PZT is the same as that shown in FIG. 65A.

Figure 73:
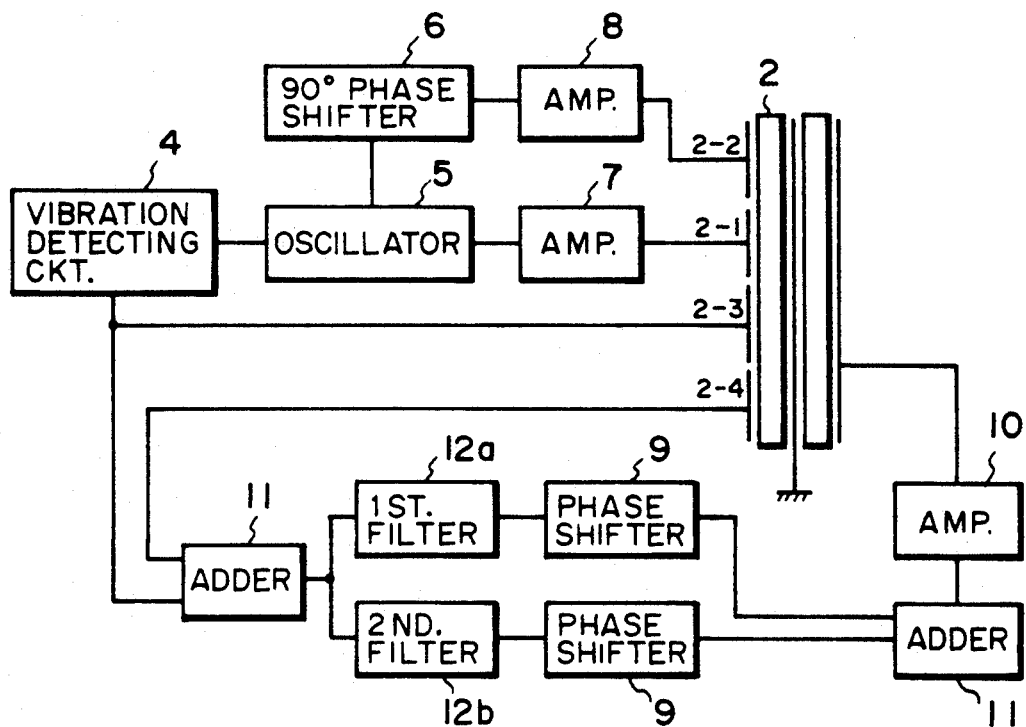
FIG. 73 is a circuit block diagram showing another embodiment of the present invention.
Figure 74:
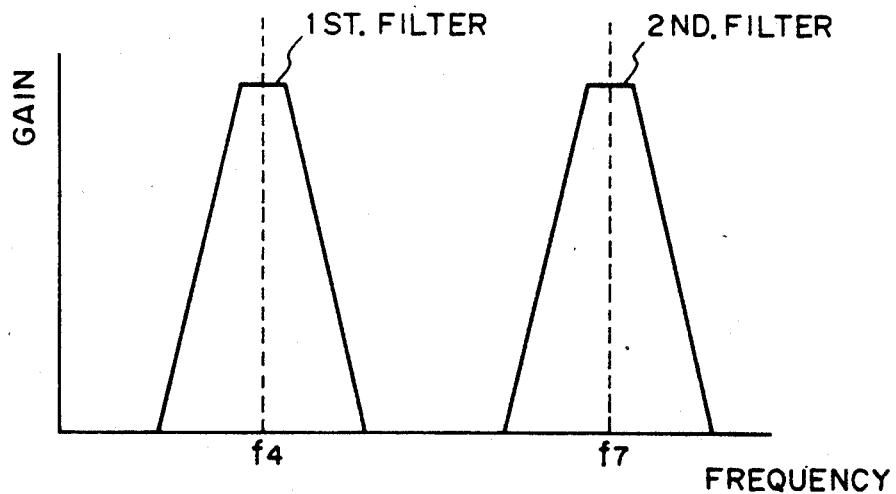
FIG. 74 is a graph showing the frequency characteristics of filters shown in FIG. 73.

The example shown in FIG. 72 is intended to suppress vibrations of seven waves and four waves at a time, but where a plurality of vibration modes coexist on a PZT, the PZT has a force coefficient also for the other vibration modes (in the case of the present example, the other vibration modes than four and seven waves) and therefore, care need be taken. Accordingly, as shown in FIG. 73 which is a block diagram of the driving circuit, it is desirable to have a filter circuit which sufficiently attenuates the other vibration frequency components than the desired vibration modes (in the present embodiment, seven waves and four waves). FIG. 73 shows an embodiment having a first filter 12a for passing the vicinity of the frequency of four waves and a second filter 12b for passing the vicinity of the frequency of seven waves, and examples of the frequency characteristics of the first filter 12a and the second filter 12b are shown in FIG. 74.

FIG. 75 shows still another embodiment of the present invention.

Figure 75A:
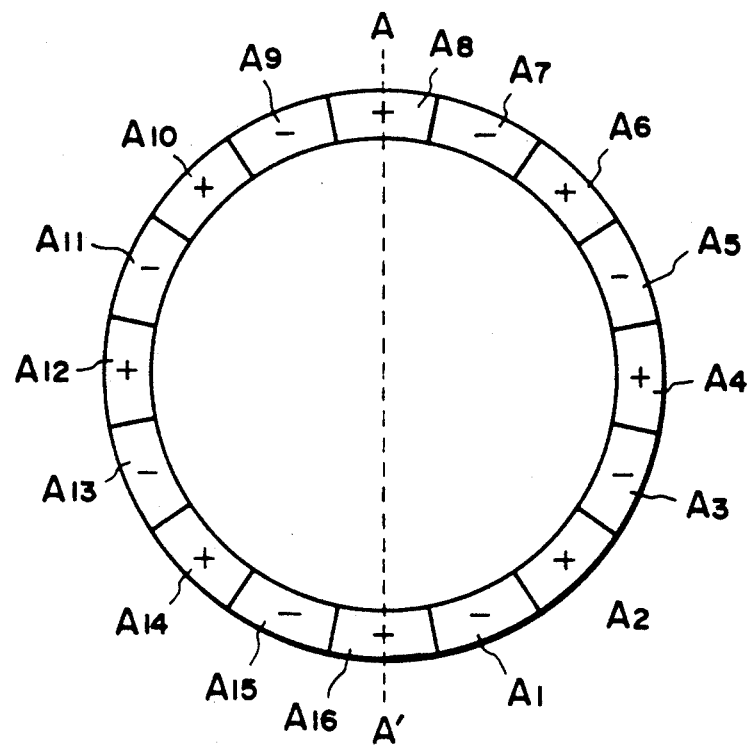
FIGS. 75A and 75B show the electrode patterns of a PZT in an embodiment shown in FIG. 76.
Figure 75B:
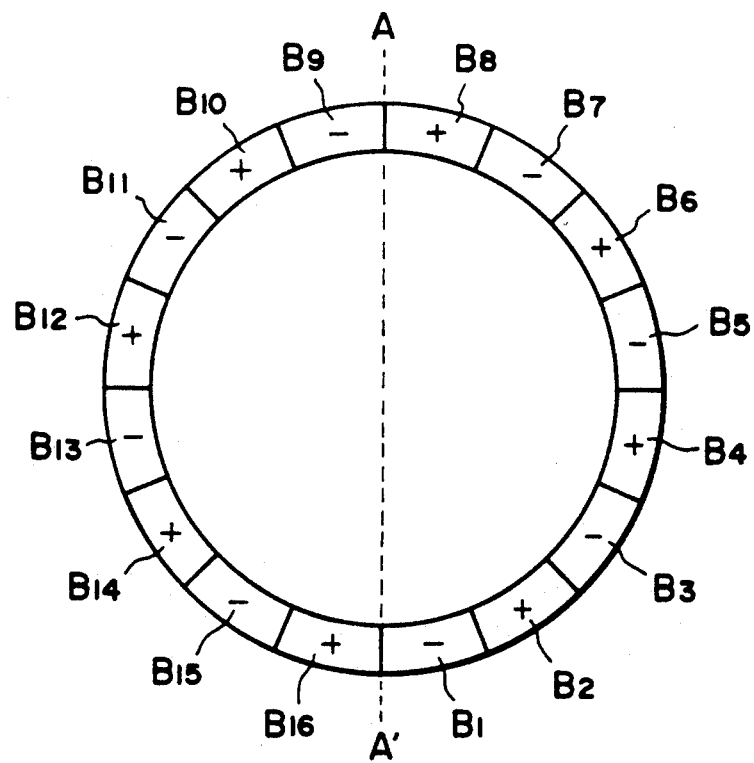
Figure 76:
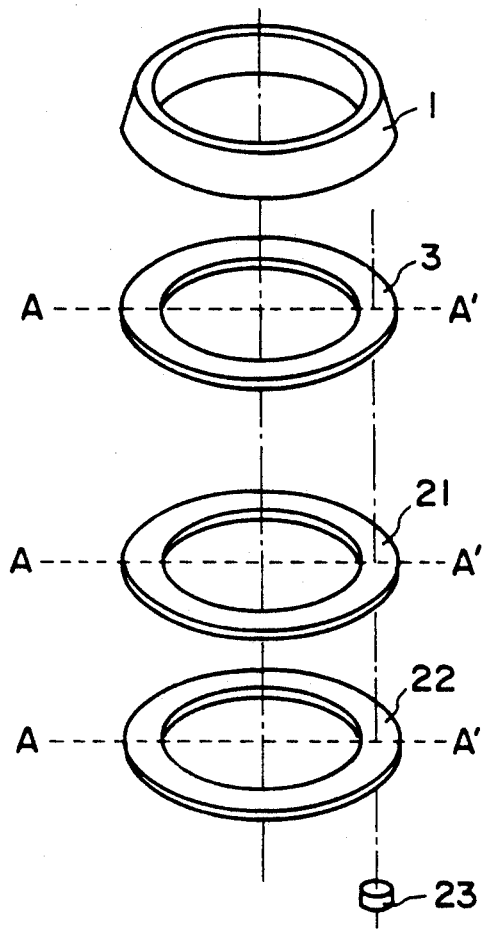
FIG. 76 is an exploded perspective view showing another embodiment of the motor of the present invention.
Figure 77:
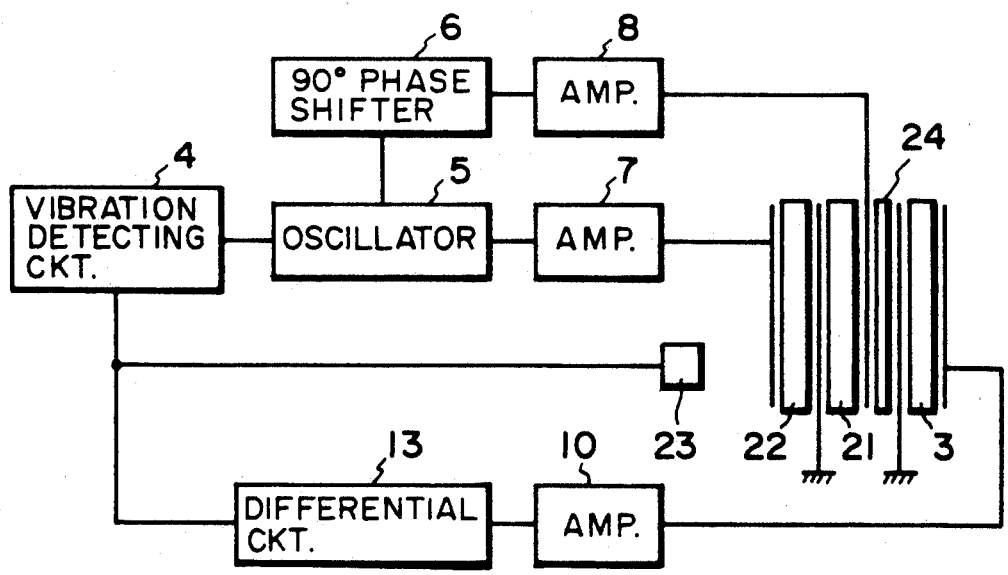
FIG. 77 is a circuit block diagram of the FIG. 76 embodiment.

This embodiment is one in which driving PZT's 21 and 22 have electrode arrangements as shown in FIGS. 75A and 75B and are of two-sheet construction and which has no S phase, and as shown in FIG. 76, means 23 for detecting the state of vibration is separately provided to thereby accomplish the suppression of unnecessary vibration. For example, a gap sensor is usable as the means for detecting the state of vibration. Also, when it is assumed that the vibration detecting means outputs a voltage proportional to displacement (the distance from the sensor), the block diagram of the driving circuit in this case is such as shown in FIG. 77. It is because the DC component of the output of the gap sensor 23 is taken into consideration that a differential circuit 13 is used in FIG. 77, and if the DC component is negligible, the differential circuit 13 may safely be replaced by a phase shifter. In FIG. 77, the reference numeral 24 designates an insulating member.

We claim:

1. A vibration wave motor for producing a driving force from vibration waves generated in response to the application of driving frequency signals, said motor comprising:
   (a) an electro-mechanical energy converting element which produces vibration waves in response to the application of the driving frequency signal, said electro-mechanical energy converting element comprising at least first and second driving element portions;
   (b) a driving frequency signal forming circuit for forming driving frequency signals of different phases;
   (c) a suppressing signal forming circuit forming a vibration suppressing signal to suppress vibrations other than a desired vibration wave; and
   (d) applying means for applying a driving frequency signal and a vibration suppressing signal to said first driving element portion and for applying to said second driving element portion a driving frequency signal of a phase different from the phase of the driving frequency signal applied to said first driving element portion and the vibration suppressing signal.

2. A vibration wave motor for producing a driving force from vibration waves generated in response to the application of driving frequency signals, said motor comprising:
   (a) an electro-mechanical energy converting element which produces vibration waves in response to the application of the driving frequency signals, said electro-mechanical energy converting element comprising at least first and second driving element portions and a suppressing element portion; and
   (b) applying means for applying driving frequency signals of different phases to said first and second driving element portions, respectively, and for applying a vibration suppressing signal to said suppressing element portion.

3. A vibration wave motor according to claim 2, provided with detecting means for detecting the state of vibration and wherein a signal based on the detection output of said detecting means is applied as said vibration suppressing signal.

4. A vibration wave motor according to claim 3, wherein said electro-mechanical energy converting element has a vibration detecting element portion which acts as said detecting means.

5. A vibration wave motor according to claim 3, provided with a delay circuit for delaying the output of said detecting means by a predetermined time and wherein a signal passed through said delay circuit is applied as said vibration suppressing signal.

6. A vibration wave motor according to claim 3, provided with a phase shifter to which the output of said detecting means is input and wherein the output signal of said phase shifter is applied as said vibration suppressing signal.

7. A vibration wave motor in which an AC voltage is applied to first and second driving phases each comprising an electro-mechanical energy converting element to thereby generate travelling vibration waves on a vibration member and a member which is in pressure contact with said vibration member is moved relative to the latter, including:
   (a) one or more vibration detecting phases for detecting the state of vibration of said vibration member, and a third driving phase for vibration suppression, said detecting phase or phases and said third driving phase being provided on said vibration member; and
   (b) input means for inputting a signal detected by said vibration detecting phase or phases to said third driving phase.

8. A vibration wave motor according to claim 7, wherein said vibration detecting phase or phases and said third driving phase are disposed, with the direction of travel of the waves and the direction of polarization taken into consideration, at locations spaced apart by a distance x substantially satisfying the following condition:

$$\Phi_m = 2\pi \times \frac{m}{l} = \pm \frac{1}{2}\pi + 2a\pi$$

where m is the wave number of unnecessary vibration to be suppressed, l is the circumferential length of the vibration member formed into a ring-like shape, $\Phi_m$ is the phase difference between waves to be suppressed, and a is an integer.

9. A vibration wave motor according to claim 7, wherein said vibration detecting phase or phases and said third driving phase are disposed, with the direction of travel of the waves and the direction of polarization taken into consideration, at locations spaced apart by a distance x substantially satisfying both of the following conditions:

$$\Phi_m = 2\pi \times \frac{m}{l} = \pm \frac{1}{2}\pi + 2a\pi$$

and $$\Phi_n = 2\pi \times \frac{n}{l} = \mp \frac{1}{2}\pi + 2b\pi$$

where n is the wave number of driving, m is the wave number of unnecessary vibration to be suppressed, l is the circumferential length of the vibration member formed into a ring-like shape, $\Phi_n$ is the phase difference between the waves of driving, $\Phi_m$ is the phase difference between waves to be suppressed, and a and b are integers.

10. A vibration wave motor according to claim 7, provided with a delay circuit for delaying the detection signal from said vibration detecting phase or phases by a time $\Delta t$ and wherein the output of said circuit is applied to said third driving phase.

11. A vibration wave motor according to claim 10, wherein said vibration detecting phase or phases and said third driving phase are disposed, with the direction of travel of the waves and the direction of polarization taken into consideration, at locations spaced apart by a distance x substantially satisfying the following relation:

$$\Phi_m = 2\pi \times \frac{m}{l} - 2\pi f_m \Delta t = \pm \frac{1}{2}\pi + 2a\pi$$

-continued or $$\Phi_m = 2\pi \times \frac{m}{l} + 2\pi f_m \Delta t = \pm \frac{1}{2}\pi + 2a\pi$$

where $f_m$ is the vibration number of the wave number m to be suppressed, l is the circumferential length of the vibration member formed into a ring-like shape, $\Phi_m$ is the phase difference between waves to be suppressed, and a is an integer.

12. A vibration wave motor according to claim 7, wherein said vibration detecting phase or phases and said third driving phase are disposed, with the direction of travel of the waves and the direction of polarization taken into consideration, at locations spaced apart by a distance x substantially satisfying the following relation:

$$\Phi_n = 2\pi n \frac{x}{l} - 2\pi f_n \Delta t = \mp \frac{1}{2}\pi + 2b\pi$$

or $$\Phi_n = 2\pi n \frac{x}{l} + 2\pi f_n \Delta t = \mp \frac{1}{2}\pi + 2b\pi$$

where $f_n$ is the driving frequency, l is the circumferential length of the vibration member formed into a ring-like shape, $\Phi_n$ is the phase difference between the waves of driving, and b is an integer.

13. A vibration wave motor according to claim 7, wherein said vibration detecting phase or phases and said third driving phase are disposed at locations spaced apart by a distance x substantially satisfying the following relation:

$$\Phi_m = 2\pi \times \frac{m}{l} = a\pi$$

where l is the circumferential length of the vibration member formed into a ring-like shape, $\Phi_m$ is the phase difference between waves to be suppressed relative to the wave number of driving, and a is an integer.

14. A vibration wave motor according to claim 7, wherein said vibration detecting phase or phases and said third driving phase are disposed at locations spaced apart by a distance x substantially satisfying the following relation:

$$\Phi_n = 2\pi \times \frac{n}{l} = b\pi$$

where n is of driving, l is the circumferential length of the vibration member formed into a ring-like shape, $\Phi_n$ is the phase difference between the waves of driving, and b is an integer.

15. A vibration wave motor according to claim 7, wherein said vibration detecting phase or phases and said third driving phase are disposed at locations spaced apart by a distance x substantially satisfying the following relation:

$$\Phi_n - \Phi_m = 2\pi \frac{n-m}{l} x = \pi + 2c\pi$$

where n is the wave number of driving, m is the wave number to be suppressed, l is the circumferential length of the vibration member formed into a ring-like shape, $\Phi_n$ is the phase difference between the waves of driving, $\Phi_m$ is the phase difference between waves to be suppressed, and c is an integer.

16. A vibration wave motor according to claim 7, provided with a phase shifter for phase-shifting the detection signal from said vibration detecting phase or phases and wherein the output of said phase shifter is applied to said third driving phase.

17. A vibration wave motor according to claim 7, having a plurality of vibration detecting phases and wherein one or both of at least one of said vibration detecting phases and said third driving phase are formed of a piezo-electric high molecular material.

18. A vibration wave motor according to claim 7, wherein the detection signal from said vibration detecting phase or phases is added through a plurality of delay circuits and applied to said third driving phase.

19. A vibration wave motor according to claim 18, wherein a filter for attenuating a driving frequency signal is provided on the input side or the output side of said delay circuits.

20. A vibration wave motor according to claim 7, wherein the detection signal from said vibration detecting phase or phases is added through a plurality of phase shifting circuits and input to said third driving phase.

21. A vibration wave motor according to claim 20, wherein a filter for attenuating a driving frequency signal is provided on the input side or the output side of said phase shifting circuits.

22. A vibration wave motor according to claim 7, wherein a driving phase for forming travelling vibration is used also as said third driving phase.

23. A vibration wave motor for producing a driving force from vibration waves generated in response to the application of driving frequency signals, said motor comprising:
 (a) an electro-mechanical energy converting element which produces vibration waves in response to the application of the driving frequency signals, wherein said electro-mechanical energy converting element comprises at least first and second driving element portions;
 (b) a driving frequency signal forming circuit producing driving frequency signals of different phases;
 (c) a suppressing signal forming circuit generating a vibration suppressing signal to suppress vibrations other than a desired vibration wave; and
 (d) applying means for applying a driving frequency signal to said first driving element portion and for applying to said second driving element portion a driving frequency signal of a phase different from that of the driving frequency signal applied to said first driving element portion and the vibration suppressing signal.

24. A vibration wave motor according to claim 23, wherein said suppressing signal forming circuit comprises means for detecting a vibration state of said motor, wherein a signal based on the detected output of said detecting means is formed as the vibration suppressing signal.

25. A vibration wave motor according to claim 24, wherein said suppressing signal forming circuit comprises a delaying circuit delaying the output of said detecting means for a predetermined period of time, the output of the delaying circuit forming the vibration suppressing signal, wherein said motor further comprises means for applying a composite signal composed of the vibration suppressing signal and a driving frequency signal to said second driving element portion.

26. A vibration wave motor according to claim 24, wherein said suppressing signal forming circuit comprises a phase shifter to which the output of said detecting means is input, wherein the output of said phase shifter forms the vibration suppressing signal, said motor further comprising means for applying a composite signal of the vibration suppressing signal and a driving frequency signal to said second driving element portion.

27. A vibration wave motor in which an AC voltage is applied from a drive control circuit to first and second driving phases each comprising an electro-mechanical energy converting element to thereby generate travelling vibration waves on a vibration member on which said driving phases are provided, and a member which is in pressure contact with said vibration member is moved relative to the latter by said travelling vibration waves, including:
 (a) a vibration detecting phase for detecting the state of vibration provided on said vibration member, and a third driving phase for suppressing the other vibrations than said travelling vibration waves;
 (b) first control means for synthesizing a detection signal obtained from said vibration detecting phase and a signal resulting from said signal being phase-shifted to attenuate the component of said travelling vibration waves; and
 (c) second control means for phase-regulating the synthesized signal and inputting it to said third driving phase to suppress the other vibrations than said travelling vibration waves.

28. A vibration wave motor according to claim 27, wherein the means for phase-shifting the detection signal in said first control means is a delay circuit.

29. A vibration wave motor according to claim 28, wherein the means for synthesizing the signals in said first control means is an adder or a subtracter.

30. A vibration wave motor according to claim 28, wherein the delay time $\Delta t$ by said delay circuit is $$\Delta t = \frac{nT}{2} \ (n \text{ is an integer}).$$

(where T is the period of the AC voltage applied to said first and second driving phases.)

31. A vibration wave motor in which an AC voltage is applied as a driving signal from a drive control circuit to a driving phase comprising an electro-mechanical energy converting element to thereby generate vibration waves on a vibration member on which said driving phase is provided, and a member which is in pressure contact with said vibration member is moved relative to the latter by said vibration waves, including:
 (a) a plurality of vibration detecting phases provided at a plurality of locations on said vibration member;
 (b) signal processing means for synthesizing signals detected from said plurality of vibration detecting phases; and
 (c) drive control means for driving a third driving phase provided on said vibration member on the basis of the signal of said signal processing means.

32. A vibration wave motor according to claim 31, wherein said third driving phase is disposed at the center position of the circumferential length of said plurality of vibration detecting phases.

33. A vibration wave motor according to claim 32, wherein said signal processing means is an adder or a subtracter.

34. A vibration wave motor for moving a vibration member comprising an electro-mechanical energy converting element group and a resilient member by moving a member of an electro-mechanical energy converting element group in contact with the resilient member, relative to the resilient member, said motor comprising:
 (a) a driving circuit for applying a frequency signal to said electro-mechanical energy converting element group to generate travelling vibration wave;
 (b) a second electro-mechanical energy converting element polarized by the length of ¼ of the wavelength of the waves other than the travelling vibration wave, said second electro-mechanical converting element being constructed as a laminated member on the electro-mechanical energy converting element group; and
 (c) applying means for applying a vibration suppressing signal to said second electro-mechanical energy converting element for suppressing vibrations other than a desired travelling vibration wave.

35. A vibration wave motor according to claim 34, provided with vibration detecting means for detecting the vibration of said vibration member and wherein the vibration suppressing signal is formed on the basis of the output of said vibration detecting means.

36. A vibration wave motor according to claim 34, wherein said electro-mechanical energy converting element group is a plurality.

37. A vibration wave motor according to claim 34, wherein said second electro-mechanical energy converting element is a plurality.

38. A driving circuit for a vibration motor which produces a driving force from vibration generated in response to the application of driving frequency signals, said motor including an electro-mechanical energy converting element which produces vibration in response to the application of the driving frequency signals, wherein said electro-mechanical energy converting element comprises at least first and second driving element portions, said driving circuit comprising:
 (a) a driving frequency signal forming circuit producing driving frequency signals of different phases.
 (b) a suppressing signal forming circuit generating a vibration suppressing signal to suppress vibrations other than a desired vibration; and
 (c) applying means for applying a driving frequency signal to said first driving element portion and for applying to said second driving element portion a driving frequency signal of a phase different from that of the driving frequency signal applied to said first driving element portion and the vibration suppressing signal.

39. A vibration motor for producing a driving force from vibration generated in response to the application of driving frequency signals, said motor comprising:
 (a) an electro-mechanical energy converting element which produces vibration in response to the application of the driving frequency signals, said electro-mechanical energy converting element comprising at least first and second driving element portions and a suppressing element portion; and
 (b) applying means for applying driving frequency signals of different phases to said first and second driving element portions, respectively, and for applying a vibration suppressing signal to said suppressing element portion.

40. A vibration motor according to claim 39, provided with detecting means for detecting the state of vibration and wherein a signal based on the detection output of said detecting means is applied as said vibration suppressing signal.

41. A vibration motor according to claim 40, wherein said electro-mechanical energy converting element has a vibration detecting element portion which acts as said detecting means.

42. A vibration motor according to claim 40, provided with a delay circuit for delaying the output of said detecting means by a predetermined time and wherein a signal passed through said delay circuit is applied as said vibration suppressing signal.

43. A vibration motor according to claim 40, provided with a phase shifter to which the output of said detecting means is input and wherein the output signal of said phase shifter is applied as said vibration suppressing signal.

44. A vibration motor for producing a driving force from vibrations generated in response to the application of driving frequency signals, said motor comprising:
(a) an electro-mechanical energy converting element which produces vibration waves in response to the application of the driving frequency signals, wherein said electro-mechanical energy converting element comprises at least first and second driving element portions;
(b) a driving frequency signal forming circuit producing driving frequency signals of different phases;
(c) a suppressing signal forming circuit generating a vibration suppressing signal to suppress vibrations other than a desired vibration; and
(d) applying means for applying a driving frequency signal to said first driving element portion and for applying to said second driving element portion a driving frequency signal of a phase different from that of the driving frequency signal applied to said first driving element portion and the vibration suppressing signal.

45. A vibration motor according to claim 44, wherein said suppressing signal forming circuit comprises means for detecting a vibration state of said motor, wherein a signal based on the detected output of said detecting means is formed as the vibration suppressing signal.

46. A vibration motor according to claim 45, wherein said suppressing signal forming circuit comprises a delaying circuit delaying the output of said detecting means for a predetermined period of time, the output of the delaying circuit forming the vibration suppressing signal, wherein said motor further comprises means for applying a composite signal composed of the vibration suppressing signal and a driving frequency signal to said second driving element portion.

47. A vibration motor according to claim 45, wherein said suppressing signal forming circuit comprises a phase shifter to which the output of said detecting means is input, wherein the output of said phase shifter forms the vibration suppressing signal, said motor further comprising means for applying a composite signal of the vibration suppressing signal and a driving frequency signal to said second driving element portion.

48. A driving circuit for a vibration motor which produces a driving force from vibration generated in response to the application of driving frequency signals, said motor including an electro-mechanical energy converting element which produces vibration in response to the application of the driving frequency signals, said electro-mechanical energy converting element comprising at least first and second driving element portions and a suppressing element portion, said driving circuit comprising an applying means for applying driving frequency signals of different phases to said first and second driving element portions, respectively, and for applying vibration suppressing signal to said suppressing element portion.

49. A vibration wave motor which is provided with a vibration member comprising a resilient member and an electro-mechanical energy converting element group and in which a member which is in contact with said resilient member is moved relative to said resilient member, comprising:
(a) a driving circuit for applying a frequency signal to said electro-mechanical energy converting element group to generate travelling vibration wave;
(b) a second electro-mechanical energy converting element polarized by the length of $\frac{1}{2}$ of the wavelength of the waves other than the travelling vibration wave, said second electro-mechanical converting element being constructed as a laminated member on the electro-mechanical energy converting element group; and
(c) applying means for applying a vibration suppressing signal to said second electro-mechanical energy converting element for suppressing vibrations other than a desired travelling vibration wave.

50. A vibration wave motor according to claim 49, provided with vibration detecting means for detecting the vibration of said vibration member and wherein the vibration suppressing signal is formed on the basis of the output of said vibration detecting means.

51. A vibration wave motor according to claim 49, wherein said electro-mechanical energy converting element group is a plurality.

52. A vibration wave motor according to claim 49, wherein said second electro-mechanical energy converting element is a plurality.

* * * * *

UNITED STATES PATENT AND TRADEMARK OFFICE
CERTIFICATE OF CORRECTION

PATENT NO. : 5,134,348

DATED : July 28, 1992

INVENTOR(S) : Izukawa et al.

It is certified that error appears in the above-identified patent and that said Letters Patent is hereby corrected as shown below:

COLUMN 2

Line 16, "S phase" should read --S phase.--

Line 54, "the," should read --the--.

COLUMN 3

Line 14, "the" should be deleted.

Line 34, "said" should read --the--.

COLUMN 6

Line 29, "an" should read --the--.

Line 30, "the" should read --an--.

COLUMN 7

Line 57, "discussed" should read --discussed.--

Line 59, "t.he" should read --the--.

COLUMN 9

Line 51, "concentration stiffness" should read --concentration constant of the stiffness--.

line 66, Eq.(2), "$=Y_d \cdot V + A \cdot v$" should read --$I = Y_d \cdot V + A \cdot v$--.

UNITED STATES PATENT AND TRADEMARK OFFICE
CERTIFICATE OF CORRECTION

PATENT NO. : 5,134,348
DATED : July 28, 1992
INVENTOR(S) : Izukawa et al.

It is certified that error appears in the above-identified patent and that said Letters Patent is hereby corrected as shown below:

COLUMN 10

Line 18, "-Yd $V_s=A_s vS.$" should read --Yd $V_s=A_s v_s$.--.
Line 19, "$V_A=v_s,$" should read --$v_A=v_s$--.
Line 51, "vibration,," should read --vibration,--.

COLUMN 11

Line 5, "$\lambda$" should read --$\ell$--.
Line 46, "$x=\lambda/12,$" should read --$x=\ell/12,$--.

COLUMN 12

Line 53, "$\lambda$" should read --$\ell$--.

COLUMN 13

Line 45, "passed" should read --having passed--.

COLUMN 14

Line 8, "$2\pi\ x(8-7)/\lambda$" should read --$2\pi\ x(8-7)/\ell$--.

UNITED STATES PATENT AND TRADEMARK OFFICE
CERTIFICATE OF CORRECTION

PATENT NO. : 5,134,348
DATED : July 28, 1992
INVENTOR(S) : Izukawa et al.

It is certified that error appears in the above-identified patent and that said Letters Patent is hereby corrected as shown below:

COLUMN 15

Line 30, "embodiment," should read --embodiments,--.
Line 43, "$\lambda$," should read --$\ell$,--.
Line 45, "$\lambda$" should read --$\ell$--.

COLUMN 20

Line 13, "Dphase" should read --$D_1$ phase--.
Line 21, "$\lambda/5$))." should read --$\ell/5$)).--.

COLUMN 21

Line 25, close up right margin.
Line 26, close up left margin.

COLUMN 23

Line 20, "$(\omega_8 t - \frac{\lambda 8}{2} \cdot \frac{2\pi}{\lambda_S})$" should read --$(\omega_8 t - \frac{\lambda 8}{2} \cdot \frac{2\pi}{\lambda 8})$--.

UNITED STATES PATENT AND TRADEMARK OFFICE
CERTIFICATE OF CORRECTION

PATENT NO. : 5,134,348

DATED : July 28, 1992

INVENTOR(S) : Izukawa et al.

It is certified that error appears in the above-identified patent and that said Letters Patent is hereby corrected as shown below:

COLUMN 24

Line 9, "hot" should read --not--.

COLUMN 31

"is of" should read --is the wave number of--.

IN THE DRAWINGS:

Figure 15
        "DIVECTION" should read --DIRECTION--.

Figure 71
        "IFTER" should read --SHIFTER--.

Signed and Sealed this

Sixteenth Day of November, 1993

Attest:

BRUCE LEHMAN

*Attesting Officer*     *Commissioner of Patents and Trademarks*